US011041026B2

(12) United States Patent
Johnson et al.

(10) Patent No.: US 11,041,026 B2
(45) Date of Patent: Jun. 22, 2021

(54) REACTIONS ENABLED BY THERMORESPONSIVE AND PHOTORESPONSIVE GELS

(71) Applicant: Massachusetts Institute of Technology, Cambridge, MA (US)

(72) Inventors: Jeremiah A. Johnson, Boston, MA (US); Mao Chen, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/080,536

(22) PCT Filed: Jan. 30, 2018

(86) PCT No.: PCT/US2018/016040
§ 371 (c)(1),
(2) Date: Aug. 28, 2018

(87) PCT Pub. No.: WO2018/140977
PCT Pub. Date: Aug. 2, 2018

(65) Prior Publication Data
US 2020/0062871 A1 Feb. 27, 2020

Related U.S. Application Data

(60) Provisional application No. 62/452,127, filed on Jan. 30, 2017.

(51) Int. Cl.
| | | |
|---|---|---|
| *C08F 2/46* | (2006.01) | |
| *C08F 2/50* | (2006.01) | |
| *C08G 61/04* | (2006.01) | |
| *C08F 2/38* | (2006.01) | |
| *C08F 4/40* | (2006.01) | |
| *C08F 293/00* | (2006.01) | |

(52) U.S. Cl.
CPC ................. *C08F 2/50* (2013.01); *C08F 2/38* (2013.01); *C08F 4/40* (2013.01); *C08F 293/005* (2013.01); *C08F 2438/01* (2013.01); *C08F 2438/03* (2013.01)

(58) Field of Classification Search
CPC .......... C08F 2/50; C08F 2/38; C08F 293/005; C08F 2438/01; C08F 2438/03; C08F 4/40
USPC ................... 522/12, 7, 6, 189, 184, 1; 520/1
See application file for complete search history.

(56) References Cited

FOREIGN PATENT DOCUMENTS

| JP | 2012-144610 A | 8/2012 |
|---|---|---|
| KR | 2016-0126299 A | 11/2016 |
| WO | WO 2013/148722 A1 | 10/2013 |
| WO | WO 2015/113114 A1 | 8/2015 |

OTHER PUBLICATIONS

Dadashi-Silab et al, Photoinduced ElectronTransfer REactions for Macromolecular Syntheses, Chem. Rev., Jan. 8, 2016, 116, 10212-10275 (Year: 2016).*
Treat et al, Metal-Free Atom Transfer Radical Polymerization, Oct. 24, 2014, J. Am. Chem. Soc., 136, 16096-16101 (Year: 2014).*
International Search Report and Written Opinion for PCT/US2018/016040, dated Apr. 3, 2018.
Chen et al., Light-Controlled Radical Polymerization: Mechanisms, Methods, and Applications. Chem Rev. Sep. 14, 2016;116(17):10167-211. doi: 10.1021/acs.chemrev.5b00671. Epub Mar. 15, 2016.
Dadashi-Silab et al., Photoinduced Electron Transfer Reactions for Macromolecular Syntheses. Chem. Rev., 2016;116(17):10212-10275. DOI: 10.1021/acs.chemrev.5b00586.
Fors et al., Control of a living radical polymerization of methacrylates by light. Angew Chem Int Ed Engl. 2012;51(35):8850-8853. doi:10.1002/anie.201203639.
Hawker et al., New polymer synthesis by nitroxide mediated living radical polymerizations. Chem Rev. 2001;101(12):3661-3688. doi:10.1021/cr990119u.
Mckenzie et al., Visible Light Mediated Controlled Radical Polymerization in the Absence of Exogenous Radical Sources or Catalysts. Macromolecules 2015, 48, 12, 3864-3872.
Otsu et al., Role of initiator-transfer agent-terminator (iniferter) in radical polymerizations: Polymer design by organic disulfides as iniferters. Makromol Chem Rapid Commun. 1982;3:127-132.
Pan et al., Photoinduced Atom Transfer Radical Polymerization with ppm-Level Cu Catalyst by Visible Light in Aqueous Media. J Am Chem Soc. 2015;137(49):15430-15433. doi:10.1021/jacs.5b11599.
Shanmugam et al., A logic gate for external regulation of photopolymerization. Polym. Chem., 2016,7, 6437-6449.
Shanmugam et al., Exploiting Metalloporphyrins for Selective Living Radical Polymerization Tunable over Visible Wavelengths. J. Am. Chem. Soc. 2015, 137, 28, 9174-9185.
Shanmugam et al., Stereo-, Temporal and Chemical Control through Photoactivation of Living Radical Polymerization: Synthesis of Block and Gradient Copolymers. J. Am. Chem. Soc. 2015, 137, 31, 9988-9999.
Theriot et al., Organocatalyzed atom transfer radical polymerization driven by visible light. Science. 2016;352(6289):1082-1086. doi:10.1126/science.aaf3935.
Treat et al., Controlled Radical Polymerization of Acrylates Regulated by Visible Light. ACS Macro Lett. 2014;3(6):580-584.

(Continued)

*Primary Examiner* — Jessica Whiteley
(74) *Attorney, Agent, or Firm* — Wolf, Greenfield & Sacks, P.C.

(57) ABSTRACT

Disclosed are methods, compositions, kits, and reagents to prepare compounds (e.g. polymers and small molecules) via radical reactions by utilizing thermoresponsive and photoresponsive gels. This invention discloses the preparation of polymers via controlled radical polymerizations from an iniferter or initiator, one or more reactant monomer, and a thermoresponsive and photoresponsive gel. Embodiments of the invention show that the polymerization is reversibly activated and/or deactivated by controlling one or more of the following external control stimuli: temperature, light, and catalyst presence. This invention also relates the preparation of Gel-PTH, a heterogeneous thermoresponsive and photoresponsive gel.

26 Claims, 32 Drawing Sheets

(56) References Cited

OTHER PUBLICATIONS

Xu et al., A robust and versatile photoinduced living polymerization of conjugated and unconjugated monomers and its oxygen tolerance. J Am Chem Soc. 2014;136(14):5508-5519. doi:10.1021/ja501745g.

Xu et al., Oxygen Tolerance Study of Photoinduced Electron Transfer—Reversible Addition—Fragmentation Chain Transfer (PET-RAFT) Polymerization Mediated by Ru(bpy)3C12. Macromolecules 2014, 47, 13, 4217-4229.

Yagci et al, Photoinitiated Polymerization: Advances, Challenges, and Opportunities. Macromolecules 2010;43(15):6245-6260.

Zivic et al., Photocatalysts in Polymerization Reactions. 2016;8(9):1617-1631.

Pan et al., Photoinduced Metal-Free Atom Transfer Radical Polymerization of Acrylonitrile. American Chemical Society. 2015;4:192-196.

Treat et al. Metal-free atom transfer radical polymerization. J Am Chem Soc. 2014;136(45):16096-16101. doi:10.1021/ja510389m.

\* cited by examiner

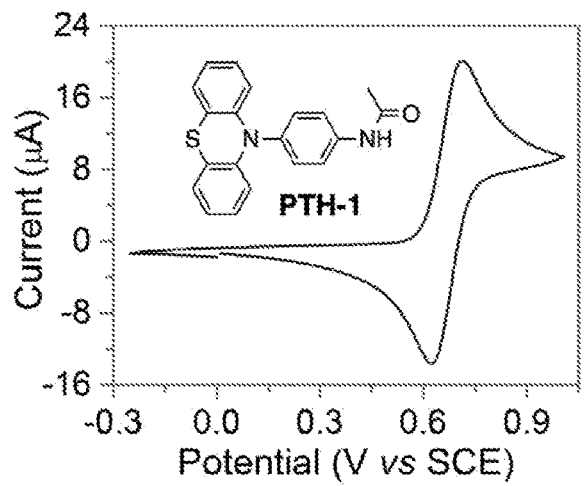 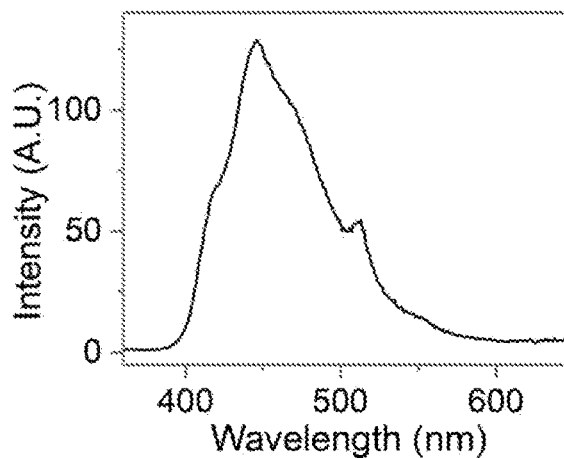
Figure 1A          Figure 1B
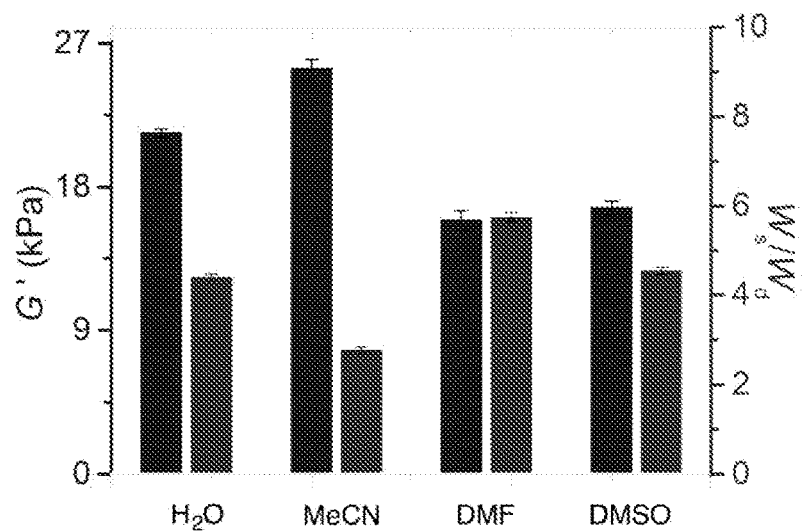
Figure 2

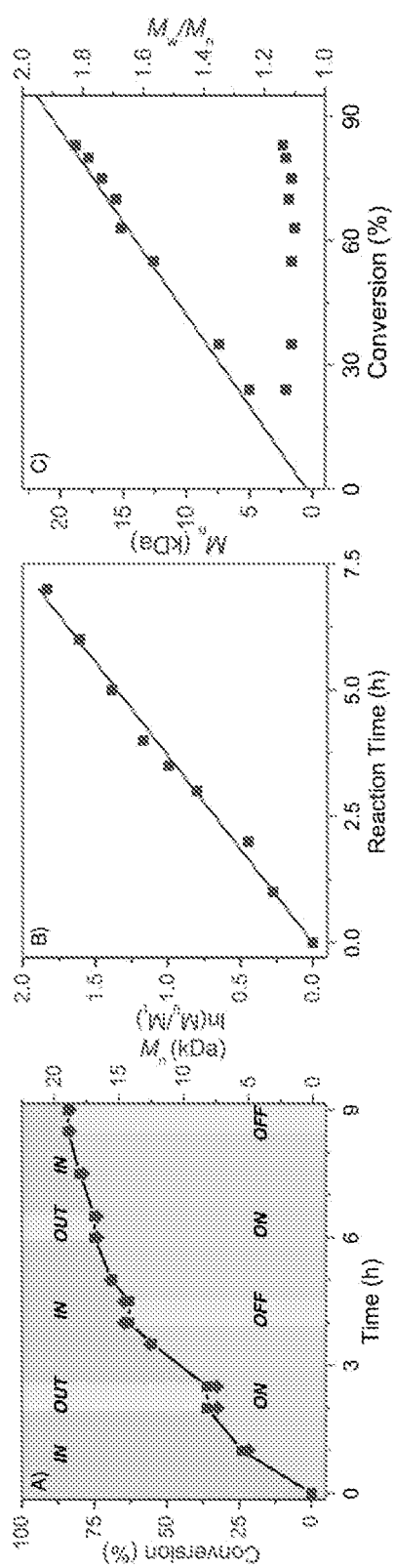
Figure 5A  Figure 5B  Figure 5C

REACTIONS ENABLED BY THERMORESPONSIVE AND PHOTORESPONSIVE GELS

RELATED APPLICATIONS

This application is a national stage filing under 35 U.S.C. § 371 of international PCT application, PCT/US2018/016040, filed Jan. 30, 2018, which claims priority under 35 U.S.C. § 119(e) to U.S. Provisional Application, U.S. Ser. No. 62/452,127, filed Jan. 30, 2017, each of which is incorporated herein by reference.

GOVERNMENT SUPPORT

This invention was made with government support under grant number CHE-1334703 awarded by the National Science Foundation. The government has certain rights in the invention.

BACKGROUND OF THE INVENTION

Controlled radical polymerization (CRP) has advanced the field of polymer and materials science by overcoming many of the limitations of free radical polymerization (FRP), which provides little control of molar mass distribution; no control of polymer tacticity; and the inability to synthesize block copolymers. The development of methods to perform CRP (e.g. atom transfer radical polymerization (ATRP), reversible addition/fragmentation chain transfer (RAFT) polymerization, and nitroxide-mediated polymerization (NMP)), has steadily developed since the 1990s has yielded new possibilities for materials design and fabrication (see, e.g. C. J. Hawker, et al. Chem. Rev. 2001, 101, 3661-3688). In general, CRP relies on polymeric dormant species that can undergo reversible termination and allow for switching polymerizations "ON" and "OFF". While switching of CRP has been achieved using light, applied voltage, allosteric effects, chemical reagents, pH, and mechanical force as stimuli, it is still challenging to introduce multiple external switches or control stimuli ("AND" gating) using the same catalyst. Such methods would not only allow for greater control of the polymerization process to yield desired architectures and molecular weights, but would also provide opportunities to manipulate reactions temporally, spatially, and orthogonally to other processes. Therefore, the design and application of a single catalyst to control polymerizations via multiple external control stimuli would be of great interest to a myriad of industries.

Light has been widely adopted as the stimulus-of-choice for CRP due to its convenience, simplicity, and low cost (see, e.g. Chen, M.; Zhong, M.; Johnson, J. A., Chem. Rev. 2016, 10167-10211; Dadashi-Silab, S.; Doran, S.; Yagci, Y., Chem. Rev. 2016, 10212-10275; Yagci, Y.; Jockusch, S.; Turro, N. J., Macromolecules 2010, 43, 6245-6260; Zivic, N.; Bouzrati-Zerelli, M.; Kermagoret, A.; Dumur, F.; Fouassier, J.-P.; Gigmes, D.; Lalevée, J., ChemCatChem 2016, 8, 1617-1631). In 2012, Fors and Hawker reported on the use of an Ir-based photoredox catalyst to achieve visible light photo-CRP (see, e.g. Fors, B. P.; Hawker, C. J., Angew. Chem., Int. Ed. 2012, 51, 8850-8853). Over the past five years, many organic and organometallic compounds have been applied for the development of robust and versatile photo-CRP methods (see, e.g. Treat, N. J.; Fors, B. P.; Kramer, J. W.; Christianson, M.; Chiu, C.-Y.; Read de Alaniz, J.; Hawker, C. J., ACS Macro Lett. 2014, 3, 580-584; Treat, N. J.; Sprafke, H.; Kramer, J. W.; Clark, P. G.; Barton, B. E.; Read de Alaniz, J.; Fors, B. P.; Hawker, C. J., J. Am. Chem. Soc. 2014, 136, 16096-16101; Pan, X.; Lamson, M.; Yan, J.; Matyjaszewski, K., ACS Macro Lett. 2015, 4, 192-196; Pan, X.; Malhotra, N.; Simakova, A.; Wang, Z.; Konkolewicz, D.; Matyjaszewski, K., J. Am. Chem. Soc. 2015, 137, 15430-15433; Theriot, J. C.; Lim, C.-H.; Yang, H.; Ryan, M. D.; Musgrave, C. B.; Miyake, G. M., Science 2016, 352, 1082; Xu, J.; Jung, K.; Atme, A.; Shanmugam, S.; Boyer, C., J. Am. Chem. Soc. 2014, 136, 5508-5519; Xu, J.; Jung, K.; Boyer, C., Macromolecules 2014, 47, 4217-4229; Shanmugam, S.; Boyer, C., J. Am. Chem. Soc. 2015, 137, 9988-9999; Shanmugam, S.; Xu, J.; Boyer, C., J. Am. Chem. Soc. 2015, 137, 9174-9185). However, all of these examples only exhibit photo-control beyond FRP. Recently, Boyer and coworkers reported on the development of a photo-CRP method in which the switching was controlled using light and pH; however, the physical addition of acid or base to the reaction is required to control the polymerization (see, e.g. Shanmugam, S.; Xu, J.; Boyer, C., Polym. Chem. 2016, 7, 6437-6449). To date, the realization of a CRP method that is controlled by multiple external control stimuli has not been achieved. This achievement would represent a significant step towards mimicking natural biopolymer synthesis, which relies on signals from multiple stimuli (e.g., light, temperature, availability of resources, etc.), and potentially open unprecedented materials fabrication opportunities.

SUMMARY OF THE INVENTION

Methods, compositions, systems, and kits that allow for multiple external controls of CRP are provided for use in preparing polymers as well as for use in other chemical transformations. The application of photoredox catalysis to perform CRP has successfully demonstrated that light can be an effective stimulus for external control of CRP. Other stimuli for external control of CRP are applied voltage, allosteric effects, chemical reagents, mechanical force, temperature, and catalyst presence. Provided herein are compositions of a photoredox catalysts bound within a gel and methods for the preparation of such a gel containing a photoredox catalyst that allows for temperature and light to be effective stimuli for the external control of radical polymerizations. In addition, the physical properties of the gel allow for further control of radical polymerization because the gel can be removed (e.g., physically removed with tweezers) to deactivate radical polymerization and replaced to reactivate radical polymerization. Moreover, the ability to remove the gel without the use of laborious or involved separation techniques, such as chromatography, solvent extraction, or centrifugation holds the potential for the utilization of the gel to improve the purification and reaction control of reactions to involving small molecules that are mediated by photoredox catalysts.

In a broad sense, a thermoresponsive and photoresponsive gel, which can be physically removed from the reaction mixture, allows for multiple external controls of reactions initiated and propagated by radical species. These reactions can be radical polymerization reactions or other chemical transformations (e.g., those involving small molecules). The multiple external control of the radical reactions is effected by controlling one or more of the following stimuli: temperature, light, and/or catalyst presence.

In one aspect, a photoredox catalyst is polymerized with one or more monomers to form a thermoresponsive and photoresponsive gel. For example, when the photoredox catalyst N-(4-(10H-phenothiazin-10-yl)phenyl)acrylamide (PTH-2) is copolymerized with N-isopropylacrylamide (NI- PAAM) and N,N'-methylenebisacrylamide (MBAA), Gel-PTH, (Scheme 1) a thermoresponsive and photoresponsive gel, is formed. The photophysical, physical, and chemical properties of the Gel-PTH allows for controlled switching of CRP "ON" and "OFF" by controlling one or more of the following stimuli: temperature (LOW/HIGH), light (ON/OFF), and catalyst presence (IN/OUT). Moreover, "AND" gating of CRP wherein various combinations of three stimuli are required to induce and maintain polymerization was achieved.

In another aspect, the present invention discloses methods to produce polymers from the light irradiation of reaction mixtures comprising a thermoresponsive and photoresponsive gel and one or more monomers. The polymers are produced via photo-CRP methods such as reversible addition-fragmentation chain-transfer (RAFT) polymerization and atom-transfer radical polymerization (ATRP). The types of polymers that can be produced by the methods provided herein are homopolymers, block copolymers, random copolymers, gradient copolymers, star copolymers, linear polymers, and branched polymers.

In yet another aspect, the present invention provides a method for recycling a thermoresponsive and photoresponsive gel. In particular, the same Gel-PTH may be used for multiple photo-CRP reactions (e.g., 2, 3, 4, 5, 6, 7, 8, 9, 10, or more reactions). Each of the reactions may involve other stimuli and other conditions (e.g., duration).

In yet another aspect, the present invention provides kits comprising a thermoresponsive and photoresponsive gel for the preparation of polymers or small molecules. The kit may also comprise any additional reagents (e.g., reagents, solvents, catalysts, starting materials) necessary to effect any of the synthetic transformations described herein.

The details of certain embodiments of the invention are set forth in the Detailed Description of Certain Embodiments, as described below. Other features, objects, and advantages of the invention will be apparent from the Definitions, Examples, and Claims.

Definitions

Definitions of specific functional groups and chemical terms are described in more detail below. The chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999; Smith and March, *March's Advanced Organic Chemistry*, 5$^{th}$ Edition, John Wiley & Sons, Inc., New York, 2001; Larock, Comprehensive Organic Transformations, VCH Publishers, Inc., New York, 1989; and Carruthers, Some Modern Methods of Organic Synthesis, 3$^{rd}$ Edition, Cambridge University Press, Cambridge, 1987.

Compounds described herein can comprise one or more asymmetric centers, and thus can exist in various stereoisomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., Enantiomers, Racemates and Resolutions (Wiley Interscience, New York, 1981); Wilen et al., Tetrahedron 33:2725 (1977); Eliel, E. L. Stereochemistry of Carbon Compounds (McGraw-Hill, N Y, 1962); and Wilen, S. H., Tables of Resolving Agents and Optical Resolutions p. 268 (E. L. Eliel, Ed., Univ. of Notre Dame Press, Notre Dame, Ind. 1972). The invention additionally encompasses compounds as individual isomers substantially free of other isomers, and alternatively, as mixtures of various isomers.

In a formula, ⌇ is a single bond where the stereochemistry of the moieties immediately attached thereto is not specified, --- is absent or a single bond, and ═══ or ≡≡≡ is a single or double bond.

Unless otherwise stated, structures depicted herein are also meant to include compounds that differ only in the presence of one or more isotopically enriched atoms. For example, compounds having the present structures except for the replacement of hydrogen by deuterium or tritium, replacement of $^{19}$F with $^{18}$F, or the replacement of $^{12}$C with $^{13}$C or $^{14}$C are within the scope of the disclosure.

The term "alkyl" refers to a radical of a straight-chain or branched saturated hydrocarbon group having from 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), propyl ($C_3$) (e.g., n-propyl, isopropyl), butyl ($C_4$) (e.g., n-butyl, tert-butyl, sec-butyl, iso-butyl), pentyl ($C_5$) (e.g., n-pentyl, 3-pentanyl, amyl, neopentyl, 3-methyl-2-butanyl, tertiary amyl), and hexyl ($C_6$) (e.g., n-hexyl). Additional examples of alkyl groups include n-heptyl ($C_7$), n-octyl ($C_8$), and the like. Unless otherwise specified, each instance of an alkyl group is independently unsubstituted (an "unsubstituted alkyl") or substituted (a "substituted alkyl") with one or more substituents (e.g., halogen, such as F). In certain embodiments, the alkyl group is an unsubstituted $C_{1-10}$ alkyl (such as unsubstituted $C_{1-6}$ alkyl, e.g., —CH$_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu, e.g., unsubstituted n-butyl (n-Bu), unsubstituted tert-butyl (tert-Bu or t-Bu), unsubstituted sec-butyl (sec-Bu), unsubstituted isobutyl (i-Bu)). In certain embodiments, the alkyl group is a substituted $C_{1-10}$ alkyl (such as substituted $C_{1-6}$ alkyl, e.g., —CF$_3$, Bn).

The term "alkenyl" refers to a radical of a straight-chain or branched hydrocarbon group having from 2 to 10 carbon atoms and one or more carbon-carbon double bonds (e.g., 1, 2, 3, or 4 double bonds). In some embodiments, an alkenyl group has 2 to 9 carbon atoms ("$C_{2-9}$ alkenyl"). In some embodiments, an alkenyl group has 2 to 8 carbon atoms ("$C_{2-8}$ alkenyl"). In some embodiments, an alkenyl group has 2 to 7 carbon atoms ("$C_{2-7}$ alkenyl"). In some embodiments, an alkenyl group has 2 to 6 carbon atoms ("$C_{2-6}$ alkenyl"). In some embodiments, an alkenyl group has 2 to 5 carbon atoms ("$C_{2-5}$ alkenyl"). In some embodiments, an alkenyl group has 2 to 4 carbon atoms ("$C_{2-4}$ alkenyl"). In some embodiments, an alkenyl group has 2 to 3 carbon atoms ("$C_{2-3}$ alkenyl"). In some embodiments, an alkenyl group has 2 carbon atoms ("$C_2$ alkenyl"). The one or more carbon-carbon double bonds can be internal (such as in 2-butenyl) or terminal (such as in 1-butenyl). Examples of $C_{2-4}$ alkenyl groups include ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{2-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like. Unless otherwise specified, each instance of an alkenyl group is independently unsubstituted (an "unsubstituted alkenyl") or substituted (a "substituted alkenyl") with one or more substituents. In certain embodiments, the alkenyl group is an unsubstituted $C_{2-10}$ alkenyl. In certain embodiments, the alkenyl group is a substituted $C_{2-10}$ alkenyl. In an alkenyl group, a C=C double bond for which the stereochemistry is not specified (e.g., —CH=CHCH$_3$ or

)

may be an (E)- or (Z)-double bond.

The term "heteroalkenyl" refers to an alkenyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkenyl group refers to a group having from 2 to 10 carbon atoms, at least one double bond, and 1 or more heteroatoms within the parent chain ("heteroC$_{2-10}$ alkenyl"). In some embodiments, a heteroalkenyl group has 2 to 9 carbon atoms at least one double bond, and 1 or more heteroatoms within the parent chain ("heteroC$_{2-9}$ alkenyl"). In some embodiments, a heteroalkenyl group has 2 to 8 carbon atoms, at least one double bond, and 1 or more heteroatoms within the parent chain ("heteroC$_{2-8}$ alkenyl"). In some embodiments, a heteroalkenyl group has 2 to 7 carbon atoms, at least one double bond, and 1 or more heteroatoms within the parent chain ("heteroC$_{2-7}$ alkenyl"). In some embodiments, a heteroalkenyl group has 2 to 6 carbon atoms, at least one double bond, and 1 or more heteroatoms within the parent chain ("heteroC$_{2-6}$ alkenyl"). In some embodiments, a heteroalkenyl group has 2 to 5 carbon atoms, at least one double bond, and 1 or 2 heteroatoms within the parent chain ("heteroC$_{2-5}$ alkenyl"). In some embodiments, a heteroalkenyl group has 2 to 4 carbon atoms, at least one double bond, and 1 or 2 heteroatoms within the parent chain ("heteroC$_{2-4}$ alkenyl"). In some embodiments, a heteroalkenyl group has 2 to 3 carbon atoms, at least one double bond, and 1 heteroatom within the parent chain ("heteroC$_{2-3}$ alkenyl"). In some embodiments, a heteroalkenyl group has 2 to 6 carbon atoms, at least one double bond, and 1 or 2 heteroatoms within the parent chain ("heteroC$_{2-6}$ alkenyl"). Unless otherwise specified, each instance of a heteroalkenyl group is independently unsubstituted (an "unsubstituted heteroalkenyl") or substituted (a "substituted heteroalkenyl") with one or more substituents. In certain embodiments, the heteroalkenyl group is an unsubstituted heteroC$_{2-10}$ alkenyl. In certain embodiments, the heteroalkenyl group is a substituted heteroC$_{2-10}$ alkenyl.

The term "amino" refers to the group —NH$_2$. The term "substituted amino," by extension, refers to a monosubstituted amino, a disubstituted amino, or a trisubstituted amino. In certain embodiments, the "substituted amino" is a monosubstituted amino or a disubstituted amino group.

The term "polymer" refers to a compound comprising eleven or more covalently connected repeating units. In certain embodiments, a polymer is naturally occurring. In certain embodiments, a polymer is synthetic (i.e., not naturally occurring). When a single monomer is polymerized, the product is called a homopolymer. Block copolymers comprise two or more homopolymer subunits linked by a covalent bonds. The union of the homopolymer subunits may require an intermediate non-repeating subunit, known as a junction block. Block copolymers with two or three distinct blocks are called diblock copolymers and triblock copolymers, respectively.

The term "polymer network" refers to a structure in which essentially all the chains of repeating units are connected to all other chains of repeating units and to the macroscopic phase boundary by many path's through the polymer's phase; the number of such paths increases with the average number of intervening bonds. For example, hydrogels are polymer networks swollen with water.

The term "gel" refers to a non-fluid colloidal network or non-fluid polymer network that is expanded throughout its whole volume by a fluid (e.g., a solvent, such as water). A gel has a finite, usually rather small, yield stress. A gel may contain: (i) a covalent molecular network (e.g., polymer network), e.g., a network formed by crosslinking molecules (e.g., polymers) or by nonlinear polymerization; (ii) a molecular network (e.g., polymer network) formed through non-covalent aggregation of molecules (e.g., polymers), caused by complexation (e.g., coordination bond formation), electrostatic interactions, hydrophobic interactions, hydrogen bonding, van der Waals interactions, π-π stacking, or a combination thereof, that results in regions of local order acting as the network junction points. The term "thermoreversible gel" refers to a gel where the regions of local order in the gel are thermally reversible; (iii) a polymer network formed through glassy junction points, e.g., one based on block copolymers. If the junction points are thermally reversible glassy domains, the resulting swollen network may also be termed a thermoreversible gel; (iv) lamellar structures including mesophases, e.g., soap gels, phospholipids, and clays; or (v) particulate disordered structures, e.g., a flocculent precipitate usually consisting of particles with large geometrical anisotropy, such as in V$_2$O$_5$ gels and globular or fibrillar protein gels. The term "thermoresponsive gel" refers to a gel that exhibits a drastic and discontinuous change of their physical properties with temperature. Typically, the term is commonly used when the physical property concerned is solubility in a given solvent, but it may also be used when other properties are affected. In particular, thermoresponsive gels display a miscibility gap in their temperature-composition diagram. The term "hydrogel" refers to a gel, in which the fluid is water.

The term "small molecule" refers to molecules, whether naturally-occurring or artificially created (e.g., via chemical synthesis) that have a relatively low molecular weight. Typically, a small molecule is an organic compound (i.e., it contains carbon). The small molecule may contain multiple carbon-carbon bonds, stereocenters, and other functional groups (e.g., amines, hydroxyl, carbonyls, and heterocyclic rings, etc.). In certain embodiments, the molecular weight of a small molecule is not more than about 1,000 g/mol, not more than about 900 g/mol, not more than about 800 g/mol, not more than about 700 g/mol, not more than about 600 g/mol, not more than about 500 g/mol, not more than about 400 g/mol, not more than about 300 g/mol, not more than about 200 g/mol, or not more than about 100 g/mol. In certain embodiments, the molecular weight of a small molecule is at least about 100 g/mol, at least about 200 g/mol, at least about 300 g/mol, at least about 400 g/mol, at least about 500 g/mol, at least about 600 g/mol, at least about 700 g/mol, at least about 800 g/mol, or at least about 900 g/mol, or at least about 1,000 g/mol. Combinations of the above ranges (e.g., at least about 200 g/mol and not more than about 500 g/mol) are also possible. In certain embodiments, the small molecule is a therapeutically active agent such as a drug (e.g., a molecule approved by the U.S. Food and Drug Administration as provided in the Code of Federal Regulations (C.F.R.)). The small molecule may also be complexed with one or more metal atoms and/or metal ions. In this instance, the small molecule is also referred to as a "small organometallic molecule." Preferred small molecules are biologically active in that they produce a biological effect in animals, preferably mammals, more preferably humans. Small molecules include, but are not limited to, radionuclides and imaging agents. In certain embodiments, the small molecule is a drug. Preferably, though not necessarily, the drug is one that has already been deemed safe and effective for use in humans or animals by the appropriate governmental agency or regulatory body. For example, drugs approved for human use are listed by the FDA under 21 C.F.R. §§ 330.5, 331 through 361, and 440 through 460, incorporated herein by reference; drugs for veterinary use are listed by the FDA under 21 C.F.R. §§ 500 through 589, incorporated herein by reference. All listed drugs are considered acceptable for use in accordance with the present invention.

The term "lower critical solution temperature" (LCST) refers to the critical temperature below which the components of the a mixture are miscible for all compositions. The word lower indicates that the LCST is a lower bound to a temperature interval of partial miscibility, or miscibility for certain compositions only.

The term "monomer" refers to a molecule that may bind covalently to other molecules to form a polymer. The process by which the monomers are combined to form a polymer is called polymerization. Molecules made of a small number of monomer units are called oligomers. Common monomers useful in the methods described herein include, but are not limited to, styrene, 4-vinylanisole, 4-acetoxystyrene, 4-tert-butoxystyrene, 4-fluorostyrene, 3-nitrostyrene, α-methylstyrene, methylstyrene, 4-tert-butylstyrene, 2-chloroethyl acrylate, methyl acrylate, ethyl acrylate, tert-butyl acrylate, butyl acrylate, ethylene glycol methyl ether acrylate, 2-hydroxyethyl acrylate, lauryl acrylate, methyl α-bromoacrylate, tert-butyl 2-bromoacrylate, glycidyl methacrylate, pentafluorophenyl methacrylate, methacrylic acid N-hydroxysuccinimide ester, tert-butyl methacrylate, isobutyl methacrylate, ethyl methacrylate, methyl methacrylate, acrylamide, N,N-dimethylacrylamide, N-isopropylacrylamide, N-tert-butylacrylamide, N-hydroxyethyl acrylamide, N-(3-methoxypropyl)acrylamide, N-phenylacrylamide, methacrylamide, N-isopropylmethacrylamide, N-[3-(dimethylamino)propyl]methacrylamide, 7-[4-(trifluoromethyl)coumarin]methacrylamide, vinyl acetate, vinyl propionate, vinyl pivalate, vinyl neodecanoate, vinyl decanoate, vinyl stearate, vinyl chloroformate, and vinyl benzoate.

The term "initiator" refers to a chemical compound that can produce radical species and/or promote radical reactions. Common initiators useful in the methods and systems described herein include, but are not limited to, azobisisobutyronitrile, 1,1'-azobis(cyclohexanecarbonitrile), di-tert-butyl peroxide, benzoyl peroxide, methyl ethyl ketone peroxide, acetone peroxide, sodium persulfate, potassium persulfate, ammonium persulfate, ethyl 2-bromo-2-phenylacetate, dodecyl 2-bromoisobutyrate, ethyl 2-bromoisobutyrate, ethyl 2-bromopropionate, 2-hydroxyethyl 2-bromoisobutyrate, and octadecyl 2-bromoisobutyrate.

The term "iniferter" refers to a chemical compound that simultaneously acts as a initiator, transfer agent, and terminator. Common iniferters useful in the methods described herein include, but are not limited to, benzyl benzodithioate, cyanomethyl benzodithioate, 4-cyano-4-(phenylcarbonothioylthio)pentanoic acid, 4-cyano-4-(phenylcarbonothioylthio)pentanoic acid N-succinimidyl ester, 2-cyano-2-propyl benzodithioate, 2-cyano-2-propyl 4-cyanobenzodithioate, ethyl 2-(4-methoxyphenylcarbonothioylthio)acetate, ethyl 2-methyl-2-(phenylthiocarbonylthio)propionate, ethyl 2-(phenylcarbonothioylthio)-2-phenylacetate, ethyl 2-(phenylcarbonothioylthio)propionate, 1-(methoxycarbonyl)ethyl benzodithioate, 2-(4-methoxyphenylcarbonothioylthio)ethanoic acid, 2-nitro-5-(2-propynyloxy)benzyl 4-cyano-4-(phenylcarbonothioylthio)pentanoate, 2-(phenylcarbonothioylthio)propanoic acid, 2-phenyl-2-propyl benzodithioate, 3,5-Bis(2-dodecylthiocarbonothioylthio-1-oxopropoxy)benzoic acid, 2-cyanobutan-2-yl 4-chloro-3,5-dimethyl-1H-pyrazole-1-carbodithioate, 2-cyanobutanyl-2-yl 3,5-dimethyl-1H-pyrazole-1-carbodithioate, 4-cyano-4-[(dodecylsulfanylthiocarbonyl)sulfanyl]pentanoic acid, 4-cyano-4-[(dodecylsulfanylthiocarbonyl) sulfanyl]pentanol, cyanomethyl (3,5-dimethyl-1H-pyrazole)-carbodithioate, cyanomethyl dodecyl trithiocarbonate, cyanomethyl [3-(trimethoxysilyl)propyl] trithiocarbonate, 2-cyano-2-propyl dodecyl trithiocarbonate, S,S-dibenzyl trithiocarbonate, 2-(dodecylthiocarbonothioylthio)propionic acid, 2-(dodecylthiocarbonothioylthio)-2-methylpropionic acid 3-azido-1-propanol ester, 2-(dodecylthiocarbonothioylthio)-2-methylpropionic acid N-hydroxysuccinimide ester, 2-(dodecylthiocarbonothioylthio)-2-methylpropionic acid pentafluorophenyl ester, phthalimidomethyl butyl trithiocarbonate, methyl 2-(dodecylthiocarbonothioylthio)-2-methylpropionate, 2,2'-(thiocarbonylbis(sulfanediyl))bis (2-methylpropanoic acid), dibenzyl 2,2'-(thiocarbonylbis (sulfanediyl))bis(2-methylpropanoate), dibenzyl 2,2'-(thiocarbonylbis(sulfanediyl))dipropionate, 2-(((dodecylthio)carbonothioyl)thio)propanoic acid, benzyl 1H-pyrrole-1-carbodithioate, cyanomethyl diphenylcarbamodithioate, cyanomethyl methyl(phenyl)carbamodithioate, cyanomethyl methyl(4-pyridyl)carbamodithioate, 2-cyanopropan-2-yl N-methyl-N-(pyridin-4-yl)carbamodithioate, methyl 2-[methyl(4-pyridinyl)carbamothioylthio] propionate, 1-succinimidyl-4-cyano-4-[N-methyl-N-(4-pyridyl)carbamothioylthio]pentanoate, ethyl 2-(((ethylthio) carbonothioyl)thio)propanoate, methyl (4-methoxyphenoxy)carbonothioylsulfanyl acetate, methyl (methoxycarbonothioyl)sulfanyl acetate, methyl (ethoxycarbonothioyl)sulfanyl acetate, and methyl (isopropoxycarbonothioyl)sulfanyl acetate.

The term "chain transfer agent" refers to a chemical compound that is able to react with a chain carrier by a reaction in which the original chain carrier is deactivated and a new chain carrier is generated. Common chain transfer agents useful in the methods described herein include, but are not limited to, benzyl benzodithioate, cyanomethyl benzodithioate, 4-cyano-4-(phenylcarbonothioylthio)pentanoic acid, 4-cyano-4-(phenylcarbonothioylthio)pentanoic acid N-succinimidyl ester, 2-cyano-2-propyl benzodithioate, 2-cyano-2-propyl 4-cyanobenzodithioate, ethyl 2-(4-methoxyphenylcarbonothioylthio)acetate, ethyl 2-methyl-2-(phenylthiocarbonylthio)propionate, ethyl 2-(phenylcarbonothioylthio)-2-phenylacetate, ethyl 2-(phenylcarbonothioylthio)propionate, 1-(methoxycarbonyl)ethyl benzodithioate, 2-(4-methoxyphenylcarbonothioylthio)ethanoic acid, 2-nitro-5-(2-propynyloxy)benzyl 4-cyano-4-(phenylcarbonothioylthio)pentanoate, 2-(phenylcarbonothioylthio)propanoic acid, 2-phenyl-2-propyl benzodithioate, 3,5-Bis(2-dodecylthiocarbonothioylthio-1-oxopropoxy)benzoic acid, 2-cyanobutan-2-yl 4-chloro-3,5-dimethyl-1H-pyrazole-1-carbodithioate, 2-cyanobutanyl-2-yl 3,5-dimethyl-1H-pyrazole-1-carbodithioate, 4-cyano-4-[(dodecylsulfanylthiocarbonyl)sulfanyl]pentanoic acid, 4-cyano-4-[(dodecylsulfanylthiocarbonyl) sulfanyl]pentanol, cyanomethyl (3,5-dimethyl-1H-pyrazole)-carbodithioate, cyanomethyl dodecyl trithiocarbonate, cyanomethyl [3-(trimethoxysilyl)propyl] trithiocarbonate, 2-cyano-2-propyl dodecyl trithiocarbonate, S,S-dibenzyl trithiocarbonate, 2-(dodecylcarbonothioylthio)propionic acid, 2-(dodecylthiocarbonothioylthio)-2-methylpropionic acid 3-azido-1-propanol ester, 2-(dodecylthiocarbonothioylthio)-2-methylpropionic acid N-hydroxysuccinimide ester, 2-(dodecylthiocarbonothioylthio)-2-methylpropionic acid pentafluorophenyl ester, phthalimidomethyl butyl trithiocarbonate, methyl 2-(dodecylthiocarbonothioylthio)-2-methylpropionate, 2,2'-(thiocarbonylbis(sulfanediyl))bis (2-methylpropanoic acid), dibenzyl 2,2'-(thiocarbonylbis(sulfanediyl))bis(2-methylpropanoate), dibenzyl 2,2'-(thiocarbonylbis(sulfanediyl))dipropionate, 2-(((dodecylthio)carbonothioyl)thio)propanoic acid, benzyl 1H-pyrrole-1-carbodithioate, cyanomethyl diphenylcarbamodithioate, cyanomethyl methyl(phenyl)carbamodithioate, cyanomethyl methyl(4-pyridyl)carbamodithioate, 2-cyanopropan-2-yl N-methyl-N-(pyridin-4-yl)carbamodithioate, methyl 2-[methyl(4-pyridinyl)carbamothioylthio] propionate, 1-succinimidyl-4-cyano-4-[N-methyl-N-(4-pyridyl)carbamoylthio]pentanoate, ethyl 2-(((ethylthio) carbonothioyl)thio)propanoate, methyl (4-methoxyphenoxy)carbonothioylsulfanyl acetate, methyl (methoxycarbonothioyl)sulfanyl acetate, methyl (ethoxycarbonothioyl)sulfanyl acetate, and methyl (isopropoxycarbonothioyl)sulfanyl acetate.

The term "average molecular weight" refers to number average molecular weight ($M_n$), weight average molecular weight ($M_w$), higher average molecular weight ($M_z$ or $M_z+1$), GPC/SEC (gel permeation chromatography/size-exclusion chromatography)-determined average molecular weight ($M_p$), and viscosity average molecular weight ($M_v$). In some embodiments, "average molecular weight" refers to $M_n$.

The terms "number average molecular weight," "number average molar mass," and "$M_n$" are measurements of the molecular mass of a polymer. The number average molecular mass is the ordinary arithmetic mean or average of the molecular masses of the individual polymers. It is determined by measuring the molecular mass of n polymer molecules, summing the masses, and dividing by n. For example, a polymer having 100 repeating units of a monomer with a molecular weight of 100 g/mol would have a number average molecular weight ($M_n$) of 10,000 g/mol [$M_n=(100)*(100 \text{ g/mol})/(1)=10,000$ g/mol]. The number average molecular mass of a polymer can be determined by gel permeation chromatography, viscometry via the Mark-Houwink equation, colligative methods such as vapor pressure osmometry, end-group determination, or $^1$H NMR (nuclear magnetic resonance).

The term "catalysis," "catalyze," or "catalytic" refers to the increase in rate of a chemical reaction due to the participation of a substance called a "catalyst." In certain embodiments, the amount and nature of a catalyst remains essentially unchanged during a reaction. In certain embodiments, a catalyst is regenerated, or the nature of a catalyst is essentially restored after a reaction. A catalyst may participate in multiple chemical transformations. The effect of a catalyst may vary due to the presence of other substances known as inhibitors or poisons (which reduce the catalytic activity) or promoters (which increase the activity). Catalyzed reactions have lower activation energy (rate-limiting free energy of activation) than the corresponding uncatalyzed reaction, resulting in a higher reaction rate at the same temperature. Catalysts may affect the reaction environment favorably, bind to the reagents to polarize bonds, form specific intermediates that are not typically produced by a uncatalyzed reaction, or cause dissociation of reagents to reactive forms.

The term "photoredox catalyst" or "photocatalyst" refers to a catalyst that, when exposed to light, is able to cause oxidation or reduction of another compound via single-electron transfer events. The photoredox catalyst will also be oxidized or reduced as a result of this process (i.e., when the other compound is oxidized or reduced, the photoredox catalyst will be reduced or oxidized, respectively). In certain embodiments, the photoredox catalyst, when exposed to light, is capable of triggering or initiating radical polymerization of the monomer by causing the initiator or iniferter to form a radical which can initiate radical polymerization of the monomer. Common photoredox catalysts useful in the methods described herein include, but are not limited to N-(4-(10H-phenothiazin-10-yl)phenyl)acrylamide, perylene, perylene diimide, 10-phenylphenothiazine, 2,3-dichloro-5,6-dicyano-p-benzoquinone, eosin Y, fluorescein, rose Bengal, methylene blue, 9-mesityl-2,7-dimethyl-10-phenylacridinium tetrafluoroborate, 9-mesityl-10-methyl-acridinium perchlorate, 9-mesityl-10-methylacridinium tetrafluoroborate, 9-mesityl-10-phenylacridinium tetrafluoroborate, bis(2,2'-bipyridine)-(5-aminophenanthroline)ruthenium bis(hexafluorophosphate), tris(bipyridine)ruthenium(II) chloride, tris(bipyridine)ruthenium(II) hexafluorophosphate, tris-(bipyrazine)ruthenium(II) hexafluorophosphate, tris-(phenanthroline)ruthenium(II) chloride, tris-(bipyrimidine)ruthenium(II) chloride, bis-(2-(2',4'-difluorophenyl)-5-trifluoromethylpyridine)(di-tert-butylbipyridine)iridium(III) hexafluorophosphate, bis-(2-phenylpyridine)(di-tert-butylbipyridine)iridium(III) hexafluorophosphate, and bis(2,9-di(para-anisyl)-1,10-phenanthroline)copper(I) chloride.

The term "solvent" refers to a substance that dissolves one or more solutes, resulting in a solution. A solvent may serve as a medium for any reaction or transformation described herein. The solvent may dissolve one or more reactants or reagents in a reaction mixture. The solvent may facilitate the mixing of one or more reagents or reactants in a reaction mixture. The solvent may also serve to increase or decrease the rate of a reaction relative to the reaction in a different solvent. Solvents can be polar or non-polar, protic or aprotic. Common organic solvents useful in the methods described herein include, but are not limited to, acetone, acetonitrile, benzene, benzonitrile, 1-butanol, 2-butanone, butyl acetate, tert-butyl methyl ether, carbon disulfide carbon tetrachloride, chlorobenzene, 1-chlorobutane, chloroform, cyclohexane, cyclopentane, 1,2-dichlorobenzene, 1,2-dichloroethane, dichloromethane (DCM), N,N-dimethylacetamide N,N-dimethylformamide (DMF), 1,3-dimethyl-3,4,5,6-tetrahydro-2-pyrimidinone (DMPU), 1,4-dioxane, 1,3-dioxane, diethylether, 2-ethoxyethyl ether, ethyl acetate, ethyl alcohol, ethylene glycol, dimethyl ether, heptane, n-hexane, hexanes, hexamethylphosphoramide (HMPA), 2-methoxyethanol, 2-methoxyethyl acetate, methyl alcohol, 2-methylbutane, 4-methyl-2-pentanone, 2-methyl-1-propanol, 2-methyl-2-propanol, 1-methyl-2-pyrrolidinone, dimethylsulfoxide (DMSO), nitromethane, 1-octanol, pentane, 3-pentanone, 1-propanol, 2-propanol, pyridine, tetrachloroethylene, tetrahyrdofuran (THF), 2-methyltetrahydrofuran, toluene, trichlorobenzene, 1,1,2-trichlorotrifluoroethane, 2,2,4-trimethylpentane, trimethylamine, triethylamine, N,N-diisopropylethylamine, diisopropylamine, water, o-xylene, p-xylene.

These and other exemplary substituents are described in more detail in the Detailed Description, Examples, and Claims. The invention is not intended to be limited in any manner by the above exemplary listing of substituents.

BRIEF DESCRIPTION OF THE DRAWINGS

The accompanying drawings, which constitute a part of this specification, illustrate several embodiments of the invention and together with the description, serve to explain the principles of the invention.

FIGS. 1A to 1B. Characterization of the model catalyst PTH-1. FIG. 1A. Cyclic voltammetry conducted using 0.1 M tetrabutylammonium hexafluorophosphate as electrolyte in acetonitrile (MeCN) at 25° C. FIG. 1B. Fluorescence spectrum of PTH-1 in MeCN at 25° C. The structure of PTH-1 is shown in Scheme 2.

FIG. 2. Mechanical characterization of Gel-PTH. Left column: storage moduli (G') at 1 rad s$^{-1}$ of Gel-PTH swollen to equilibrium in various solvents as measured by frequency sweeps in oscillatory rheometry; Right column: equilibrium swelling ratios of Gel-PTH in various solvents. $W_s$=weight of swollen sample, $W_d$=weight of dry sample.

FIG. 3A. Storage moduli (G') and loss moduli (G") of water-swollen Gel-PTH measured over five heating and cooling cycles; FIG. 3B. optical images of water-swollen Gel-PTH before and after heating.

FIG. 4A. Light "ON"/"OFF" controlled polymerization of NIPAAM in MeCN. FIG. 4B. Catalyst "IN"/"OUT" controlled polymerization of NIPAAM in MeCN. FIG. 4C. Reaction time vs ln($[M]_0/[M]_t$), with $[M]_0$ and $[M]_t$ being the concentration of monomers at time points 0 and t, respectively; FIG. 4D. % conversion vs $M_n$ and % conversion vs $M_w/M_n$. The structure of TTC-1 is shown in Scheme 3.

FIGS. 5A to 5C. "AND" Logic-CRP enabled by Gel-PTH catalyst. FIG. 5A. Light "ON"/"OFF" and catalyst "IN"/"OUT" controlled polymerization. FIG. 5B. Reaction time vs ln($[M]_0/[M]_t$), with $[M]_0$ and $[M]_t$ being the concentration of monomers at time points 0 and t, respectively. FIG. 5C. % conversion vs $M_n$ and % conversion vs $M_w/M_n$.

FIG. 6A. Temperature "LOW"/"HIGH" controlled polymerization of NIPAAM in aqueous media. FIG. 6B. "AND" Logic-CRP with Light "ON"/"OFF" and Temperature "LOW"/"HIGH" enabled by Gel-PTH catalyst.

FIG. 7A. Proton nuclear magnetic resonance spectra ($^1$H NMR) of poly N,N-dimethylacrylamide (poly(DMA)). FIG. 7B. $^1$H NMR of poly(DMA)-b-poly(nBA)-b-poly(DMA) (i.e., poly(nBA) is poly n-butyl acrylate). Note: only half of the structure is shown for this symmetrical A-B-A triblock copolymer.

FIG. 19A) GPC traces; FIG. 19B) Reaction time vs ln($[M]_0/[M]_t$), with $[M]_0$ and $[M]_t$ being the concentration of monomers at time points 0 and t, respectively. FIG. 19C) % conversion vs $M_n$ and % conversion vs $M_w/M_n$.

FIG. 20A) GPC traces; FIG. 20B) Reaction time vs ln($[M]_0/[M]_t$), with $[M]_0$ and $[M]_t$ being the concentration of monomers at time points 0 and t, respectively. FIG. 20C) % conversion vs $M_n$ and % conversion vs $M_w/M_n$.

DETAILED DESCRIPTION OF CERTAIN EMBODIMENTS

Figure 3A:
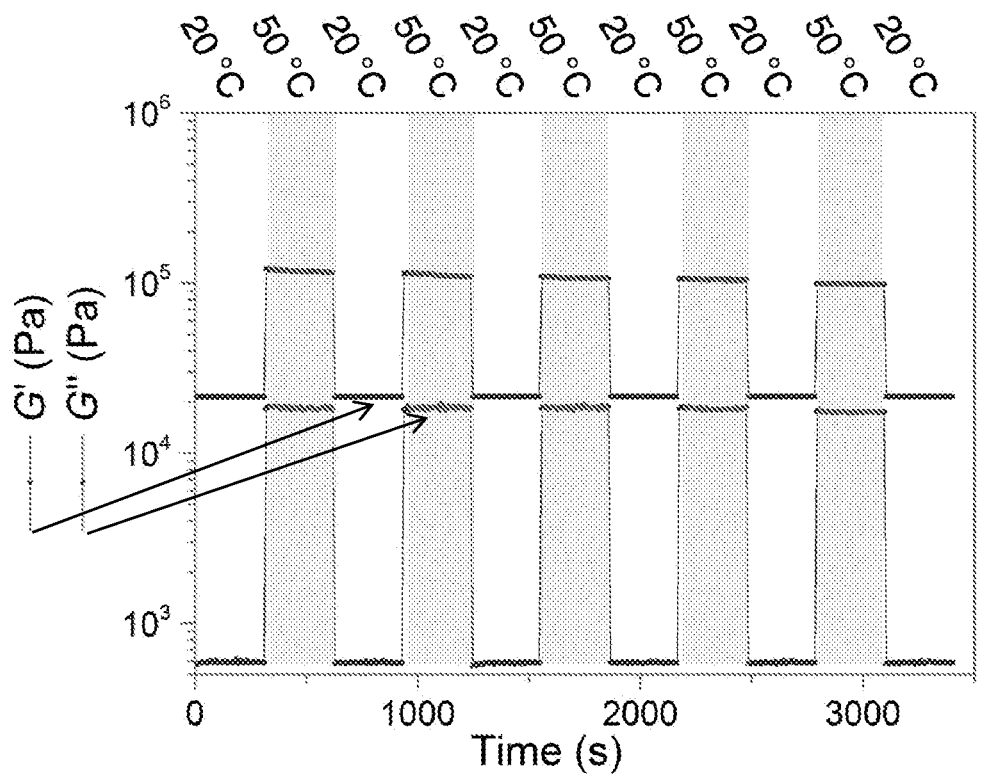
FIGS. 3A to 3B. Lower critical solution temperature (LCST) behavior of water-swollen Gel-PTH.

Before the disclosed methods, compositions, and materials are described, it is to be understood that the aspects described herein are not limited to specific embodiments, methods, apparati, or configurations, and as such can, of course, vary. It is also to be understood that the terminology used herein is for the purpose of describing particular aspects only and, unless specifically defined herein, is not intended to be limiting.

In general, a thermoresponsive and photoresponsive gel is adapted for controlled radical polymerization, which displays efficient activation and deactivation of polymerization through multiple external stimulation. In one aspect, methods, compositions, and reagents for preparing a thermoresponsive and photoresponsive gel are disclosed. The photophysical, physical, and chemical properties of these types of gels allow for controlled switching of CRP "ON" and "OFF" by manipulating one of the following external controls: temperature (LOW/HIGH), light (ON/OFF), and catalyst presence (IN/OUT). Moreover, "AND" gating of CRP, wherein various combinations of three stimuli are controlled to induce and maintain polymerization, was achieved. Also provided herein are compositions, systems, methods, kits, and reagents for preparing polymers or small molecules. In another aspect, the present invention provides a method to recycle a thermoresponsive and photoresponsive gel. In yet another aspect, the present invention provides methods, intermediates, and reagents for preparing Gel-PTH. In yet another aspect, the present invention provides kits, comprising of Gel-PTH, to prepare polymers.

Methods for Preparing a Gel for CRP

The present invention provides a process for preparing a thermoresponsive and photoresponsive gel in which a photoredox catalyst is copolymerized with one more monomers. The gels are prepared in a manner in which LCST behavior is observed. In gels that display LCST behavior, above the LCST the entropic penalty of polymer solvation outweighs favorable enthalpic interactions with solvent, thus causing the polymer to become insoluble. In the case of Gel-PTH, at room temperature in water, the gel is transparent and highly swollen, which allows for initiators or iniferters, reactant monomers, and polymers to diffuse into the network during photo-CRP and be activated by photo-induced electron transfer. Such diffusion is well-established in gels prepared via free radical polymerization, which have large heterogeneous pores. Above the LCST, the gel becomes hydrophobic, expelling solvent and becoming opaque, which should preclude photo-CRP or at least limit it to the gel surface where light activation of the photoredox catalyst would be much less efficient. Thus, the gel described in the present invention allows for light and/or temperature to be utilized as effective external control stimuli for CRP. Moreover, when the gel becomes heterogeneous above the LCST, the gel can be simply removed physically from the reaction mixture, without employing chromatography, solvent extraction, or centrifugation, to stop the polymerization process, and then, optionally, reintroduced into the reaction mixture or a new reaction mixture to reactivate the polymerization process. Therefore, thermoresponsive and photoresponsive gels provided in the present invention, such as Gel-PTH, allow for multiple external control of the CRP through one or more of the following stimuli: temperature, light, and/or catalyst presence.

The photoredox catalyst used in the methods of the present invention are derivatives of photoredox catalysts that contain functional groups which allow for radical copolymerization with one or more monomers to form gels. Photoredox catalysts are typically organometallic compounds, organometallic salts, or organic compounds capable of absorbing light to produce an excited state, which can then undergo oxidation to reduce another molecule or undergo reduction to oxidize another molecule. The maximum absorbance of typical single molecule photoredox catalysts is in the range of 200-1000 nm. Suitable photoredox catalysts are well known in the art. Typical organometallic photoredox catalysts contain transition metals coordinated to organic ligands. Examples of organometallic photoredox catalyst for use herein include, but are not limited to, bis(2,2'-bipyridine)-(5-aminophenanthroline)ruthenium bis(hexafluorophosphate), tris(bipyridine)ruthenium(II) chloride, tris(bipyridine)ruthenium(II) hexafluorophosphate, tris-(bipyrazine)ruthenium(II) hexafluorophosphate, tris-(phenanthroline)ruthenium(II) chloride, tris-(bipyrimidine) ruthenium(II) chloride, bis-(2-(2',4'-difluorophenyl)-5-trifluoromethylpyridine)(di-tert-butylbipyridine)iridium(III) hexafluorophosphate, bis-(2-phenylpyridine)(di-tert-butylbipyridine)iridium(III) hexafluorophosphate, and bis(2,9-di (para-anisyl)-1,10-phenanthroline)copper(I) chloride. Examples of organic photoredox catalysts for use herein include, but are not limited to, N-(4-(10H-phenothiazin-10-yl)phenyl)acrylamide, perylene, perylene diimide, 10-phenylphenothiazine, 2,3-dichloro-5,6-dicyano-p-benzoquinone, eosin Y, fluorescein, rose Bengal, methylene blue, 9-mesityl-2,7-dimethyl-10-phenylacridinium tetrafluoroborate, 9-mesityl-10-methylacridinium perchlorate, 9-mesityl-10-methylacridinium tetrafluoroborate, and 9-mesityl-10-phenylacridinium tetrafluoroborate.

In one embodiment, the photoredox catalyst is a derivative of an organic photoredox catalyst. In another embodiment, the photoredox catalyst is a derivative of 10-phenylphenothiazine. In yet another embodiment the photoredox catalyst is N-(4-(10H-phenothiazin-10-yl)phenyl)acrylamide.

The monomers that are copolymerized with the photoredox catalyst, include one or more monomers known in the art to form thermoresponsive polymers. These thermoresponsive polymers undergo physical changes such as a volume phase transition at a certain temperature, which causes a sudden change in the solvation state. Certain thermoresponsive polymers, which become insoluble upon heating, have a lower critical solution temperature (LCST). The present invention utilizes monomers known to form thermoresponsive polymers to prepare thermoresponsive and photoresponsive gels. Examples of monomers for use herein include N-isopropylacrylamide, N,N'-methylenebisacrylamide, N,N-diethylacrylamide, methyl vinyl ether, N-vinylcaprolactam, di(ethylene glycol) methyl ether methacrylate, ethylene oxide, and propylene oxide.

In one embodiment, the monomers copolymerized with the photoredox catalyst to form a thermoresponsive and photoresponsive gel. In another embodiment, the thermoresponsive and photoresponsive gel exhibits a maximum absorbance in the range of 200-400 nm, 400-600 nm, 600-800 nm, or 800-1000 nm. In yet another embodiment, the monomers N-isopropylacrylamide and N,N'-methylenebisacrylamide are copolymerized with the photoredox catalyst N-(4-(10H-phenothiazin-10-yl)phenyl)acrylamide to form the thermoresponsive and photoresponsive gel Gel-PTH.

The present invention provides methods for preparing Gel-PTH in particular (Scheme 1). A free radical reaction is used to prepare Gel-PTH from the copolymerization of N-isopropylacrylamide (NIPAAM) with N-(4-(10H-phenothiazin-10-yl)phenyl)acrylamide (PTH-2) and N,N'-methylenebisacrylamide (MBAA) (molar ratio of NIPAAM/PTH-2=30/1) using azobisisobutyronitrile (AIBN) as a free radical initiator. A two-step reaction protocol, comprising a reduction step and an acylation step, is used to prepare PTH-2 from the reduction of the nitro group of 10-(4-nitrophenyl)-phenothiazine (PTH-NO$_2$) to an amino group via exposure to hydrogen in the presence of Pd/C catalyst followed by acylation of the amino group with acryloyl chloride. A nucleophilic aromatic substitution reaction is used to prepare PTH-NO$_2$ from heating 1-fluoro-4-nitrobenzene with phenothiazine.

In certain embodiments, the radical copolymerization step of NIPAAM, PTH-2, and MBAA to yield Gel-PTH is prepared and carried out inside of a glovebox. In certain embodiments, the radical copolymerization step of NIPAAM, PTH-2, and MBAA to yield Gel-PTH is prepared and carried out outside of a glovebox. It is understood by those skilled in the art that the specific synthetic protocols described herein for the syntheses of Gel-PTH can be adapted to the syntheses of other thermoresponsive and photoresponsive gels.

Photo-CRP Methods of Preparing Polymers

The present invention provides methods, compositions, kits, and reagents to prepare polymers via CRP utilizing thermoresponsive and photoresponsive gels as described herein. CRP has branched into three fundamental techniques: atom transfer radical polymerization (ATRP), reversible addition/fragmentation chain transfer (RAFT) polymerization, and nitroxide-mediated polymerization (NMP). In one embodiment, photo-iniferter/RAFT polymerization mediated by a thermoresponsive and photoresponsive gel is used to prepare polymers. In another embodiment, photo-ATRP mediated by a thermoresponsive and photoresponsive gel is used to prepare polymers.

Methods of the invention allow for control of polymerization process so as to form polymers having selected lengths and/or selected molecular weights and/or selected molecular weight distributions and/or selected architectures. In certain embodiments of the invention, polymerization yields a structure selected from a group consisting of one or more of the following types of polymers: homopolymer, block copolymer, random copolymer, gradient copolymer, star copolymer, linear polymer, and branched polymer.

A general feature of the invention is the reversibility of the radical polymerization process relying on the physical, photophysical, or chemical properties of a thermoresponsive and photoresponsive gel. In one embodiment, the polymerization is activated in the presence of light and reversibly deactivated in the absence of light. As this process is reversibly activated in the presence of light and reversibly deactivated in the absence of light, the polymerization can be initiated and/or deactivated repeatedly by exposing the reaction mixture to light and/or shielding or removing the reaction mixture from light irradiation.

In another embodiment, the polymerization occurs in the presence of the thermoresponsive and photoresponsive gel and reversibly deactivated in the absence of the thermoresponsive and photoresponsive gel. As this process is reversibly activated in the presence of the thermoresponsive and photoresponsive gel and reversibly deactivated in the absence of the thermoresponsive and photoresponsive gel, the polymerization can be initiated and/or deactivated repeatedly by removing the thermoresponsive and photoresponsive gel from the reaction mixture to light and/or restoring the thermoresponsive and photoresponsive gel to the reaction mixture.

In another embodiment, the polymerization occurs in the presence of a iniferter, initiator, or chain transfer agent, which initiates the polymerization of the reactant monomers. In typical embodiments, the molar ratio of the iniferter, initiator, or chain transfer agent to the reactant monomer is in the range of 1:100 to 1:500. In another embodiment, the molar ratio of the iniferter, initiator, or chain transfer agent to the reactant monomer is in the range between 1:100 and 1:200, 1:200 and 1:300, 1:300 and 1:400, or 1:400 and 1:500. In addition, the molar concentration of the reactant monomer for a typical photo-CRP reaction in the range of 0.1 M to 3.0 M. In certain embodiments, the molar concentration of the reactant monomer is in the range between 0.1 M and 0.5 M, 0.5 M and 1.0 M, 1.0 M and 1.5 M, 1.5 M and 2.0 M, 2.0 M and 2.5 M, or 2.5 M and 3.0 M.

In yet another embodiment, the polymerization is activated below about the LCST of the thermoresponsive and photoresponsive gel and reversibly deactivated above about the LCST of the thermoresponsive and photoresponsive gel. As this process is reversibly activated by controlling the temperature of the reaction mixture, the polymerization can be initiated and/or deactivated repeatedly by lowering the temperature of the reaction mixture below the LCST and/or raising the temperature of the reaction mixture above the LCST. In typical embodiments, the LCST of the thermoresponsive and photoresponsive gel is in the range of 20° C. to 100° C. In another embodiment, the LCST of the thermoresponsive and photoresponsive gel is in the range between 20° C. and 40° C., 40° C. and 60° C., 60° C. and 80° C., or 80° C. and 100° C. In yet another embodiment, the temperature of the polymerization reaction is in the range of 0° C. to 100° C. In yet another embodiment, the temperature of the polymerization reaction is in the range of 0° C. and 10° C., 10° C. and 20° C., 20° C. and 30° C., 30° C. and 40° C., 40° C. and 50° C., 50° C. and 60° C., 60° C. and 70° C., 70° C. and 80° C., 80° C. and 90° C., or 90° C. and 100° C.

The methods disclosed herein form polymers from photo-CRP, in which the molecular weight of the polymer is directly proportional to the amount of light exposure. For example, the molecular weight of the polymer in a reaction mixture is dictated by the amount of time that the reaction mixture is exposed to light and/or the intensity of light that reached the reaction mixture. In typical embodiments, the wavelength of the light source is in the range of 200 nm to 1000 nm. In another embodiment, the wavelength of the light source is in the range of 200 nm and 300 nm, 300 nm and 400 nm, 400 nm and 500 nm, 500 nm and 600 nm, 600 nm and 700 nm, 700 nm and 800 nm, 800 nm and 900 nm, or 900 nm and 1000 nm.

The number average molecular mass of a polymer can be determined by gel permeation chromatography, viscometry via the Mark-Houwink equation, colligative methods such as vapor pressure osmometry, end-group determination, or $^1$H NMR (nuclear magnetic resonance). In typical embodiments, the number average molar mass or $M_n$ is in the range of about 3 kDa to about 100 kDa. In certain embodiments, the range of the number average molar mass or $M_n$ is between about 5 kDa to about 40 kDa. In certain embodiments, the range of the number average molar mass or $M_n$ is between about 5 kDa to about 10 kDa, 10 kDa to about 15 kDa, 15 kDa to about 20 kDa, 20 kDa to about 25 kDa, 25 kDa to about 30 kDa, 30 kDa to about 35 kDa, 35 kDa to about 40 kDa, 40 kDa to about 45 kDa, 45 kDa to about 50 kDa, 50 kDa to about 55 kDa, 55 kDa to about 60 kDa, 60 kDa to about 65 kDa, 65 kDa to about 70 kDa, 70 kDa to about 75 kDa, 75 kDa to about 80 kDa, 80 kDa to about 85 kDa, 85 kDa to about 90 kDa, 90 kDa to about 95 kDa, and 95 kDa to about 100 kDa.

As it is known in the art, the polydispersity index (PDI) is a measure of the distribution of molecular mass in a given polymer sample. The PDI is calculated by dividing the weight average molecular weight ($M_w$) by the number average molecular weight ($M_n$): PDI=$M_w/M_n$. The index indicates the distribution of individual molecular masses in a batch of polymers. In some embodiments, the polydispersity index is between 1.0 and 2.0. In some embodiment, the polydispersity index is in the range between 1.0 and 1.2, 1.2 and 1.4, 1.4 and 1.6, 1.6 and 1.8, or 1.8 and 2.0.

Figure 6A:
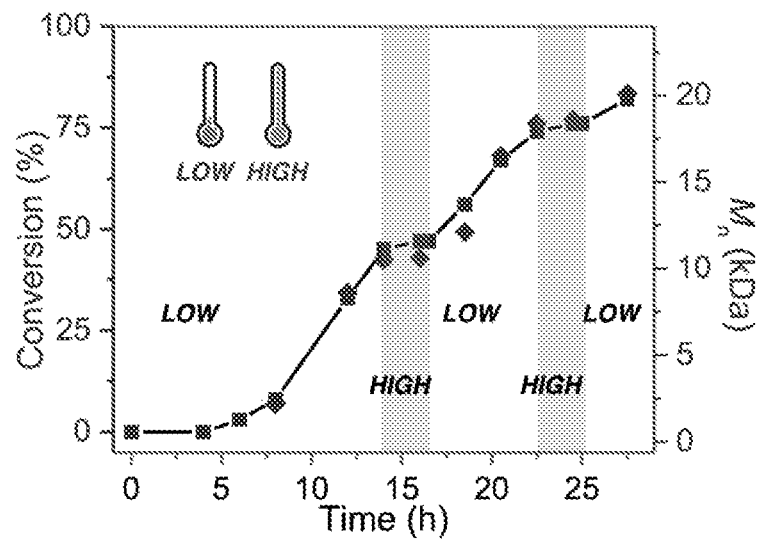
FIGS. 6A to 6B.
Figure 6B:
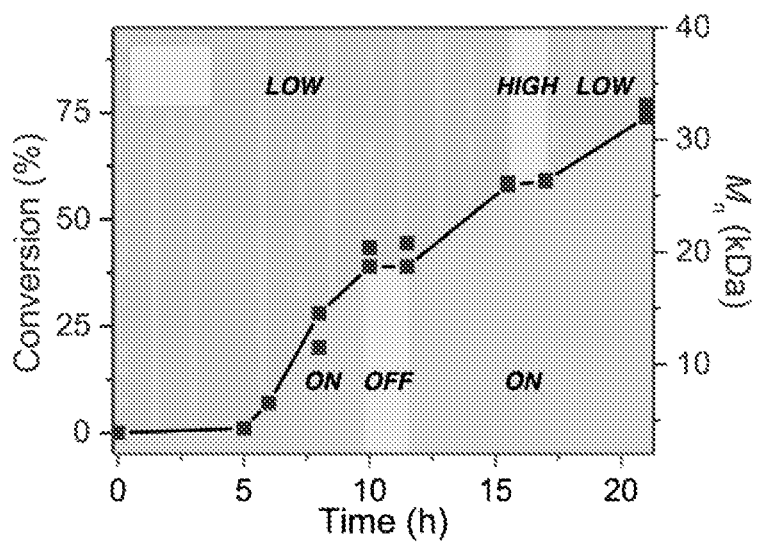

In certain embodiments, the polymerization is controlled simultaneously by multiple stimuli. In one embodiment, catalyst presence (IN/OUT) and light irradiation (ON/OFF) are the two stimuli simultaneously controlling the polymerization. When either catalyst was "OUT" or light was "OFF", the reaction was interrupted immediately with no significant increase in monomer conversion or $M_n$. In another embodiment, the two triggers were periodically switched between catalyst presence and light irradiation. For example, catalyst presence and light irradiation were shown to control a polymerization as depicted in FIG. 5A. In yet another embodiment, light irradiation (ON/OFF) and temperature (HIGH/LOW) are the two stimuli simultaneously controlling the polymerization. When either the reaction temperature was "HIGH", wherein the reaction temperature is above the LCST of the thermoresponsive gel, or light irradiation was "OFF", the reaction was interrupted immediately with no significant increase in monomer conversion or $M_n$. In another embodiment, the two triggers were periodically switched between temperature control and light irradiation. For example, catalyst presence and light irradiation were shown to control a polymerization as depicted in FIGS. 6A and 6B.

One aspect of the invention involves the use of Gel-PTH to enable photo-iniferter/RAFT polymerization. In another embodiment, Gel-PTH enables photo-ATRP. In yet another embodiment, Gel-PTH enables the production of homopolymers, block copolymers, random copolymers, gradient copolymers, star copolymers, linear polymers, and/or branched polymers.

Photo-Iniferter/RAFT Polymerization

As generally described herein, a photo-iniferter/RAFT polymerization can be used to prepare a polymer from an iniferter, one or more reactant monomer, and a thermoresponsive and photoresponsive gel. In one embodiment, the polymerization is reversibly activated and/or deactivated by controlling one of the following external control stimuli: temperature, light, and catalyst presence. In a certain embodiment, the thermoresponsive and photoresponsive gel is Gel-PTH.

In certain embodiments, photo-iniferter/RAFT polymerization is carried out in the presence of an iniferter. Those skilled in the art will recognize that an iniferter is a chemical compound that simultaneously acts as a initiator, transfer agent, and terminator for radical polymerization reactions. In certain embodiments, the iniferter is a dithiobenzoate. In certain embodiments, the iniferter is a dithiobenzoate selected from the group consisting of benzyl benzodithioate, cyanomethyl benzodithioate, 4-cyano-4-(phenylcarbonothioylthio)pentanoic acid, 4-cyano-4-(phenylcarbonothioylthio)pentanoic acid N-succinimidyl ester, 2-cyano-2-propyl benzodithioate, 2-cyano-2-propyl 4-cyanobenzodithioate, ethyl 2-(4-methoxyphenylcarbonothioylthio)acetate, ethyl 2-methyl-2-(phenylthiocarbonylthio)propionate, ethyl 2-(phenylcarbonothioylthio)-2-phenylacetate, ethyl 2-(phenylcarbonothioylthio)propionate, 1-(methoxycarbonyl)ethyl benzodithioate, 2-(4-methoxyphenylcarbonothioylthio)ethanoic acid, 2-nitro-5-(2-propynyloxy)benzyl 4-cyano-4-(phenylcarbonothioylthio)pentanoate, 2-(phenylcarbonothioylthio)propanoic acid, and 2-phenyl-2-propyl benzodithioate. In certain embodiments, the iniferter is a dithiocarbamate. In certain embodiments, the iniferter is a dithiocarbamate selected from the group consisting of benzyl 1H-pyrrole-1-carbodithioate, cyanomethyl diphenylcarbamodithioate, cyanomethyl methyl(phenyl)carbamodithioate, cyanomethyl methyl(4-pyridyl)carbamodithioate, 2-cyanopropan-2-yl N-methyl-N-(pyridin-4-yl)carbamodithioate, methyl 2-[methyl(4-pyridinyl)carbamothioylthio]propionate, and 1-succinimidyl-4-cyano-4-[N-methyl-N-(4-pyridyl)carbamothioylthio]pentanoate. In certain embodiments, the iniferter is a xanthate. In certain embodiments, the iniferter is a xanthate selected from a group consisting of ethyl 2-(((ethylthio)carbonothioyl)thio)propanoate, methyl (4-methoxyphenoxy)carbonothioylsulfanyl acetate, methyl (methoxycarbonothioyl)sulfanyl acetate, methyl (ethoxycarbonothioyl)sulfanyl acetate, and methyl (isopropoxycarbonothioyl)sulfanyl acetate. In certain embodiments, the iniferter is a trithiocarbonate. In certain embodiments, the iniferter is a trithiocarbonate selected from the group consisting of 3,5-bis(2-dodecylthiocarbonothioylthio-1-oxopropoxy)benzoic acid, 2-cyanobutan-2-yl 4-chloro-3,5-dimethyl-1H-pyrazole-1-carbodithioate, 2-cyanobutanyl-2-yl 3,5-dimethyl-1H-pyrazole-1-carbodithioate, 4-cyano-4-[(dodecylsulfanylthiocarbonyl)sulfanyl]pentanoic acid, 4-cyano-4-[(dodecylsulfanylthiocarbonyl) sulfanyl]pentanol, cyanomethyl (3,5-dimethyl-1H-pyrazole)-carbodithioate, cyanomethyl dodecyl trithiocarbonate, cyanomethyl [3-(trimethoxysilyl)propyl] trithiocarbonate, 2-cyano-2-propyl dodecyl trithiocarbonate, S,S-dibenzyl trithiocarbonate, 2-(dodecylthiocarbonothioylthio)propionic acid, 2-(dodecylthiocarbonothioylthio)-2-methylpropionic acid 3-azido-1-propanol ester, 2-(dodecylthiocarbonothioylthio)-2-methylpropionic acid N-hydroxysuccinimide ester, 2-(dodecylthiocarbonothioylthio)-2-methylpropionic acid pentafluorophenyl ester, phthalimidomethyl butyl trithiocarbonate, methyl 2-(dodecylthiocarbonothioylthio)-2-methylpropionate, 2,2'-(thiocarbonylbis(sulfanediyl))bis(2-methylpropanoic acid) (TTC-1), dibenzyl 2,2'-(thiocarbonylbis(sulfanediyl))bis(2-methylpropanoate) (TTC-2), dibenzyl 2,2'-(thiocarbonylbis(sulfanediyl))dipropionate (TTC-3), and 2-(((dodecylthio)carbonothioyl)thio)propanoic acid (TTC-4).

In certain embodiments, RAFT polymerization is carried out in the presence of a chain transfer agent. Those skilled in the art will recognize that an chain transfer agent is a chemical compound that is able to react with a chain carrier by a reaction in which the original chain carrier is deactivated and a new chain carrier is generated. In certain embodiments, the chain transfer agent is a dithiobenzoate. In certain embodiments, the chain transfer agent is a dithiobenzoate selected from the group consisting of benzyl benzodithioate, cyanomethyl benzodithioate, 4-cyano-4-(phenylcarbonothioylthio)pentanoic acid, 4-cyano-4-(phenylcarbonothioylthio)pentanoic acid N-succinimidyl ester, 2-cyano-2-propyl benzodithioate, 2-cyano-2-propyl 4-cyanobenzodithioate, ethyl 2-(4-methoxyphenylcarbonothioylthio)acetate, ethyl 2-methyl-2-(phenylthiocarbonylthio)propionate, ethyl 2-(phenylcarbonothioylthio)-2-phenylacetate, ethyl 2-(phenylcarbonothioylthio)propionate, 1-(methoxycarbonyl)ethyl benzodithioate, 2-(4-methoxyphenylcarbonothioylthio)ethanoic acid, 2-nitro-5-(2-propynyloxy)benzyl 4-cyano-4-(phenylcarbonothioylthio)pentanoate, 2-(phenylcarbonothioylthio)propanoic acid, and 2-phenyl-2-propyl benzodithioate. In certain embodiments, the chain transfer agent is a dithiocarbamate. In certain embodiments, the chain transfer agent is a dithiocarbamate selected from the group consisting of benzyl 1H-pyrrole-1-carbodithioate, cyanomethyl diphenylcarbamodithioate, cyanomethyl methyl(phenyl)carbamodithioate, cyanomethyl methyl(4-pyridyl)carbamodithioate, 2-cyanopropan-2-yl N-methyl-N-(pyridin-4-yl)carbamodithioate, methyl 2-[methyl(4-pyridinyl)carbamothioylthio]propionate, and 1-succinimidyl-4-cyano-4-[N-methyl-N-(4-pyridyl)carbamothioylthio]pentanoate. In certain embodiments, the chain transfer agent is a xanthate. In certain embodiments, the chain transfer agent is a xanthate selected from a group consisting of ethyl 2-(((ethylthio)carbonothioyl)thio)propanoate, methyl (4-methoxyphenoxy)carbonothioylsulfanyl acetate, methyl (methoxycarbonothioyl)sulfanyl acetate, methyl (ethoxycarbonothioyl)sulfanyl acetate, and methyl (isopropoxycarbonothioyl)sulfanyl acetate. In certain embodiments, the chain transfer agent is a trithiocarbonate. In certain embodiments, the chain transfer agent is a trithiocarbonate selected from the group consisting of 3,5-bis(2-dodecylthiocarbonothioylthio-1-oxopropoxy)benzoic acid, 2-cyanobutan-2-yl 4-chloro-3,5-dimethyl-1H-pyrazole-1-carbodithioate, 2-cyanobutanyl-2-yl 3,5-dimethyl-1H-pyrazole-1-carbodithioate, 4-cyano-4-[(dodecylsulfanylthiocarbonyl)sulfanyl]pentanoic acid, 4-cyano-4-[(dodecylsulfanylthiocarbonyl) sulfanyl]pentanol, cyanomethyl (3,5-dimethyl-1H-pyrazole)-carbodithioate, cyanomethyl dodecyl trithiocarbonate, cyanomethyl [3-(trimethoxysilyl)propyl] trithiocarbonate, 2-cyano-2-propyl dodecyl trithiocarbonate, S,S-dibenzyl trithiocarbonate, 2-(dodecylthiocarbonothioylthio)propionic acid, 2-(dodecylthiocarbonothioylthio)-2-methylpropionic acid 3-azido-1-propanol ester, 2-(dodecylthiocarbonothioylthio)-2-methylpropionic acid N-hydroxysuccinimide ester, 2-(dodecylthiocarbonothioylthio)-2-methylpropionic acid pentafluorophenyl ester, phthalimidomethyl butyl trithiocarbonate, methyl 2-(dodecylthiocarbonothioylthio)-2-methylpropionate, 2,2'-(thiocarbonylbis(sulfanediyl))bis(2-methylpropanoic acid) (TTC-1), dibenzyl 2,2'-(thiocarbonylbis(sulfanediyl))bis(2-methylpropanoate) (TTC-2), dibenzyl 2,2'-(thiocarbonylbis(sulfanediyl))dipropionate (TTC-3), and 2-(((dodecylthio)carbonothioyl)thio)propanoic acid (TTC-4).

In certain embodiments, photo-iniferter/RAFT polymerization is carried out in the presence of one or more reactant monomers. In certain embodiments, the reactant monomer is a compound containing an alkenyl group. In certain embodiments, the reactant monomer is a styrene. In certain embodiments, the styrene is selected from the group consisting of styrene, 4-vinylanisole, 4-acetoxystyrene, 4-tert-butoxystyrene, 4-fluorostyrene, 3-nitrostyrene, α-methylstyrene, methylstyrene, and 4-tert-butylstyrene. In certain embodiments, the reactant monomer is an acrylate. In certain embodiments, the acrylate is selected from the group consisting of 2-chloroethyl acrylate, methyl acrylate, ethyl acrylate, tert-butyl acrylate, butyl acrylate, ethylene glycol methyl ether acrylate, 2-hydroxyethyl acrylate, lauryl acrylate, methyl α-bromoacrylate, tert-butyl 2-bromoacrylate, glycidyl methacrylate, pentafluorophenyl methacrylate, methacrylic acid N-hydroxysuccinimide ester, tert-butyl methacrylate, isobutyl methacrylate, ethyl methacrylate, and methyl methacrylate. In certain embodiments, the reactant monomer is an acrylamide. In certain embodiments, the acrylamide is selected from the group consisting of N,N-dimethylacrylamide, N-isopropylacrylamide, N-tert-butylacrylamide, N-hydroxyethyl acrylamide, N-(3-methoxypropyl)acrylamide, N-phenylacrylamide, methacrylamide, N-isopropylmethacrylamide, N-[3-(dimethylamino)propyl] methacrylamide, and 7-[4-(trifluoromethyl)coumarin]methacrylamide. In certain embodiments, the reactant monomer is a vinyl ester. In certain embodiments, the vinyl ester is selected from the group consisting of vinyl acetate, vinyl propionate, vinyl pivalate, vinyl neodecanoate, vinyl decanoate, vinyl stearate, vinyl chloroformate, and vinyl benzoate. In certain embodiments, the reactant monomer is a vinyl amide. In certain embodiments, the vinyl amide is selected from, the group consisting of N-vinylpyrrolidone, N-vinylformamide, and N-methyl-N-vinylacetamide.

In certain embodiments, the photo-iniferter/RAFT polymerization reaction is carried out in a solvent. Any solvent may be used, and the scope of the method is not limited to any particular solvent. The solvent may be polar or non-polar, protic or aprotic, or a combination of solvents (e.g., co-solvents). In certain embodiments, the solvent is acetonitrile. In certain embodiments, the solvent is DMSO. In certain embodiments, the solvent is DMF.

In certain embodiments, the photo-iniferter/RAFT polymerization enables the production of homopolymers, block copolymers, random copolymers, gradient copolymers, star copolymers, linear polymers, and/or branched polymers.

Photo-ATRP

As generally described herein, a photo-ATRP can be used to prepare a polymer from an initiator, one or more reactant monomers, and a thermoresponsive and photoresponsive gel. In one embodiment, the polymerization is reversibly activated and/or deactivated by controlling one of the following external control stimuli: temperature, light, and catalyst presence. In another embodiment, the thermoresponsive and photoresponsive gel is Gel-PTH.

In certain embodiments, the photo-ATRP reaction is carried out in the presence of an initiator. Those skilled in the art will recognize that an initiator refers to a chemical compound that can produce radical species and/or promote radical reactions for radical polymerization reactions. In certain embodiments, the initiator is an alkyl halide. In certain embodiments, the alkyl halide is selected from the group consisting of ethyl 2-bromo-2-phenylacetate, dodecyl 2-bromoisobutyrate, ethyl 2-bromoisobutyrate, ethyl 2-bromopropionate, 2-hydroxyethyl 2-bromoisobutyrate, octadecyl 2-bromoisobutyrate, 2-(2-bromoisobutyryloxy)ethyl methacrylate, 1-bromoethylbenzene, 2-bromoisobutanoic acid N-hydroxysuccinimide ester, 2-bromoisobutyric anhydride, 2-azidoethyl 2-bromoisobutyrate, bis[2-(2'-bromoisobutyryloxy)ethyl]disulfide, and bis[2-(2-bromoisobutyryloxy)undecyl]disulfide.

In certain embodiments, the photo-ATRP reaction is carried out in the presence of one or more reactant monomers. In certain embodiments, the reactant monomer is a compound containing an alkenyl group. In certain embodiments, the reactant monomer is a styrene. In certain embodiments, the styrene is selected from the group consisting of styrene, 4-vinylanisole, 4-acetoxystyrene, 4-tert-butoxystyrene, 4-fluorostyrene, 3-nitrostyrene, α-methylstyrene, methylstyrene, and 4-tert-butylstyrene. In certain embodiments, the reactant monomer is an acrylate. In certain embodiments, the acrylate is selected from the group consisting of 2-chloroethyl acrylate, methyl acrylate, ethyl acrylate, tert-butyl acrylate, butyl acrylate, ethylene glycol methyl ether acrylate, 2-hydroxyethyl acrylate, lauryl acrylate, methyl α-bromoacrylate, tert-butyl 2-bromoacrylate, glycidyl methacrylate, pentafluorophenyl methacrylate, methacrylic acid N-hydroxysuccinimide ester, tert-butyl methacrylate, isobutyl methacrylate, ethyl methacrylate, and methyl methacrylate. In certain embodiments, the reactant monomer is an acrylamide. In certain embodiments, the acrylamide is selected from the group consisting of N,N-dimethylacrylamide, N-isopropylacrylamide, N-tert-butylacrylamide, N-hydroxyethyl acrylamide, N-(3-methoxypropyl)acrylamide, N-phenylacrylamide, methacrylamide, N-isopropylmethacrylamide, N-[3-(dimethylamino)propyl]methacrylamide, and 7-[4-(trifluoromethyl)coumarin] methacrylamide. In certain embodiments, the reactant monomer is a vinyl ester. In certain embodiments, the vinyl ester is selected from the group consisting of vinyl acetate, vinyl propionate, vinyl pivalate, vinyl neodecanoate, vinyl decanoate, vinyl stearate, vinyl chloroformate, and vinyl benzoate. In certain embodiments, the reactant monomer is a vinyl amide. In certain embodiments, the vinyl amide is selected from the group consisting of N-vinylpyrrolidone, N-vinylformamide, and N-methyl-N-vinylacetamide.

In certain embodiments, the photo-ATRP reaction is carried out in a solvent. Any solvent may be used, and the scope of the method is not limited to any particular solvent. The solvent may be polar or non-polar, protic or aprotic, or a combination of solvents (e.g., co-solvents). In certain embodiments, the solvent is DMSO.

In certain embodiments, the photo-ATRP enables the production of homopolymers, block copolymers, random copolymers, gradient copolymers, star copolymers, linear polymers, and/or branched polymers.

Method to Recycle Photo-CRP Catalyst

The present invention provides a method for recycling and reusing thermoresponsive and photoresponsive gels which become heterogeneous based upon LCST behavior, such as Gel-PTH. For example, Gel-PTH can be removed from a completed photo-CRP reaction, optionally, rinsed with solvent, and then reintroduced into the same photo-CRP reaction or added into another photo-CRP reaction.

In one embodiment, the same Gel-PTH may be used for multiple photo-CRP reactions (e.g., 2, 3, 4, 5, 6, 7, 8, 9, 10, or more reactions). Each of the reactions may involve other stimuli and other conditions (e.g., duration). In another embodiments, the same piece of Gel-PTH was used for six photo-CRP reactions all run for the same amount of time with extensive washing between each cycle. The resulting polymer products had almost the same $M_n$ (20.9-21.6 kDa) and $M_w/M_n$ (1.13-1.16) values.

In certain embodiments, the solvent used to wash Gel-PTH is acetonitrile.

In certain embodiments, the photo-CRP reaction is a photo-iniferter/RAFT polymerization. In certain embodiments, the photo-CRP reaction is a photo-ATRP.

In certain embodiments, the photo-iniferter/RAFT polymerization enables the production of homopolymers, block copolymers, random copolymers, gradient copolymers, star copolymers, linear polymers, and/or branched polymers.

In certain embodiments, the photo-CRP reaction is carried out in a solvent. Any solvent may be used, and the scope of the method is not limited to any particular solvent. The solvent may be polar or non-polar, protic or aprotic, or a combination of solvents (e.g., co-solvents). In certain embodiments, the solvent is acetonitrile.

Kits

The present invention provides kits useful in the preparation of homopolymers, block copolymers, random copolymers, gradient copolymers, star copolymers, linear polymers, and/or branched polymers using the thermoresponsive and photoresponsive gel described herein. For example, in certain embodiments, the kit includes a thermoresponsive and photoresponsive gel, an iniferter or initiator, one or more organic monomers, a light source, and optionally, instructions for use. In certain embodiments, the kit comprises an organic iniferter. In certain embodiments, the kit comprises an organic initiator. The kit may also comprise one or more reagents useful in any of the methods provided herein.

Examples

In order that the invention described herein may be more fully understood, the following examples are set forth. The synthetic examples described in this application are offered to illustrate the compounds and methods provided herein and are not to be construed in any way as limiting their scope.

Materials and Methods

All manipulations were performed using flame-dried glassware and standard Schlenk techniques under an atmosphere of nitrogen, unless otherwise stated.

Chromatography

Column chromatography was carried out using Silicycle SiliaFlashP60 (230-400 mesh) silica gel. Dialysis membrane (Spectra/Por, 1 kDa) was purchased from Spectrum Laboratories, and was washed with pure water for 3 times before use.

Gel permeation chromatography (GPC) measurements were performed on an Agilent 1260 (LC) system with two Shodex KD-806M GPC columns in series at 60° C. and a flow rate of 1 mL/min. HPLC grade dimethylformamide (DMF) with 0.025 M LiBr (anhydrous, purchased from Sigma-Aldrich Company) was used as the eluent.

Spectroscopy, Instruments, and Equipment

Nuclear magnetic resonance (NMR) spectra were recorded on either a Bruker AMX 400 MHz or a Varian Inova 500 MHz NMR spectrometer. $^1$H NMR signals were measured relative to the signal for residual chloroform (7.26 ppm) in deuterochloroform (CDCl$_3$), or dichloromethane (5.33 ppm) in deuterodichloromethane (CD$_2$Cl$_2$), and are reported in δ units, parts per million (ppm). $^{13}$C NMR signals were obtained with $^1$H decoupling, and are reported in ppm units relative to CDCl$_3$ (77.16 ppm).

A T-rEX refractive index detector (Wyatt) and a DAWN EOS 18 angle light scattering (MALS) detector (Wyatt) were used for polymer analysis. Matrix-assisted laser desorption/ionization time-of-flight (MALDI-TOF) spectra were obtained with a Bruker model MicroFlex MALDI-TOF at the Koch Institute of MIT.

Infrared (IR) spectra were obtained on a Thermo Scientific-Nicolet iS5 spectrometer (iD5 ATR-diamond).

Ultraviolet-visible (UV-vis) spectra were obtained from a Varian Cary 50 Scan UV-visible spectrophotometer.

High-resolution mass spectrometry (HRMS) data were measured on a Bruker Daltonics APEXIV 4.7 Tesla Fourier Transform Ion Cyclotron Resonance Mass Spectrometer (FT-ICR-MS) using an electrospray ionization (ESI) source.

Compact fluorescent light bulbs (14 w CFL bulbs) were purchased from GE Lighting (see: www.gelighting.com/na/) and were used as purchased.

For rheology studies, a freestanding gel was placed on an AR 2000 Controlled Strain Rheometer from TA Instruments equipped with a peltier temperature control using a 8 mm diameter parallel aluminum plate. Strain amplitudes from 0.1% to 2% were determined to lie within the linear viscoelastic region (LVR) via an oscillatory strain sweep at a fixed angular frequency (10 rad/s). At the beginning of the oscillatory frequency sweep study, a 0.5 N normal force was applied to the gel. After 30 s of equilibration, the storage modulus (G') was recorded at a strain of 0.5% as a function of angular frequency. G' values provided in the main text were recorded at 10 rad/s.

Monomers

Acrylates, methacrylates, acrylamides, vinyl esters, vinyl amides and solvents were purchased from Sigma-Aldrich Inc. N-isopropylacrylamide (NIPAAM) and N,N'-methylenebisacrylamide (MBAA) were recrystallized for 3 times before use. Liquid monomers N,N-dimethylacrylamide (DMA), n-butyl acrylate (nBA), methyl acrylate (MA), ethylene glycol methyl ether acrylate (EGMEA), 2-hydroxyethyl acrylate (HEA), methyl methacrylate (MMA), t-butyl methacrylate (MtBA), vinyl acetate (VAc) and N-vinylpyrrolidone (NVP) were passed through plugs of basic alumina and filtered before use.

Syntheses of Gel-PTH

Scheme 1: Synthesis of the PTH Catalyst Bonded Polymer Network

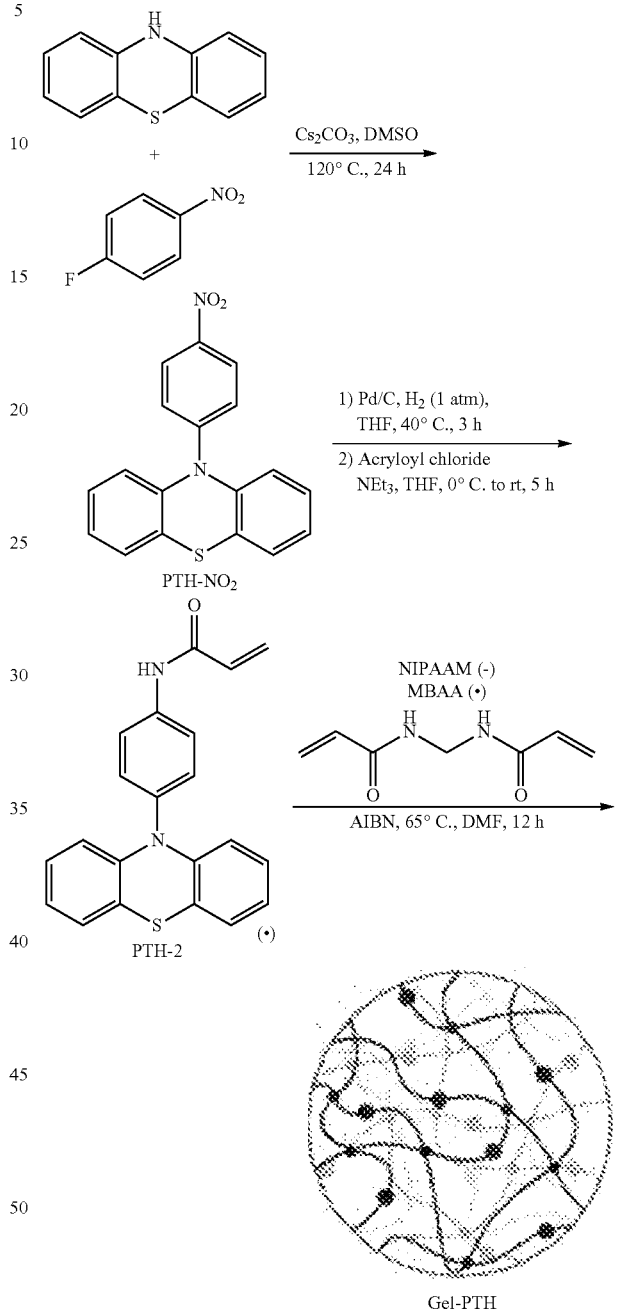

Gel-PTH

Synthesis of 10-(4-nitrophenyl)-phenothiazine (PTH-NO$_2$)

Figure 11A:
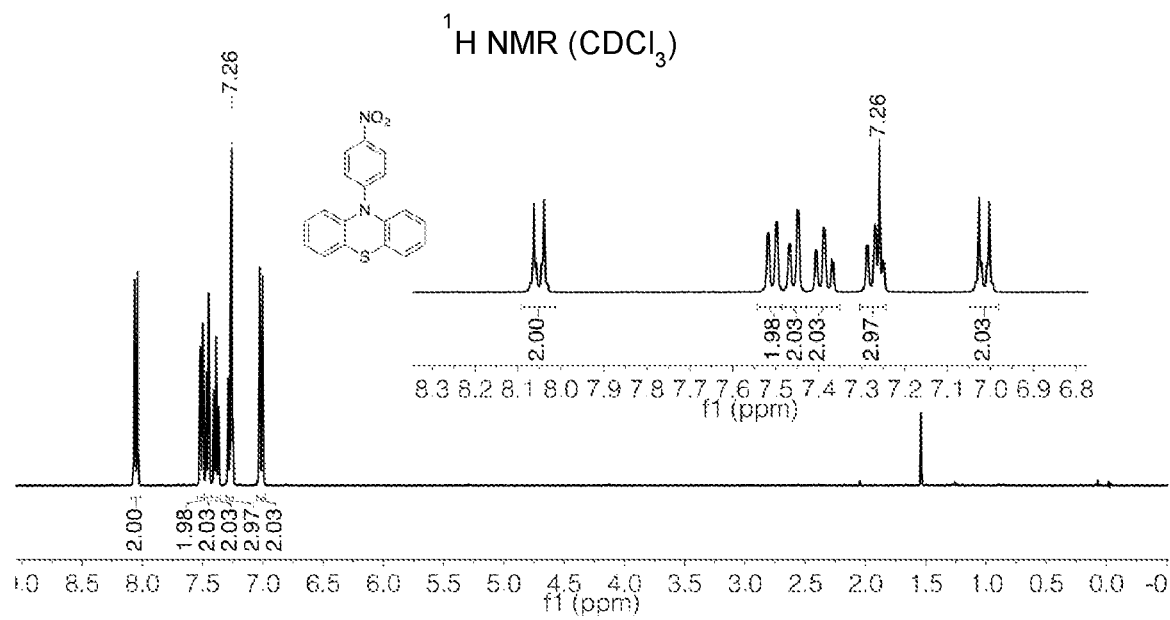
FIGS. 11A to 11B. $^1$H NMR (FIG. 11A) and carbon-13 nuclear magnetic resonance ($^{13}$C NMR) (FIG. 11B) spectra of PTH-NO$_2$. The structure of PTH-NO$_2$ is shown in Scheme 1.
Figure 11B:
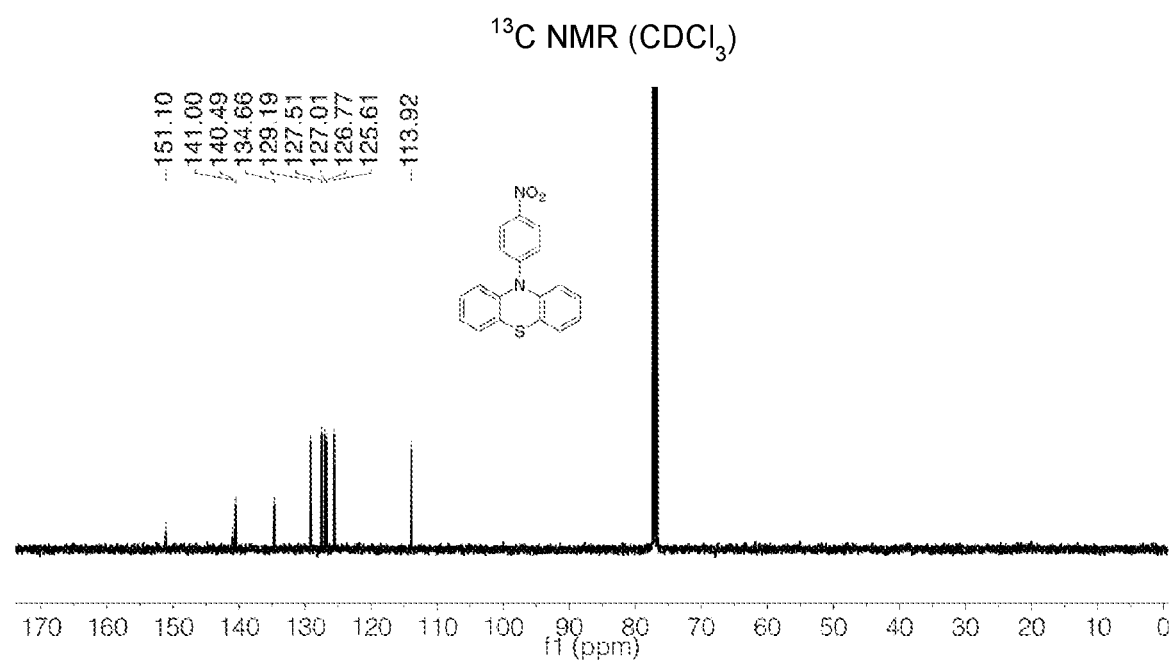

An oven-dried round bottom flask was charged with 1-fluoro-4-nitrobenzene (3.2 g, 22.5 mmol), phenothiazine (3.0 g, 15 mmol), Cs$_2$CO$_3$ (9.8 g, 30 mmol) and a stir bar. Then, 20 mL anhydrous DMSO was added, the reaction mixture was stirred at 120° C. for 24 h. After phenothiazine was completely consumed as monitored by TLC, the reaction mixture was treated with water. The water layer was extracted with EtOAc 3 times. The combined organic layer was washed with brine, dried over Na$_2$SO4, and concentrated under vacuum. The obtained orange mixture was recrystallized from EtOH to afford 4.1 g 10-(4-nitrophenyl)-phenothiazine (PTH-NO$_2$) in 85% isolated yield as a yellow solid. H NMR (400 MHz, CDCl$_3$) δ: 8.05 (d, J=8.0 Hz, 2H), 7.51 (d, J=8.0 Hz, 2H), 7.46 (d, J=8.0 Hz, 2H), 7.39 (t, J=8.0 Hz, 2H), 7.27 (t, J=8.0 Hz, 2H), 7.02 (d, J=8.0 Hz, 2H) ppm; 13C NMR (100 MHz, CDCl$_3$) δ: 151.1, 141.0, 140.5, 134.7, 129.2, 127.5, 127.0, 126.8, 125.6, 113.9 ppm. The resulting $^1$H NMR and $^{13}$C NMR are shown in FIGS. 11A to 11B, respectively.

Scheme 2: Synthesis of N-(4-(10H-Phenothiazin-10-yl)phenyl)acetamide (PTH-1)

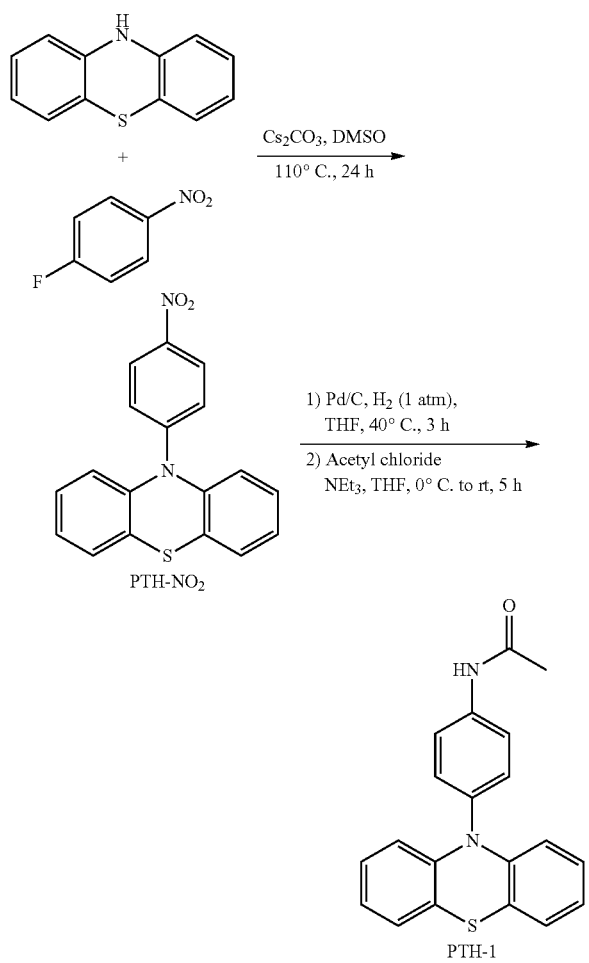

An oven-dried round bottom flask was charged with PTH-NO$_2$ (640 mg, 2 mmol), Pd/C (50 mg), anhydrous THF (10 mL), and a stir bar. The flask was then filled with H$_2$ gas from a balloon. The mixture was stirred at 40° C. overnight. As monitored with TLC, the starting material was completely consumed. Then, the mixture was filtered to remove Pd/C powder. The resulted solution was transferred into a dry round-bottom flask charged with a stir bar, and directly used in the next step.

Figure 12A:
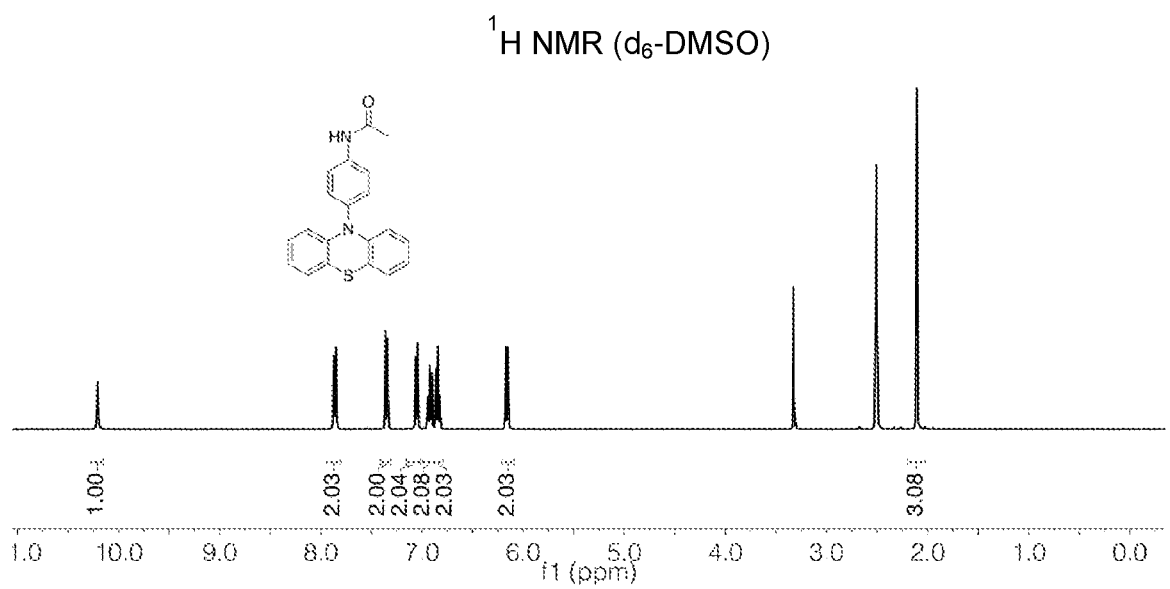
FIGS. 12A to 12B. $^1$H NMR (FIG. 12A) and $^{13}$C NMR (FIG. 12B) spectra of PTH-1. The structure of PTH-1 is shown in Scheme 2.
Figure 12B:
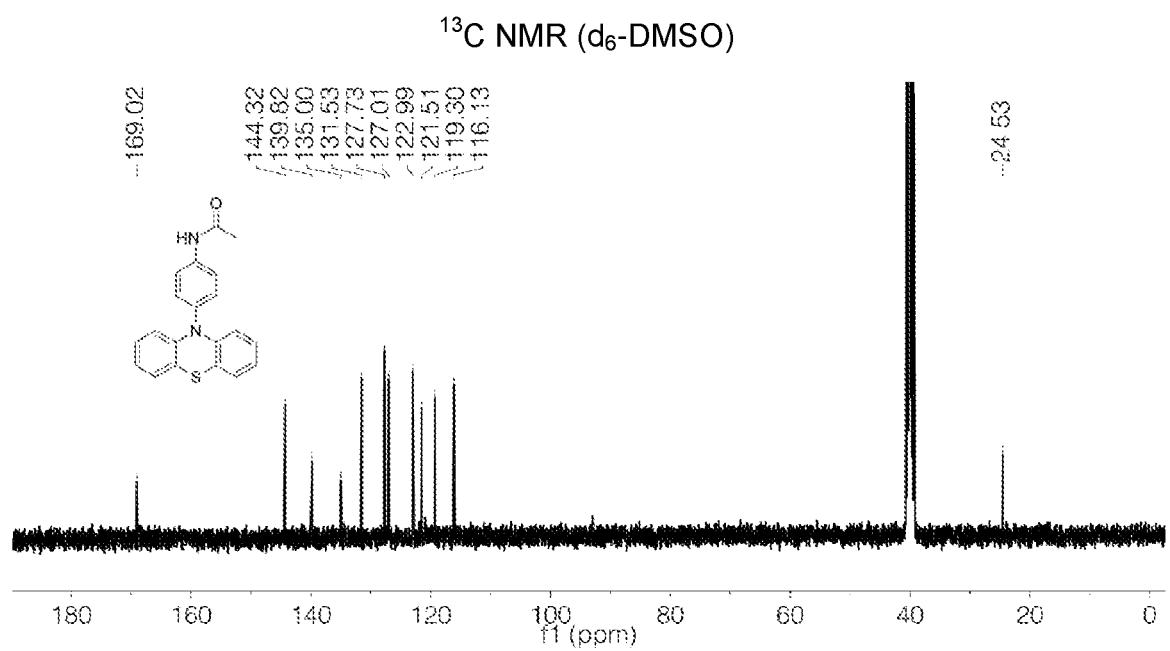

Following the above step, acetyl chloride (314 mg, 4 mmol) and NEt$_3$ (505 mg, 5 mmol) were added into the vessel. The mixture was allowed to stir at room temperature overnight. After the reaction, the mixture was concentrated to dryness, and treated with water and EtOAc. The separated water layer was extracted with EtOAc three times. The combined organic layer was washed with brine, dried over Na$_2$SO$_4$, and concentrated to dryness. The obtained mixture was purified by column chromatography on silica gel (0-20% EtOAc in Hexanes) to afford 604 mg (91% isolated yield) PTH-1 as a white solid. $^1$H NMR (400 MHz, d$_6$-DMSO) δ: 10.2 (s, 1H), 7.85 (d, J=8.0 Hz, 2H), 7.34 (d, J=8 Hz, 2H), 7.04 (d, J=8.0 Hz, 2H), 6.91 (t, J=8.0 Hz, 2H), 6.83 (t, J=8.0 Hz, 2H), 6.15 (d, J=8.0 Hz, 2H), 2.10 (s, J=3H) ppm; $^{13}$C NMR (100 MHz, d$_6$-DMSO) δ: 169.0, 144.3, 139.8, 135.0, 131.5, 127.7, 127.0, 123.0, 121.5, 119.3, 116.1, 24.5 ppm. IR (neat, cm$^1$): 3312, 1671, 1602, 1532, 1509, 1457, 1436, 1300, 1253, 1042, 914, 744. HRMS (ESI) C$_{20}$H$_{16}$N$_2$OS m/z: Calcd for [M+H]+: 333.1056, Found: 333.1054. The resulting $^1$H NMR and $^{13}$C NMR are shown in FIGS. 12A to 12B, respectively.

Cyclic Voltammetry (CV) Experiment with PTH-1

Figure 13:
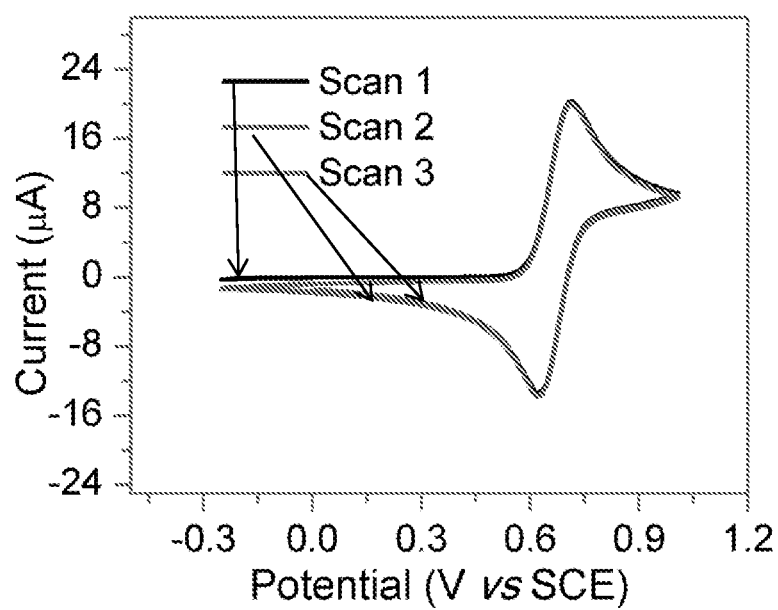
FIG. 13. Cyclic voltammetry of PTH-1.

Cyclic voltammetry was carried out on a VMP Multi-channel Potentiostat with EC lab software using 0.1 M tetrabutylammonium hexafluorophosphate as electrolyte in acetonitrile at 25° C. with a standard calomel reference electrode (E$^{ox}$=+0.68 V vs. SCE). The results are shown in FIG. 13.

Synthesis of N-(4-(10H-phenothiazin-10-yl)phenyl) acrylamide (PTH-2)

The synthesis of acrylamide-substituted PTH-2 is shown in Scheme 1. Nucleophilic aromatic substitution of 1-fluoro-4-nitrobenzene with phenothiazine produced 10-(4-nitrophenyl)-phenothiazine in 85% isolated yield after recrystallization from ethanol. Next, the nitro group was reduced to an amine via exposure to hydrogen in the presence of Pd/C catalyst. After filtering off the Pd/C, the mixture was directly treated with acryloyl chloride and triethylamine to produce acrylamide functionalized PTH-2 in 92% isolated yield after by column chromatography.

With PTH-2 in hand, N-isopropylacrylamide (NIPAAM) was selected as a co-monomer for gel formation due to the good solubility of poly N-isopropylacrylamide (poly(NI-PAAM)) in many organic solvents and its lower critical solution temperature (LCST) behavior in water. In the event, NIPAAM was copolymerized with PTH-2 and N,N'-methylenebisacrylamide (MBAA) (molar ratio of NIPAAMlPTH-2=30/1) at 70° C. using azobisisobutyronitrile (AIBN) as a free radical initiator (see supporting information for experimental details). The afforded material (Gel-PTH) was extracted with dimethylformamide (DMF) at least five times to remove unreacted monomers. Proton nuclear magnetic resonance ($^1$H NMR) spectroscopy and gas chromatography (GC) analysis of the concentrated DMF extracts indicated that the conversions of both NIPAAM and PTH-2 were above 98%.

An oven-dried round bottom flask was charged with PTH-NO$_2$ (640 mg, 2 mmol), Pd/C (50 mg), anhydrous THF solvent (10 mL), and a stir bar. The flask was then filled with H$_2$ gas with a balloon. The mixture was stirred at 40° C. overnight. As monitored with TLC, the starting material was completely consumed. Then, the mixture was filtered to remove Pd/C powder. The resulting solution was transferred into a dry round-bottom flask with a stir bar, and was directly used in the next step.

Figure 14A:
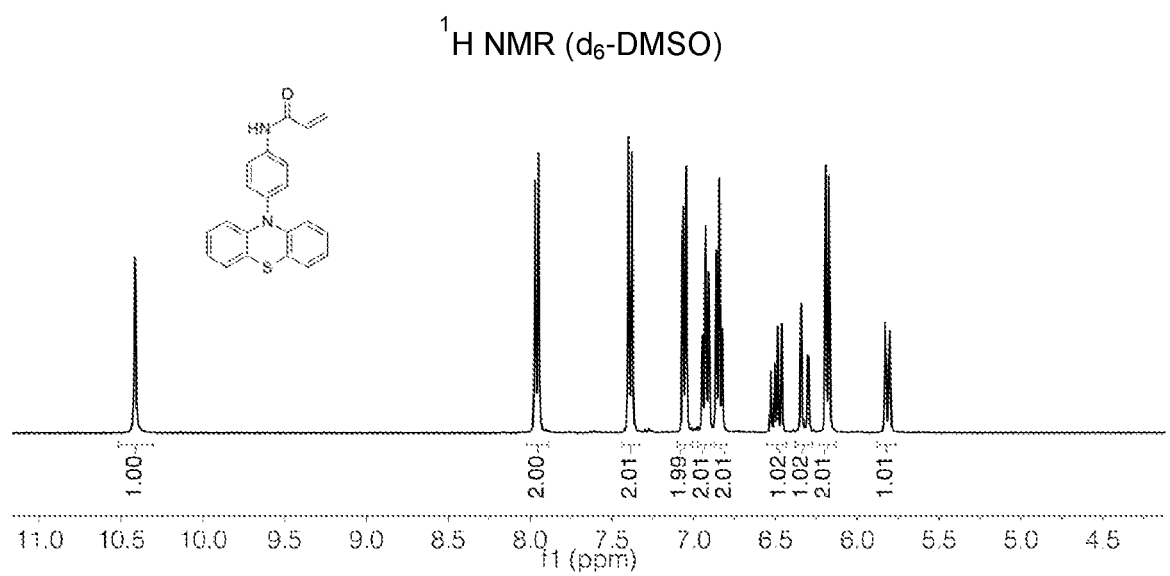
FIGS. 14A to 14B. $^1$H NMR (FIG. 14A) and $^{13}$C NMR (FIG. 14B) spectra of PTH-2. The structure of PTH-2 is shown in Scheme 1.
Figure 14B:
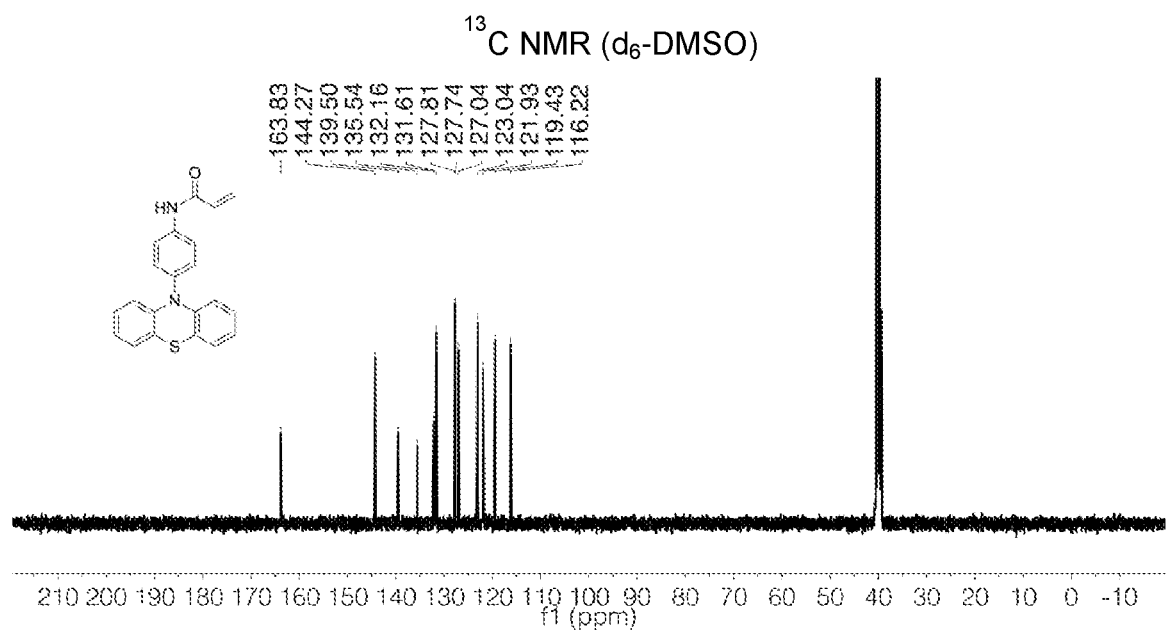

Following the above, acryloyl chloride (360 mg, 4 mmol) and NEt$_3$ (505 mg, 5 mmol) were added into the vessel. The mixture was allowed to stir at room temperature overnight. After the reaction, the mixture was concentrated to dryness, and treated with water and EtOAc. The separated water layer was extracted with EtOAc three times. The combined organic layer was washed with brine, dried over $Na_2SO_4$, and concentrated to dryness. The obtained mixture was purified by column chromatography on silica gel (0-20% EtOAc in Hexanes) to afford 633 mg (92% isolated yield) PTH-2 as a white solid. $^1$H NMR (400 MHz, $d_6$-DMSO) δ: 10.4 (s, 1H), 7.96 (d, J=8.0 Hz, 2H), 7.39 (d, J=8 Hz, 2H), 7.05 (d, J=8.0 Hz, 2H), 6.93 (t, J=8.0 Hz, 2H), 6.85 (t, J=8.0 Hz, 2H), 6.50 (dd, J=16.0 Hz, 12.0 Hz, 1H), 6.33 (d, J=16.0 Hz, 1H), 6.18 (d, J=8.0 Hz, 2H), 5.82 (d, J=12.0 Hz, 1H) ppm; $^{13}$C NMR (100 MHz, $d_6$-DMSO) δ: 163.8, 144.3, 139.5, 135.5, 132.2, 131.6, 127.8, 127.7, 127.0, 123.0, 121.9, 119.4, 116.2 ppm. IR (neat, cm$^1$): 1737, 1662, 1538, 1457, 1411, 1297, 1234, 1045, 960, 914, 836, 745. HRMS (ESI) $C_{21}H_{16}N_2OS$ m/z: Calcd for [M+H]$^+$: 345.1056, Found: 345.1071. The resulting $^1$H NMR and $^{13}$C NMR are shown in FIGS. 14A to 14B, respectively.

Synthesis of Gel-PTH

To incorporate PTH into a polymer network, a para-acrylamide substituent was installed onto the 10-phenyl ring of PTH to provide PTH-2 (Scheme 1). Polymerization of PTH-2 would produce poly(acrylamide) with PTH groups linked to the polymer backbone via an amide. Thus, to investigate the impact of this amide linkage on the properties of PTH, First, 4-acetamide-PTH (PTH-1) was synthesized as a model compound to study the electrochemistry and photochemistry of the target catalyst (Scheme 2). Notably, the Hammett substituent constant for para-acetamide is $σ_p$=0.00, which suggests that this substituent should have little effect on the properties of PTH. Indeed, the oxidation potential for conversion of PTH-1 to PTH-1$^{•+}$ as measured by cyclic voltammetry (CV) was $E^{ox}$=+0.68 V vs. SCE (FIG. 1A), which is the same value observed for the parent molecule PTH. CV analysis for three cycles (FIG. 13) revealed that this oxidation is highly reversible, thus indicating that the resulting PTH-1 radical cation is quite stable. The photoluminescence maximum of PTH-1 was ~446 nm (FIG. 1B). From these data, the excited state reduction potential of PTH-1 was estimated to be $E_{1/2}$ (PTH-1$^{•+}$/PTH-1*)=−2.1 V, which is very similar to PTH and indicative of the highly reducing nature of these photo-catalysts.

Figure 3B:
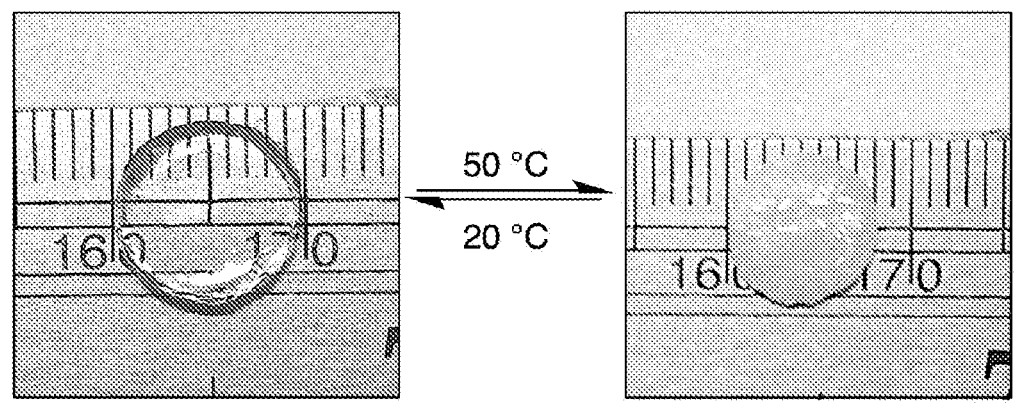

Gel-PTH is 86% poly(NIPAAM) by mass, and thus as expected it should display LCST behavior. In polymers that display LCST behavior, above the LCST the entropic penalty of polymer solvation outweighs favorable enthalpic interactions with solvent, thus causing the polymer to become insoluble. The switch from the soluble/swollen state to the insoluble/shrunken state could offer a temperature-dependent external switch for CRP. To demonstrate that Gel-PTH does indeed display LCST behavior, the G' of water-swollen samples was measured as a function of temperature. As shown in FIG. 3A, when the temperature was raised from 20° C. to 50° C., G' increased nearly 5 times from ~21 kPa to ~110 kPa, which is indicative of the LCST transition. Furthermore, this behavior was highly reversible as shown by the changes in G' and the loss modulus (G") when the temperature was cycled between 20° C. and 50° C. five times. Finally, optical images of the water swollen Gel-PTH at 20° C. and 50° C. (FIG. 3B) show that the material not only shrinks upon heating, but also undergoes a transparent-to-opaque transition. Thus, at room temperature in water, the gel is transparent and highly swollen, which should allow for initiators, monomers, and macromolecules to diffuse into the network during photo-CRP and be activated by photo-induced electron transfer; such diffusion is well-established in gels prepared via free radical polymerization, which have large heterogeneous pores. Above the LCST, the gel becomes hydrophobic, expelling solvent and becoming opaque, which should preclude photo-CRP or at least limit it to the gel surface where it would be much less efficient. Therefore, such a system could enable "AND" Logic-CRP with two external controls: light and a specific temperature range to operate.

A 2 mL oven-dried vial was charged with NIPAAM (50.9 mg, 0.45 mmol), MBAA (2.7 mg, 0.018 mmol), PTH-2 (5.2 mg, 0.015 mmol), AIBN (2.3 mg, 0.014 mmol), and anhydrous DMF (150 μL). Then, the vial was sealed with a rubber septum and the solution was deoxygenated with three freeze, pump, thaw cycles under N2 atmosphere. Then, the reaction mixture was heated to 70° C. for 16 h. After the reaction, the gel was removed from the vessel, and immersed in 100 mL DMF solvent. The DMF solvent was changed about 12 h later, and it was changed for at least five times at 12 h periods. The combined DMF was concentrated under vacuum. Butyl benzoate was added as an internal standard into the residue before H NMR analysis of the monomer conversion during the free radical copolymerization process. The synthesis of Gel-PTH is shown in Scheme 1.

Oxygen Free Gel-PTH Catalyst Material Preparation

A An oven-dried vial was charged with NIPAAM (50.9 mg, 0.45 mmol), MBAA (2.7 mg, 0.018 mmol), PTH-2 (5.2 mg, 0.015 mmol), AIBN (2.3 mg, 0.014 mmol) and anhydrous DMF (150 μL) in a glove box. Then, the reaction mixture was reacted at 70° C. for 16 h. After the reaction, the gel was taken out from the vessel and immersed in DMF solvent. The DMF solvent was changed at least five times. Then, the gel was immersed in MeCN, and the solvent was changed 5 times. Throughout this process, the gel was kept in dark.

Characterization of Gel-PTH

The obtained PTH-Gel was further immersed into the corresponding solvent and the solvent was changed for at least 5 fives to reach the equilibrium swollen state before for the modulus (G' and G") measurements. To prepare a dry PTH-Gel material, after the gel was taken out from DMF, it was subsequently immersed in MeCN. The solvent was changed 5 times to reach equilibrium. Then, the gel was evaporated to dryness.

Figure 15A:
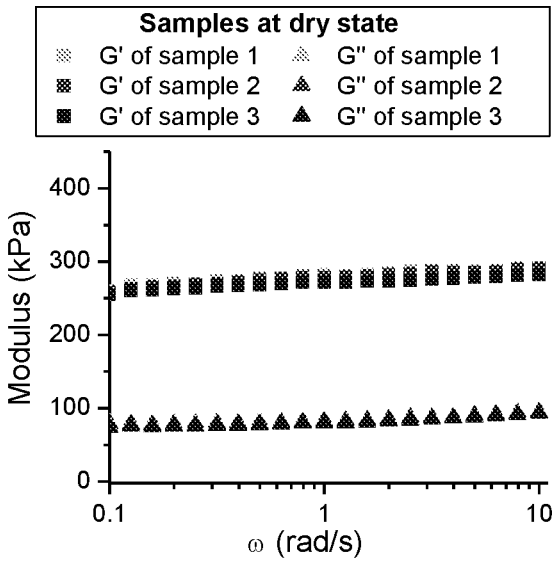
FIGS. 15A to 15E. Oscillatory rheology strain sweeps for Gel-PTH samples in the dry state (FIG. 15A) and swollen states with different solvents: water (FIG. 15B), MeCN (FIG. 15C), N,N-dimethylformamide (DMF) (FIG. 15D), and dimethylsulfoxide (DMSO) (FIG. 15E).
Figure 15B:
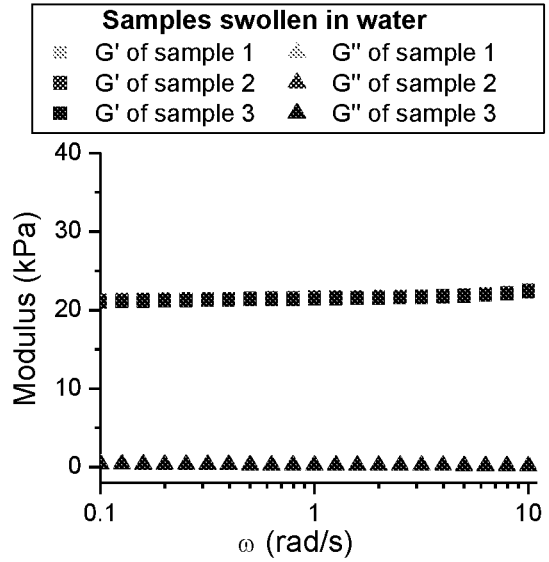
Figure 15C:
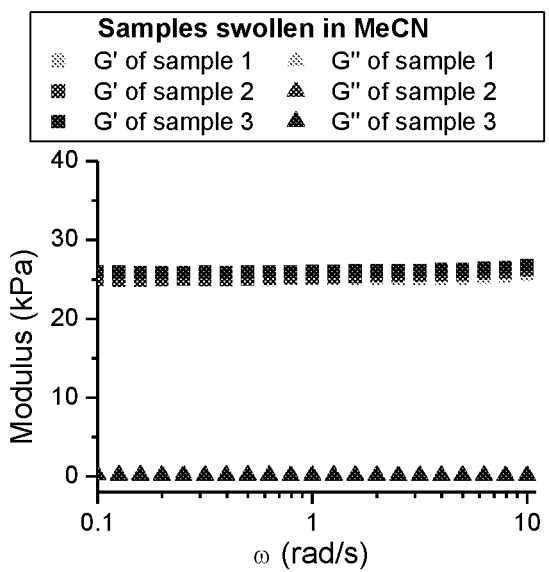
Figure 15D:
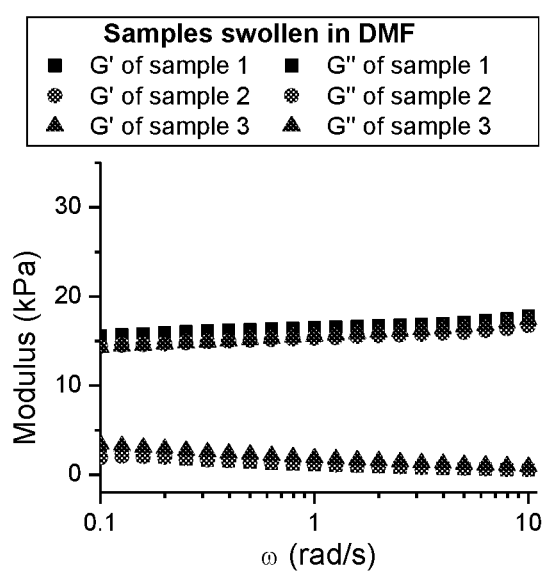
Figure 15E:
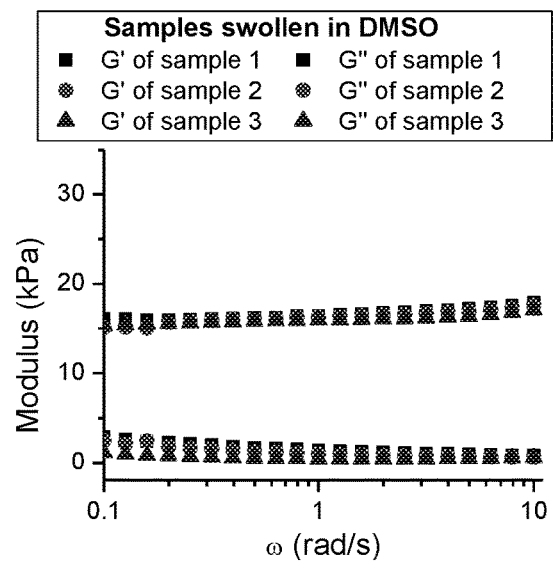

The swelling behavior of Gel-PTH in various solvents was calculated. As expected, the material swells without dissolution in water and other organic solvents (e.g., MeCN, DMF, DMSO); the equilibrium swelling ratios (right columns, FIG. 2) range from 2.8 (in MeCN) to 5.7 (in DMF) for these solvents. The storage moduli (G') (left columns in FIG. 2, also see FIGS. 15A to 15E) as measured by oscillatory rheometry for these samples ranged from 15.8 kPa (in DMF) to 25.4 kPa (in MeCN). These differences reflect the differences in network concentration in the different solvents: the most swollen material (in DMF) has the lowest network concentration and therefore should have the lowest G'. Notably, in each of these solvents, these materials are stiff enough to be easily handled without breaking, which is critical for simple catalyst removal. The Oscillatory rheology strain sweeps for Gel-PTH samples in the dry state (FIG. 15A) and swollen states with different solvents: water (FIG. 15B), MeCN (FIG. 15C), DMF (FIG. 15D), and DMSO (FIG. 15E) are shown.

Stimuli-Switching Photo-CRP Utilizing Gel-PTH

Experimental Procedures for Light "ON"/"OFF" Photo-CRP.

Figure 4A:
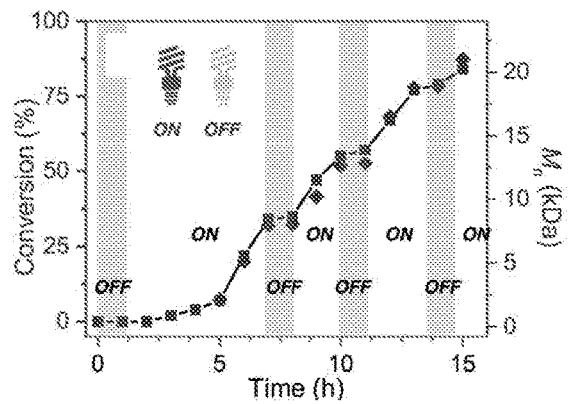
FIGS. 4A to 4D. Gel-PTH catalyst enables external control of photo-CRP from TTC-1 in organic solvent.

The "ON"/"OFF" experiments for the polymerization of NIPAAM were first performed from TTC-1 in MeCN at room temperature by periodically switching the CFL light source. As shown in FIG. 4A, after the induction period, the NIPAAM monomer conversion and $M_n$ increased during the first "ON" cycle. When the reaction was kept in the dark for 60 min, there was no further increase in conversion or $M_n$. Exposing the reaction mixture to light for another 2 h led to increased conversion and $M_n$. Similar results were obtained for $2^{nd}$ and $3^{rd}$ "ON"/"OFF" cycles. The data presented in FIG. 4A demonstrates that Gel-PTH is an effective light-switchable photo-redox catalyst for photo-CRP from TTC-1.

Figure 16:
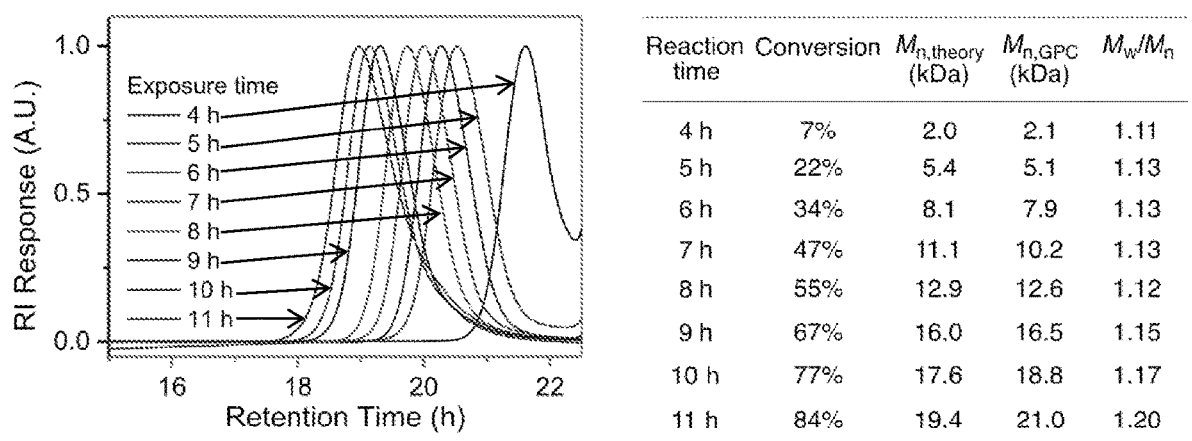
FIG. 16. Experimental results for light "ON"/"OFF" photo-CRP with Gel-PTH.

A glass vial was charged with NIPAAM (508.5 mg, 4.5 mmol), TTC-1 (6.3 mg, 0.0225 mmol), a piece of Gel-PTH (dry Gel-PTH material (5 mg) was swollen with degassed MeCN before use), DMF (65 uL, internal standard, degassed before use) and a small stir bar under $N_2$, and sealed with a rubber septum. 3 mL of degassed MeCN (deoxygenated with three freeze, pump, thaw cycles under $N_2$ atmosphere) was added into the vial via a syringe under $N_2$. Then, the mixture was carefully stirred under CFL light irradiation at room temperature. For a light "OFF" control, the CFL light was turned off, and the reaction vial was kept in the dark. To turn the polymerization back "ON", the light was turned on. To monitor the reaction, 30 μL solution was taken with a micro syringe under $N_2$ at different times during the process of the reaction. The experimental results for the light "ON"/"OFF" photo-CRP with Gel-PTH are shown in FIG. 16.

Experimental Procedures for Catalyst "IN"/"OUT" Photo-CRP.

Figure 4B:
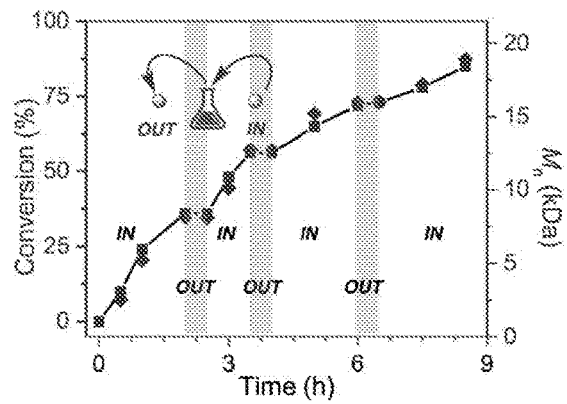

Nature switches "ON" and "OFF" biopolymer synthesis in response to the presence of suitable nutrients (e.g., amino acid monomers). This switching mechanism can be mimicked in photo-CRP by simply cycling a reagent "IN"/"OUT" of the reaction mixture. Such an approach would be quite difficult in a homogeneous system; the mechanically robust Gel-PTH offers a simple means to achieve such switching through simple removal and re-addition of the gel photoredox catalyst. In these experiments, Gel-PTH was dried under inert atmosphere, and the material was then carefully immersed in or removed from a MeCN solution of NIPAAM (1.5 M) and TTC-1 (7.5 mM) under an $N_2$ atmosphere and continuous light irradiation using a tweezers. As shown in FIG. 4B, the NIPAAM conversion as well as $M_n$ increased together in the presence of Gel-PTH (catalyst "IN"). After removing Gel-PTH, no further monomer conversion or change in $M_n$ was detected in the following 30 min (catalyst "OUT"), even though the reaction mixture was continuously exposed to light. By re-immersing the catalyst material into the reaction, the polymerization was effectively turned on, as proven by the increase in monomer conversion and $M_n$. The following two cycles of catalyst "IN"/"OUT" experiments demonstrated the reliability of this method for gaining switchable control over photo-CRP.

It should be noted that in each of the above examples (FIG. 4A and FIG. 4B), both the monomer conversion and $M_n$ increased simultaneously during every cycle when the reaction was turned "ON" via either light or catalyst presence. These findings suggest that each stimulus induces re-initiation of the existing polymer chains as opposed to the alternative possibility that they induce growth of new chains during each cycle. Thus, the polymerization displays living behavior that is distinct from classical photo-initiated free radical polymerizations.

Figure 4C:
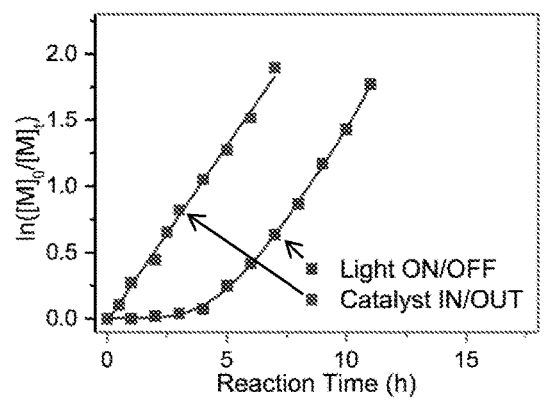
Figure 4D:
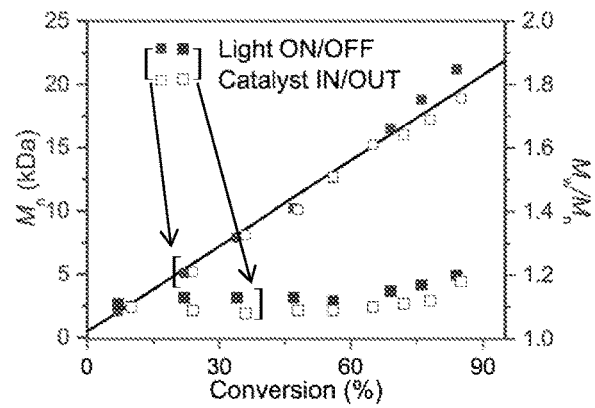

Plots of $\ln([M]_0/[M]_t)$ as a function of reaction time (FIG. 4C) and $M_n$ as a function of monomer conversion (FIG. 4D) demonstrate that Gel-PTH-catalyzed photo-CRP produces polymers with excellent control for both switching methods. Following an induction period, linear relationships were observed for both $\ln([M]_0/[M]_t)$ versus reaction time (FIG. 4C) and $M_n$ versus monomer conversion (FIG. 4D). In FIG. 4C, an induction period was observed in the light-controlled cases most likely due to the presence of air in the Gel-PTH catalyst prior to the polymerization, which was absent in the samples prepared in a glovebox and used for "IN"/"OUT" studies. Similar induction periods were observed in Boyer's recent work with metal photocatalysts. Notably, the slopes of $\ln([M]_0/[M]_t)$ versus time (apparent propagation rate constant, $k_p^{app}$) after the induction period were very similar (FIG. 4C). For each method, $M_w/M_n$ remained low (ca. 1.1-1.3) during the polymerization process (monomer conversion >80%). Gel permeation chromatography (GPC) traces of representative poly(NIPAAM) from TTC-1 obtained from the various switching experiments (FIGS. 16 and 17) are unimodal, which provides further evidence of the control achieved in this system.

Figure 17:
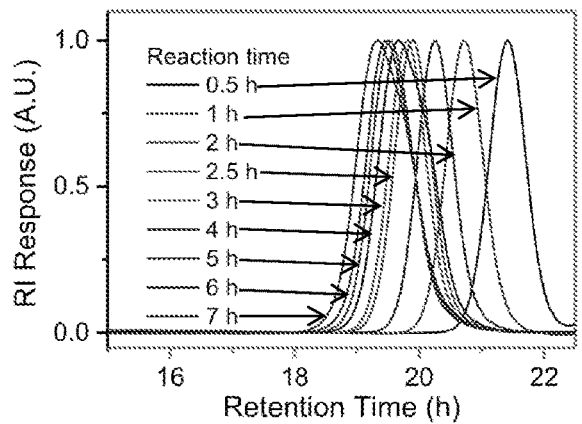
FIG. 17. Experimental results for Gel-PTH catalyst "IN"/"OUT" photo-CRP.

A glass vial was charged with NIPAAM (508.5 mg, 4.5 mmol), TTC-1 (6.3 mg, 0.0225 mmol), a piece of Gel-PTH (dry Gel-PTH material (5 mg) was swollen with MeCN in a $N_2$ glovebox before use), DMF (65 uL, internal standard), 3 mL MeCN, and a small stir bar in a $N_2$ glovebox. Then, the mixture was carefully stirred under CFL light irradiation at room temperature. For catalyst "OUT" studies, the piece of gel material was removed from the vial with a tweezers while keeping the light switched on. To turn the polymerization back "ON" with a catalyst "IN" control, the MeCN rinsed gel catalyst was re-immersed into the reaction solution while keeping the CFL light on. To monitor the reaction, 30 μL solution was taken with a micro syringe under $N_2$ at various times during the process of the reaction. The experimental results for the light "ON"/"OFF" photo-CRP with Gel-PTH are shown in FIG. 17.

Experimental Procedures for "AND" Logic-CRP with Gel-PTH Catalyst Using Light and Catalyst Presence.

To achieve Logic-CRP, it was imagined that catalyst presence and light combined could serve as an "AND" gate for chain growth. As shown in FIG. 5A, in the presence of both Gel-PTH and light irradiation, monomer (NIPAAM) conversion and $M_n$ continuously increased. When either catalyst was "OUT" or light was "OFF", the reaction was interrupted immediately as confirmed by no further increase in monomer conversion or $M_n$. The two triggers were periodically switched between catalyst "IN"/"OUT" and light "ON"/"OFF". In each cycle, the polymerization was readily re-initiated or ceased as depicted in FIG. 5A.

Plots of $\ln([M]_0/[M]_t)$ versus reaction time (FIG. 5B) and $M_n$ versus monomer conversion (FIG. 5C) (for GPC traces see FIG. 18) showed linear relationships and $M_w/M_n$ remained low (1.09-1.15) throughout the entire process. Moreover, the slope of $\ln([M]_0/[M]_t)$ versus time ($k_p^{app}=0.26$) was nearly the same as for reactions controlled with only light "ON"/"OFF" (FIG. 4D, $k_p^{app}=0.25$) or only catalyst "IN"/"OUT" (FIG. 4D, $k_p^{app}=0.27$), indicating that these two switches can be integrated in one system without affecting the polymerization kinetics.

Figure 18:
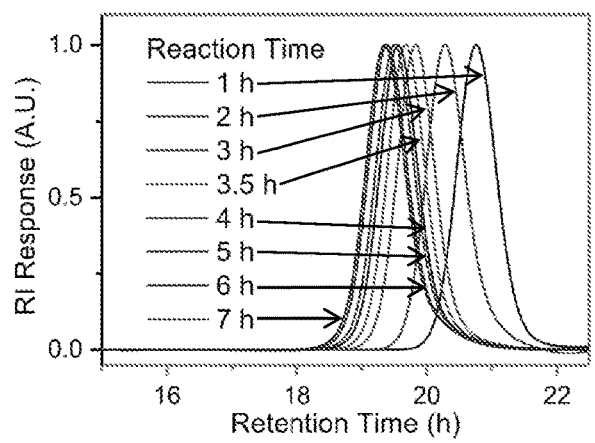
FIG. 18. Experimental Results for "AND" Logic-CRP Gel-PTH catalyst.

A glass vial was charged with NIPAAM (508.5 mg, 4.5 mmol), TTC-1 (6.3 mg, 0.0225 mmol), a piece of the Gel-PTH material (dry Gel-PTH material (5 mg) was swollen with MeCN in the glove box before use), DMF (65 uL, internal standard), 3 mL MeCN and a small stir bar in a glove box. Then, the mixture was carefully stirred under CFL light irradiation at room temperature. For catalyst "OUT" control, the piece of gel material was taken out from the vial with a tweezer without turning off the light. To turn the polymerization back "ON" with a catalyst "IN" control, the MeCN rinsed gel catalyst was re-immersed into the reaction solution while exposing to light. For light "OFF" control, the CFL light was turned off, and the reaction vial was kept in dark. To turn the polymerization back on with a light "ON" control, the light was turned on exposing the reaction light. To monitor the reaction, 30 µL solution was taken with a micro syringe under $N_2$ at various times throughout the process of the reaction. The experimental results for the light "ON"/"OFF" photo-CRP with Gel-PTH are shown in FIG. 18.

Experimental Procedures for Temperature "LOW"/"HIGH" Photo-CRP in Aqueous Solution.

Having demonstrated one variation of "AND" Logic-CRP, the unique LCST behavior of Gel-PTH was exploited to achieve thermally controlled polymerization. In contrast to the examples above, which were conducted in MeCN solvent, the LCST property of Gel-PTH requires water as the solvent. Despite the great progress in photo-redox catalyzed photo-CRP, there are relatively few examples wherein such reactions are conducted in aqueous media. The Matyjaszewski group reported visible light-induced ATRP with ppm-levels of Cu in aqueous media (see e.g. Pan, X.; Malhotra, N.; Simakova, A.; Wang, Z.; Konkolewicz, D.; Matyjaszewski, K., *J. Am. Chem. Soc.* 2015, 137, 15430-15433) The Boyer group developed an aqueous Ru-catalyzed photo-polymerization and applied this method in biological media (see, e.g. Xu, J.; Jung, K.; Corrigan, N. A.; Boyer, C., *Chem. Sci.* 2014, 5, 3568-3575). In both examples, light was demonstrated to be an effective stimulus to achieve switchable chain growth through the use of "ON"/"OFF" experiments. With Gel-PTH, using "LOW"/"HIGH" temperature as an additional control element to provide "AND" gating of photo-CRP through the use of light and heat was imagined.

Polymerization reactions were run under constant light irradiation with a CFL light bulb while the reaction temperature was cycled between 4° C. and 50° C. Dry Gel-PTH catalyst was initially swollen in a mixture of bis-acid trithiocarbonate (TTC-1, 0.023 mmol), NIPAAM (4.5 mmol), water (3 mL), and DMF (40 µL, internal standard) before exposure to light. As shown in FIG. 6A, at 4° C., the monomer conversion and number-average molar mass ($M_n$) increased after an initial inhibition period. When the solution temperature was rapidly increased to 50° C., where Gel-PTH undergoes a transparent-to-opaque transition within 2 min (see supporting information for experimental details of experimental setup), there was no further increase in conversion or $M_n$. There continued to be no increase in conversion or $M_n$ when the reaction was kept at 50° C. for 60 min. Cooling back to 4° C. led to an opaque- to transparent-change within 2 min, and a further increase in monomer conversion and $M_n$. A second cycle of heating further confirmed the fidelity of the process (see FIGS. 19A to 19C for GPC traces, $\ln([M]_0/[M]t)$ vs reaction time and $M_n$ vs conversion).

Figure 19A:
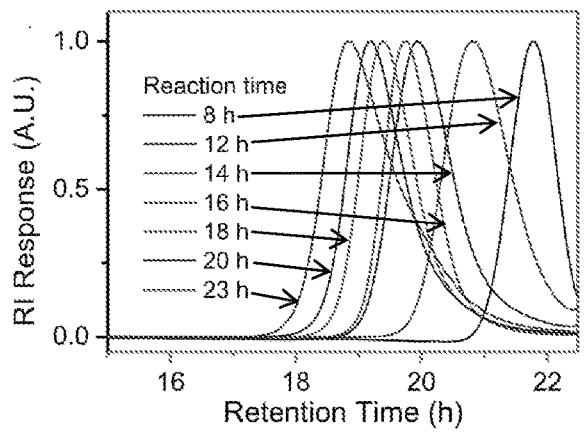
FIGS. 19A to 19C. Experimental results of temperature "LOW"/"HIGH" controlled polymerization.
Figure 19B:
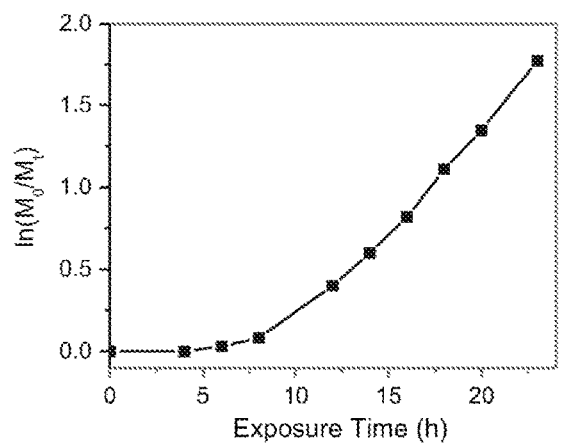
Figure 19C:
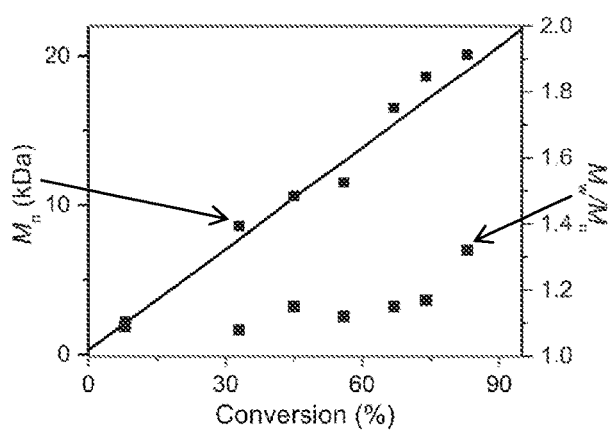

A glass vial was charged with NIPAAM (508.5 mg, 4.5 mmol), TTC-1 (6.3 mg, 0.0225 mmol), a piece of Gel-PTH (dry Gel-PTH material (8 mg) was swollen with degassed deionized water before use), DMF (40 uL, internal standard), and a small stir bar under $N_2$, and sealed with a rubber septum. 3 mL of degassed deionized water (deoxygenated with three freeze, pump, thaw cycles under $N_2$ atmosphere) was added into the vial via a syringe under $N_2$. Then, the mixture was carefully stirred in a cold room at 4° C. under CFL irradiation. For temperature "HIGH" control, the reaction temperature was immediately raised to 50° C. by moving the vial onto a preheated hot plate under constant light irradiation. The transparent-to-opaque transition was observed in 2 min. To turn the polymerization back on with a temperature "LOW" control, the vial was moved off the hot plate to a 4° C. oil bath under constant irradiation. The opaque-to-transparent transition was observed within 2 min. To monitor the reaction, 30 µL solution was taken with a micro syringe under $N_2$ at various times throughout the reaction process. The GPC traces for the results of the temperature "LOW"/"HIGH" controlled polymerization are shown in FIG. 19A. A plot of reaction time vs $\ln([M]_0/[M]_t)$, with $[M]_0$ and $[M]_t$ being the concentration of monomers at time points 0 and t, respectively is shown in FIG. 19B. The percent conversion vs $M_n$ and % conversion vs $M_w/M_n$ is shown in FIG. 19C.

Experimental Procedure for "AND" Logic-CRP Using Light and Temperature as Switches Mediated by Gel-PTH Catalyst in Water.

In the above experiment, the newly-synthesized poly (NIPAAM) chains could also display LCST behavior, and thus perhaps the regulation of chain growth was not due to the LCST of Gel-PTH alone. To examine whether Gel-PTH could facilitate thermal-switching during the synthesis of a polymer that does not have a LCST in the same range, next the aqueous polymerization of poly(ethylene glycol) methyl ether acrylate (average $M_n$=480 was conducted, molar ratio of monomer/TTC-1=100/1) from TTC-1. In this system, temperature and light were combined as an "AND" gate for Logic-CRP. As shown in FIG. 6B, light "ON" and temperature "LOW" controls led to monomer conversion and a continuous increase in $M_n$. When either light was "OFF" or temperature was "HIGH", the polymerization was interrupted immediately as confirmed by no obvious increase in monomer conversion or $M_n$. Plots of $\ln([M]_0/[M]_t)$ versus reaction time and $M_n$ versus monomer conversion showed linear relationships after an induction period (see FIGS. 20A to 20C for GPC traces, $\ln([M]_0/[M]t)$ vs reaction time and $M_n$ vs conversion). While the values of $M_w/M_n$ of this aqueous polymerization ranged from 1.4-1.6 (ca.), no shoulder peaks were observed in the GPC traces. These data demonstrate another "AND" Logic-CRP enabled by Gel-PTH.

It should be noted than after long exposure to the aqueous reaction conditions used for the data shown in FIGS. 6A to 6B, Gel-PTH became very soft and fragile. Thus, though it could be removed by filtration or centrifugation, it was not possible to perform simple "IN"/"OUT" experiments without the gel breaking apart.

Figure 20A:
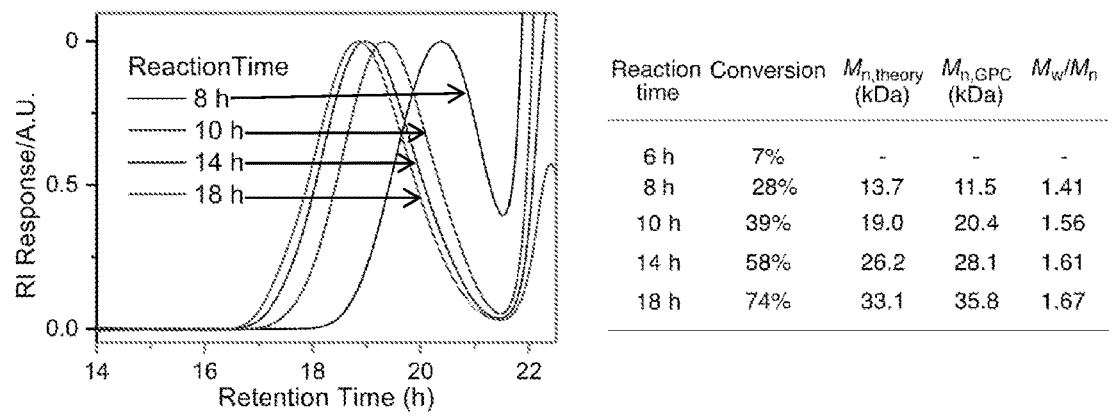
FIGS. 20A to 20C. Experimental results for "AND" Logic-CRP using temperature and light.
Figure 20B:
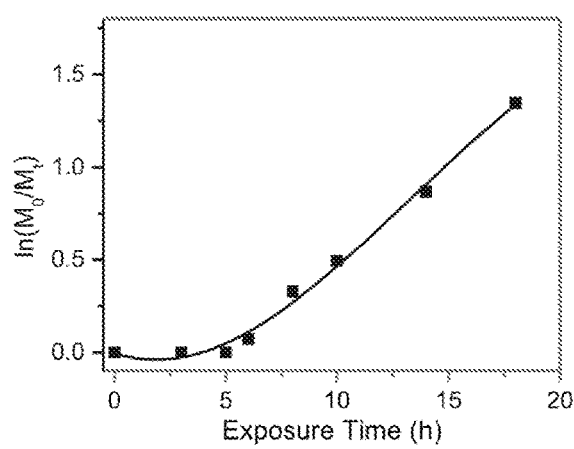
Figure 20C:
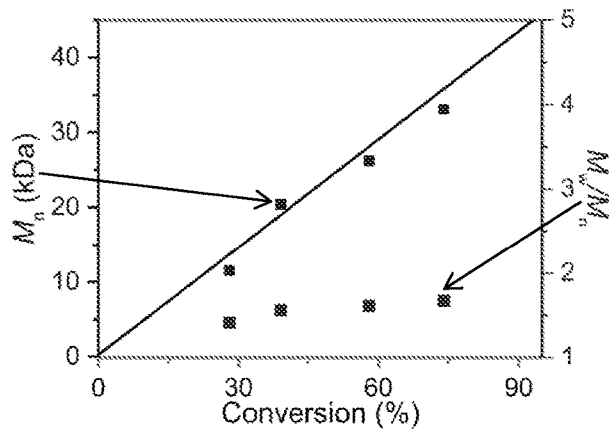

A glass vial was charged with poly(ethylene glycol) methyl ether acrylate (average $M_n$=480, 1.44 g, 3 mmol), TTC-1 (8.5 mg, 0.03 mmol), a piece of Gel-PTH (dry Gel-PTH (8 mg) was swollen with degassed deionized water before use) and a small stir bar under $N_2$, and sealed with a rubber septum. 2 mL of degassed deionized water (deoxygenated with three freeze, pump, thaw cycles under $N_2$ atmosphere) was added into the vial via a syringe under $N_2$. Then, the mixture was carefully stirred in a cold room at 4° C. under CFL irradiation. For light "OFF" control, the CFL light was turned off, and the reaction vial was kept in dark. To turn the polymerization back "ON", the light was turned on. For temperature "HIGH" control, the reaction temperature was immediately raised to 50° C. by switching the vial to a preheated hot plate under constant light irradiation. The transparent-to-opaque transition was observed in 2 min. To turn the polymerization back on with a temperature "LOW" control, the vial was switched to a 4° C. bath under constant irradiation. The opaque-to-transparent transition was also in 2 min. To monitor the reaction, 30 µL solution was taken with a micro syringe under $N_2$ at various times during the reaction process. The GPC traces for the results of the temperature "LOW"/"HIGH" controlled polymerization are shown in FIG. 20A. A plot of reaction time vs $\ln([M]_0/[M]_t)$, with $[M]_0$ and $[M]_t$ being the concentration of monomers at time points 0 and t, respectively is shown in FIG. 20B. The percent conversion vs $M_n$ and % conversion vs $M_w/M_n$ is shown in FIG. 20C.

Photo-CRP Using Different Monomers and Iniferters with Gel-PTH Photocatalyst

Following the exploration of various photo-CRP switching methods enabled by Gel-PTH, the monomer, iniferter/initiator, and solvent scope of the Gel-PTH catalyst was investigated.

The scope of Gel-PTH for the growth of polymers from trithiocarbonate iniferters was first explored. Boyer refers to such reactions as "PET-RAFT" whereas there are referred herein as "photo-iniferter polymerization"; the choice of terminology is due to the proposed mechanism of simultaneous reversible activation/deactivation and degenerative chain transfer, which are reflected in the iniferter concept that predates RAFT (see, e.g. Chen, M.; Zhong, M.; Johnson, J. A., *Chem. Rev.* 2016, 10167-10211; Otsu, T.; Yoshida, M., *Makromol. Chem., Rapid Commun.* 1982, 3, 127-132). In contrast, classical RAFT operates entirely via degenerative chain transfer, without reversible activation steps. Regardless of terminology, this reaction provides a robust methodology for the controlled synthesis of polymers using metal-free conditions and visible light. As shown in Table 1, in the absence of a photo-catalyst, less than 5% monomer conversion was detected using photoiniferters TTC-2 or TTC-3 with different solvents such as MeCN, dimethyl sulfoxide (DMSO), or DMF using a 14 W CFL light source (entries 1, 9 and 10). Though Qiao and coworkers (see, e.g. McKenzie, T. G.; Fu, Q.; Wong, E. H. H.; Dunstan, D. E.; Qiao, G. G., *Macromolecules* 2015, 48, 3864-3872) have reported that analogous TTCs can be directly activated by visible light,[65] but similar phenomena under the conditions used in these studies have not been observed. When the Gel-PTH catalyst containing 0.05 mol % of PTH relative to NIPAAM was added into the reaction mixture, 82% of NIPAAM monomer in solution was polymerized in 10 h, producing poly(NIPAAM) with 19.5 kDa molar mass, which is in accordance with the theoretical molar mass estimated based on conversion and the molar ratio of monomer/iniferter (entry 2). When a 500/1 molar ratio of NIPAAM/TTC-2 was used, the molar mass of the polymer increased to 46.6 kDa with $M_w/M_n=1.21$ while the monomer conversion was similar (entry 3). Analogous polymerizations of other acrylamides and acrylates, such as N,N-dimethylacrylamide (DMA), n-butyl acrylate (nBA), methyl acrylate (MA), and ethylene glycol methyl ether acrylate (EGMEA) gave the corresponding polymers in good conversions (entries 4 to 7). The molecular weights determined by $^1$H NMR were in very good agreement with the theoretical values (FIGS. 22A to 22F and FIGS. 23A to 23B).

Scheme 3: Chemical Structures of Iniferters/Initiators.

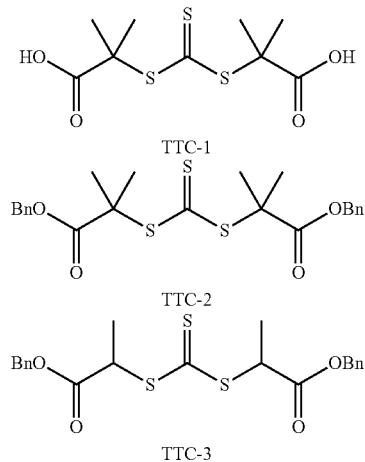

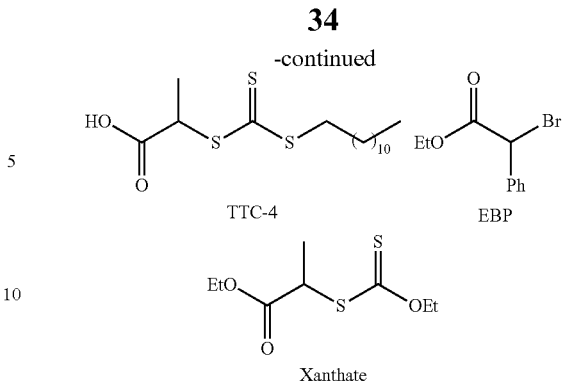

Synthesis of Iniferters and Initiators

For the synthesis of the S,S-bis(a,a'-dimethyl a"-acetic acid)trithiocarbonate (TTC-1), dibenzyl 2,2'-(thiocarbonylbis(sulfanediyl))bis(2-methylpropanoate) (TTC-2) and Xanthate. TTC-4 and EBP were purchased from Sigma-Aldrich.

Scheme 4. Synthesis of TTC-3

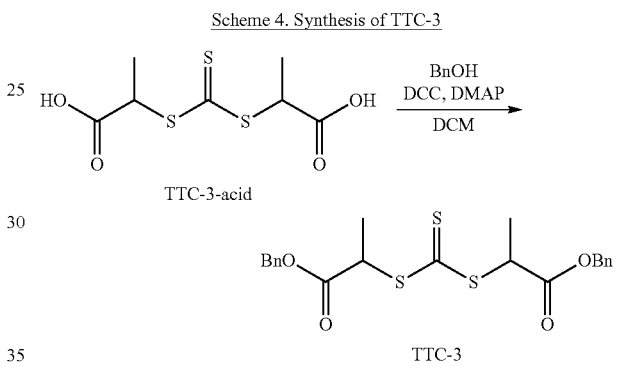

Figure 21A:
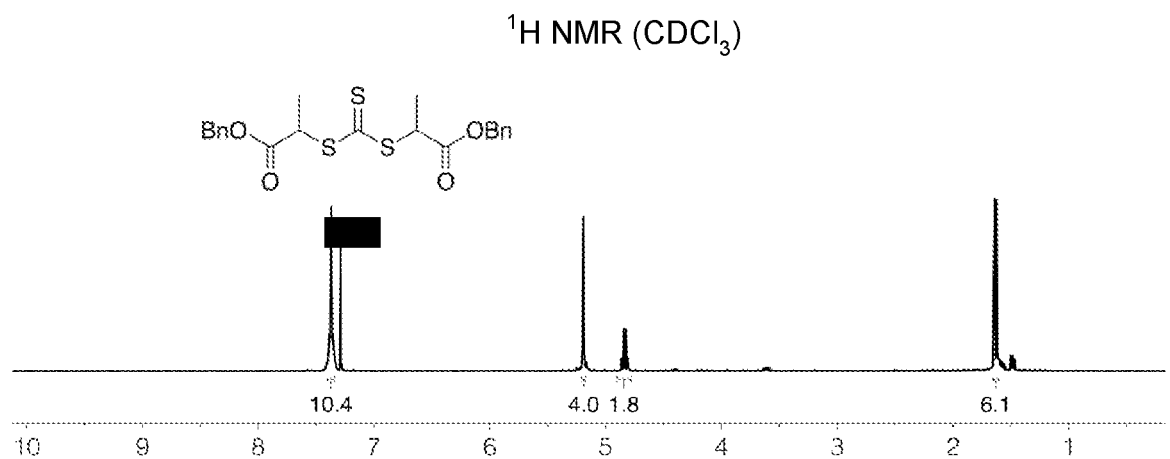
FIGS. 21A to 21B. $^1$H NMR (FIG. 21A) and $^{13}$C NMR (FIG. 21B) spectra of TTC-3. The structure of TTC-3 is shown in Scheme 3.
Figure 21B:
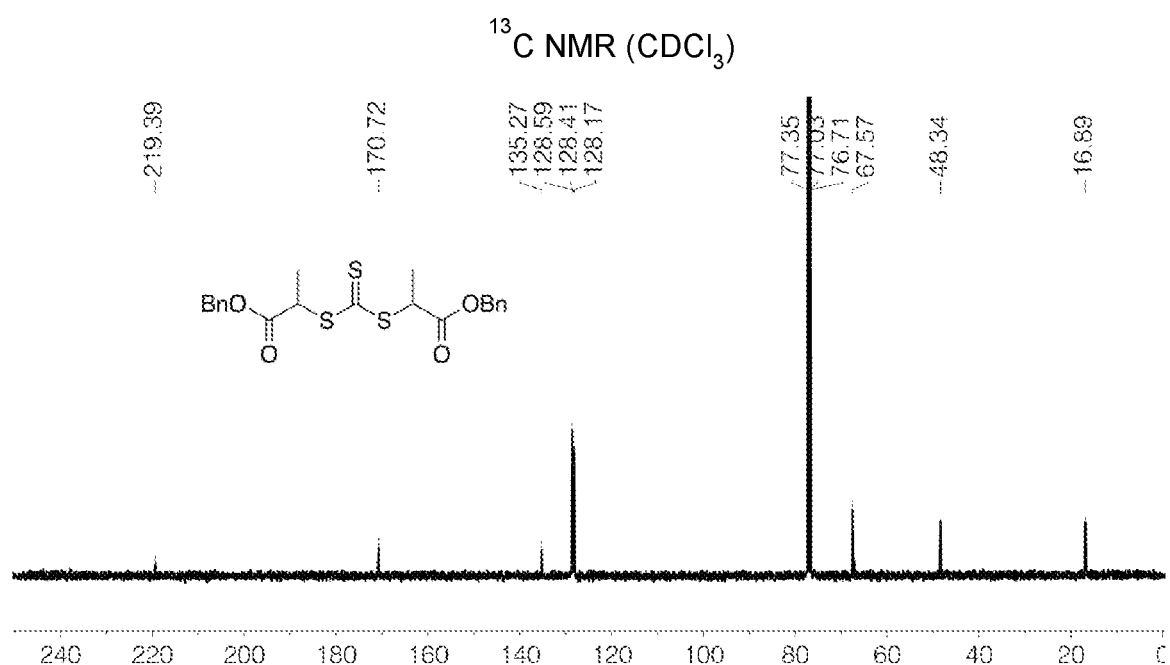

Dibenzyl 2,2'-(thiocarbonylbis(sulfanediyl))dipropionate (TTC-3): An oven-dried round bottom flask was charged with TTC-3-acid (254 mg, 1 mmol), benzyl alcohol (BnOH), anhydrous DCM (10 mL), and a stir bar at 0° C. A solution of N,N'-dicyclohexylcarbodiimide (515 mg, 2.5 mmol, DCC) and 4-dimethylaminopyridine (24.4 mg, 0.2 mmol, DMAP) in THF (1 mL) was dropwise added into the vessel with stirring. The reaction was allowed to stir at room temperature over night. After the reaction, the mixture was filtered to remove the solids. The collected solution was concentrated and purified by column chromatography on silica gel (0-5% EtOAc in Hexanes) to afford TTC-3 in 78% isolated yield as a yellow oil. $^1$H NMR (400 MHz, CDCl$_3$) δ: 7.38-7.31 (m, 10H), 5.16 (s, 4H), 4.81 (t, J=8.0 Hz, 2H), 1.60 (d, J=4.0 Hz, 6H) ppm; $^{13}$C NMR (100 MHz, CDCl$_3$) δ: 219.4, 170.7, 135.3, 128.6, 128.4, 128.2, 67.6, 48.3, 16.9 ppm. IR (neat, cm$^{-1}$): 2932, 1732, 1454, 1378, 1303, 1215, 1152, 1067, 819, 735, 696. HRMS (ESI) C$_{21}$H$_{22}$O$_4$S$_3$ m/z: Calcd for [M+NH$_4$]$^+$: 452.1018, Found: 452.1017. The resulting $^1$H NMR and $^{13}$C NMR are shown in FIGS. 21A to 21B, respectively.

With TTC-3, Gel-PTH catalyzed photo-CRP of acrylamides and acrylates (entries 11 to 15) in either DMSO or DMF produced polymers with narrow molar mass distributions ($M_w/M_n<1.30$) at high conversions (>80%). Similar results were obtained by irradiation with a blue LED light ($\lambda_{max}=410$ nm) as the irradiation source rather than a CFL bulb (entry 14). Photo-CRP with Gel-PTH and unsymmetrically substituted trithiocarbonate TTC-4 also provided excellent control over polymer molar mass distribution ($M_w/M_n<1.20$) for the polymerization of DMA and t-butyl acrylate (tBA).

TABLE 1

Polymerization of Acrylates and Acryl Amides from Trithiocarbonates with Gel-PTH Catalyst.[a]

| Entry | Monomer | Initiator | Molar ratio of Monomer/Initiator/PTH[b] | Solvent | Time (h) | Conv. (%) | $M_{n,\,theory}$ (kDa) | $M_{n,\,GPC}$ (kDa) | $M_w/M_n$ |
|---|---|---|---|---|---|---|---|---|---|
| 1 | NIPAAM | TTC-2 | 200/1/0 | MeCN | 12 | <5 | — | — | — |
| 2 | NIPAAM | TTC-2 | 200/1/0.1 | MeCN | 10 | 82 | 19.0 | 19.5 | 1.15 |
| 3 | NIPAAM | TTC-2 | 500/1/0.25 | MeCN | 10 | 84 | 47.9 | 46.6 | 1.21 |
| 4 | DMA | TTC-2 | 200/1/0.1 | MeCN | 10 | 81 | 16.5 | 17.4 | 1.11 |
| 5 | nBA | TTC-2 | 250/1/0.1 | MeCN | 24 | 78 | 25.4 | 26.7 | 1.09 |
| 6 | MA | TTC-2 | 200/1/0.1 | MeCN | 24 | 80 | 14.2 | 15.3 | 1.10 |
| 7 | EGMEA | TTC-2 | 250/1/0.1 | MeCN | 16 | 80 | 26.5 | 27.7 | 1.09 |
| 8 | NIPAAM | TTC-3 | 200/1/0.1 | MeCN | 10 | 83 | 19.2 | 21.2 | 1.16 |
| 9 | NIPAAM | TTC-3 | 200/1/0 | DMSO | 12 | <5 | — | — | — |
| 10 | NIPAAM | TTC-3 | 200/1/0 | DMF | 12 | <5 | — | — | — |
| 11 | NIPAAM | TTC-3 | 200/1/0.1 | DMSO | 8 | 91 | 21.0 | 24.6 | 1.20 |
| 12 | NIPAAM | TTC-3 | 200/1/0.1 | DMF | 10 | 81 | 18.7 | 17.6 | 1.29 |
| 13 | HEA | TTC-3 | 250/1/0.1 | DMSO | 9 | 91 | 26.1 | 27.9 | 1.24 |
| 14[c] | HEA | TTC-3 | 200/1/0.1 | DMSO | 12 | 85 | 20.2 | 19.8 | 1.20 |
| 15 | MA | TTC-3 | 200/1/0.1 | DMSO | 10 | 89 | 15.7 | 16.6 | 1.15 |
| 16 | DMA | TTC-4 | 200/1/0.1 | MeCN | 12 | 80 | 14.1 | 14.8 | 1.07 |
| 17 | tBA | TTC-4 | 200/1/0.1 | MeCN | 12 | 82 | 21.3 | 21.4 | 1.19 |

[a]Reaction conditions: monomer (1.5M), the molar ratio of monomer/iniferter/PTH was as shown in the table, room temperature, a 14 W CFL bulb was used for irradiation. $M_n$ = number average molar mass; $M_w$ = weight average molar mass. The conversion of monomer was determined by $^1$H NMR spectroscopy. $M_{n,\,theory}$ was calculated according to the monomer conversion. $M_{n,\,GPC}$ and $M_w/M_n$ were determined by GPC analysis.
[b]The molar ratio of catalyst is calculated according to the PTH unit content contained in the Gel-PTH added into the reaction.
[c]LED ($\lambda_{max}$ = 410 nm) light is used.

Figure 24A:
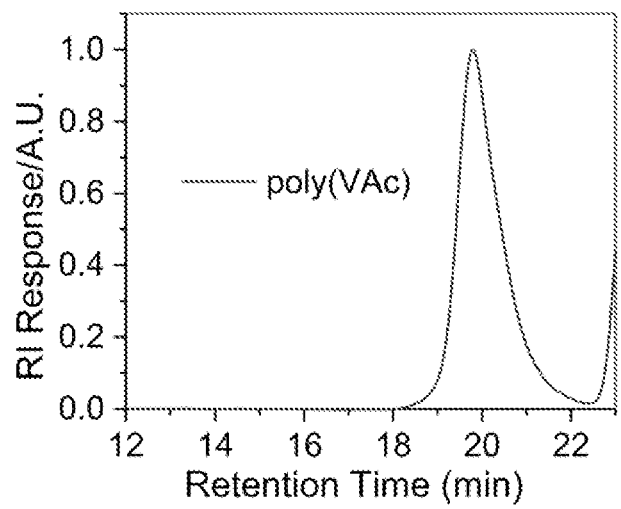
FIGS. 24A to 24B. GPC (FIG. 24A) and $^1$H NMR spectra (FIG. 24B) of poly(VAc) obtained via polymerization from Xanthate. The structure of Xanthate is shown in Scheme 3.
Figure 24B:
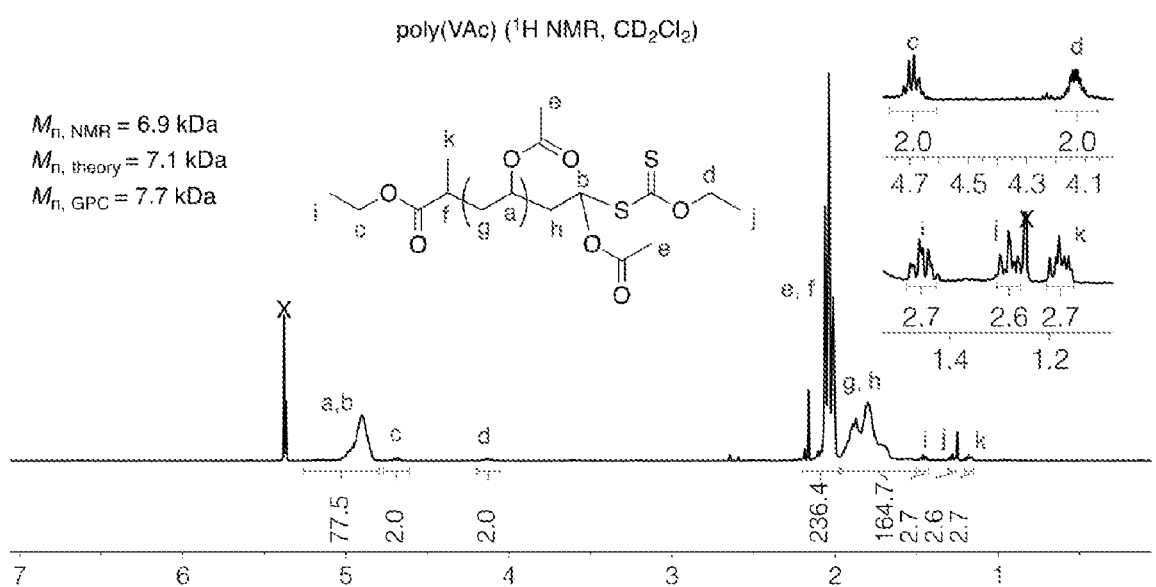

Analogous polymerizations of vinyl acetate (VAc) and N-vinylpyrrolidone (NVP) were conducted as outlined in Table 2. When TTC-3 and TTC-4 were used as the photoiniferters, no monomer conversion was observed. When Xanthate was used, VAc was efficiently polymerized. By controlling the reaction time and the molar ratio of monomer/iniferter, poly(VAc) of different molar masses was produced with $M_w/M_n$=1.12-1.16 (entries 4 to 6). $^1$H NMR analysis showed good agreement between the molar mass and the end group fidelity for poly(VAc) (FIGS. 24A to 24B). This method also allowed the photo-CRP of NVP under visible light irradiation, as shown in entries 7 and 8.

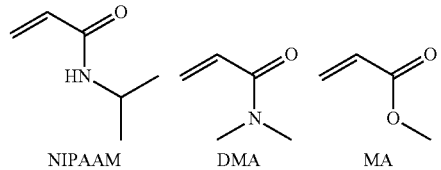

Scheme 5: Chemical Structures of Monomers.

NIPAAM    DMA    MA

TABLE 2

Polymerization of vinyl acetate and N-vinylpyrrolidone with Gel-PTH Catalyst[a]

| Entry | Monomer | Initiator | Molar ratio of Monomer/Initiator/PTH[b] | Time (h) | Conv. (%) | $M_{n,\,theory}$ | $M_{n,\,GPC}$ | $M_w/M_n$ |
|---|---|---|---|---|---|---|---|---|
| 1 | VAc | TTC-3 | 100/1/0.1 | 24 | 0 | — | — | — |
| 2 | VAc | TTC-4 | 100/1/0.1 | 24 | 0 | — | — | — |
| 3 | VAc | Xanthate | 100/1/0 | 24 | 0 | — | — | — |
| 4 | VAc | Xanthate | 100/1/0.1 | 14 | 30 | 2.8 | 2.9 | 1.12 |
| 5 | VAc | Xanthate | 100/1/0.1 | 32 | 80 | 7.1 | 7.7 | 1.15 |
| 6 | VAc | Xanthate | 200/1/0.1 | 32 | 75 | 13.1 | 14.9 | 1.16 |
| 7 | NVP | Xanthate | 100/1/0.1 | 40 | 35 | 4.1 | 4.6 | 1.26 |
| 8 | NVP | Xanthate | 100/1/0.1 | 84 | 72 | 8.2 | 9.0 | 1.32 |

[a]Reaction conditions: monomer (1.5M), the molar ratio of monomer/iniferter/PTH was as shown in the table, in DMSO, at room temperature, a 14 W CFL bulb was used for irradiation. The conversion of monomer was determined by $^1$H NMR spectroscopy. $M_{n,\,theory}$ was calculated according to the monomer conversion. $M_{n,\,GPC}$ and $M_w/M_n$ were determined by GPC analysis.
[b]The molar ratio of PTH is calculated according to the PTH unit content contained in the Gel-PTH added into the reaction.

-continued

Figure 22A:
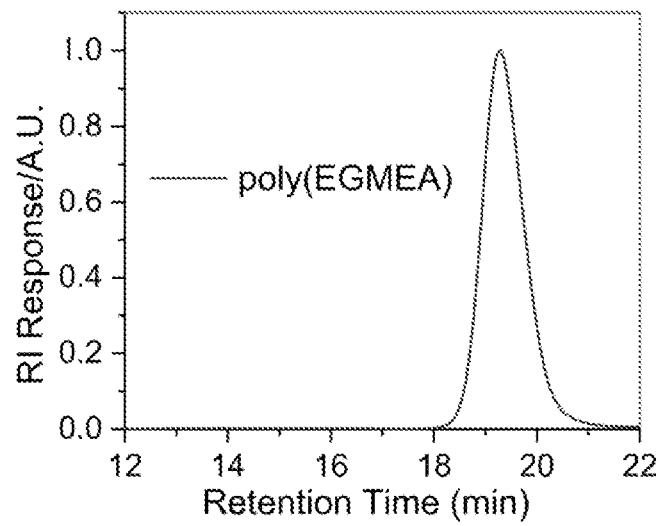
FIGS. 22A to 22F. GPC traces (FIGS. 22A, 22C, and 22E) and $^1$H NMR spectra (FIGS. 22B, 22D, and 22F) for polymers obtained via polymerization from TTC-2. Due to the symmetric chemical structure of the polymers, only half of the structures are shown. The structure of TTC-2 is shown in Scheme 3.
Figure 22B:
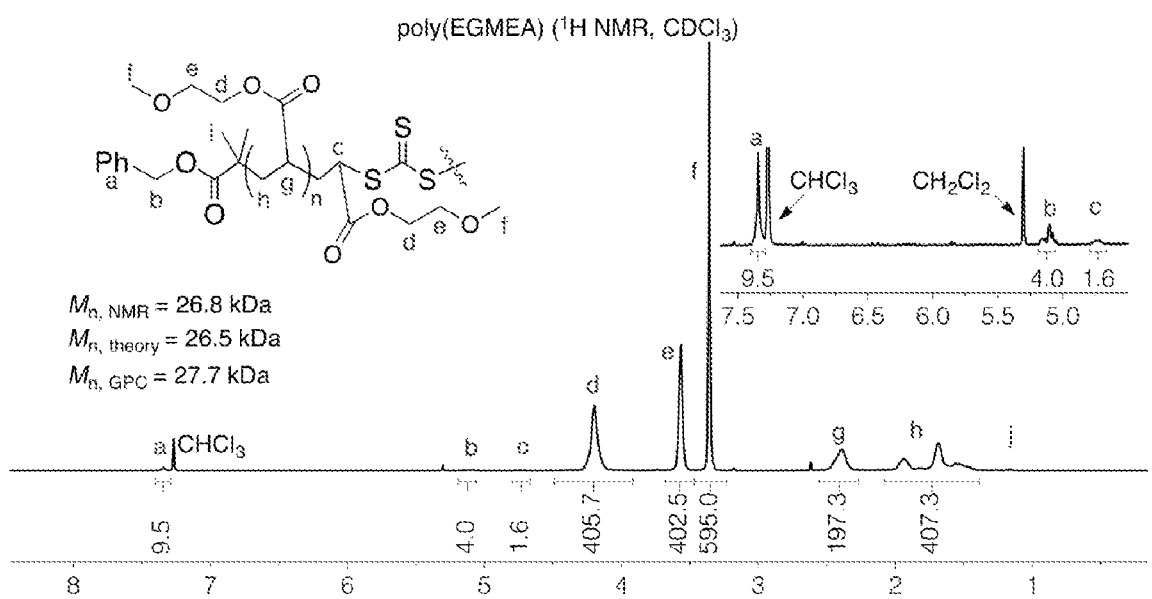
Figure 22C:
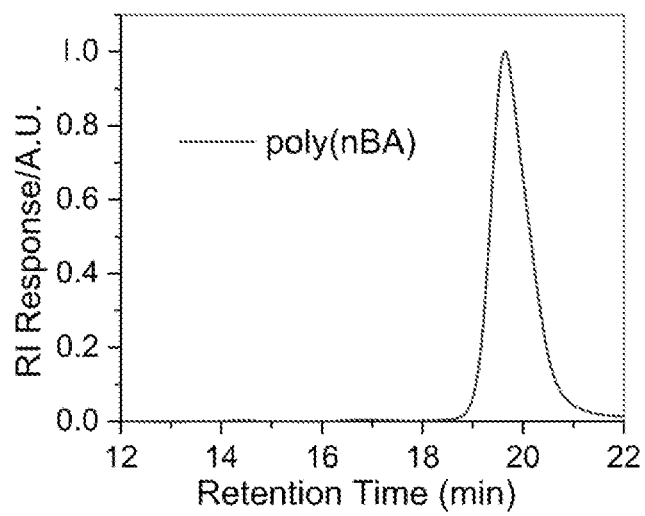
Figure 22D:
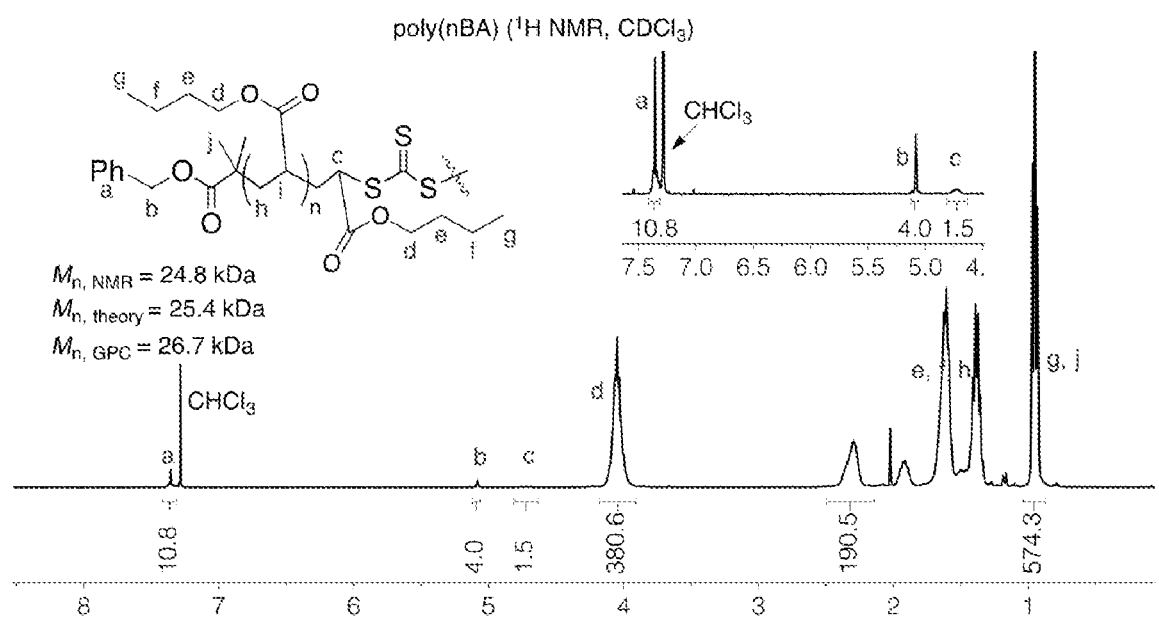
Figure 22E:
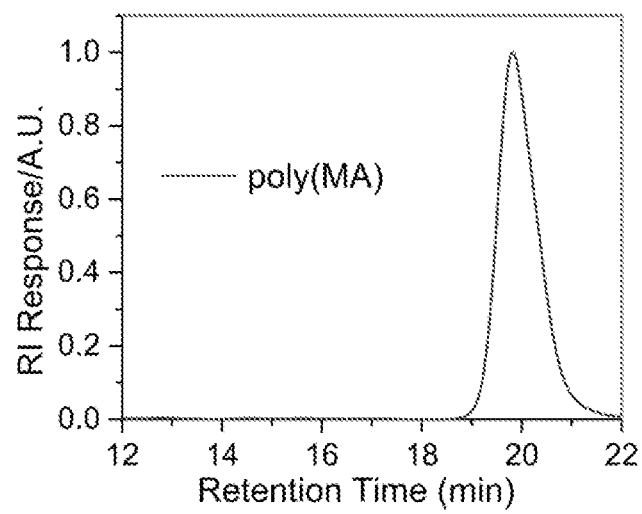
Figure 22F:
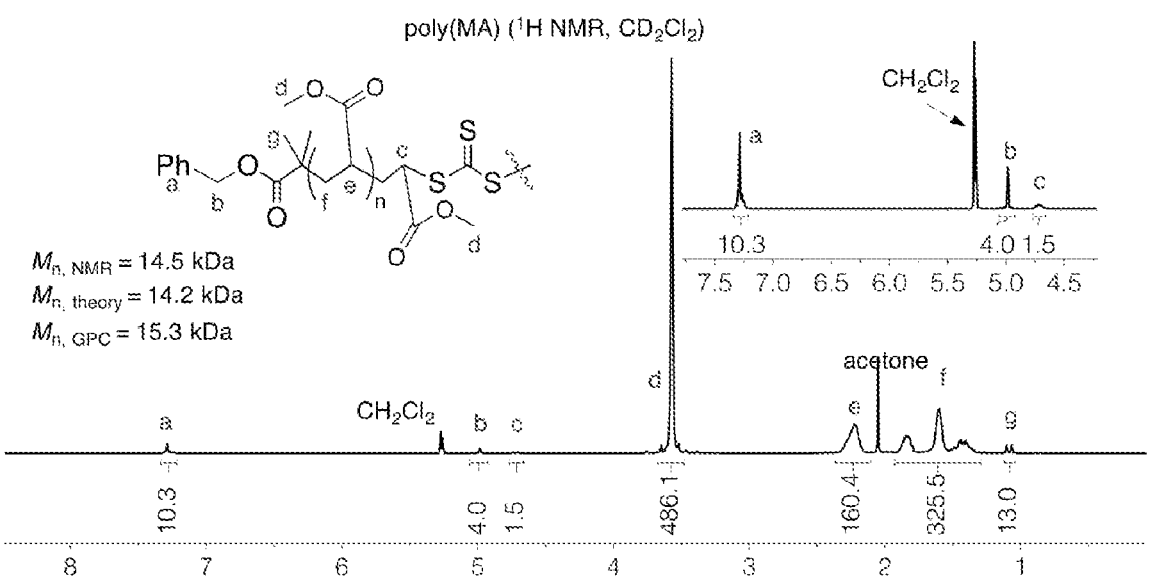
Figure 23A:
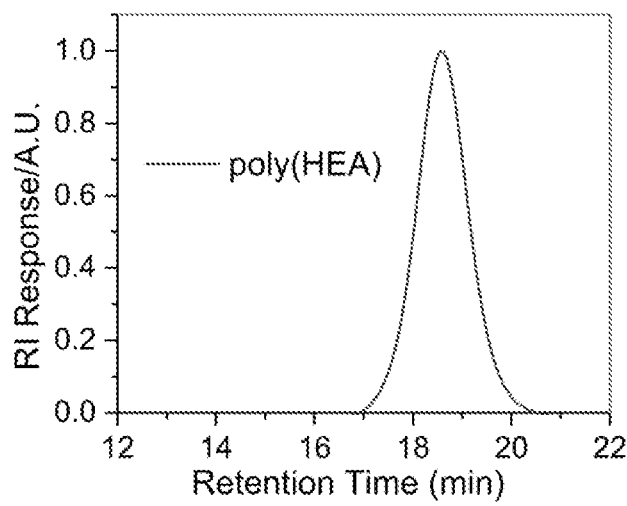
FIGS. 23A to 23B. GPC (FIG. 23A) and $^1$H NMR spectra (FIG. 23B) of poly(HEA) obtained via polymerization from TTC-3. Due to the symmetric chemical structure of the polymers, only half of the structures are shown.
Figure 23B:
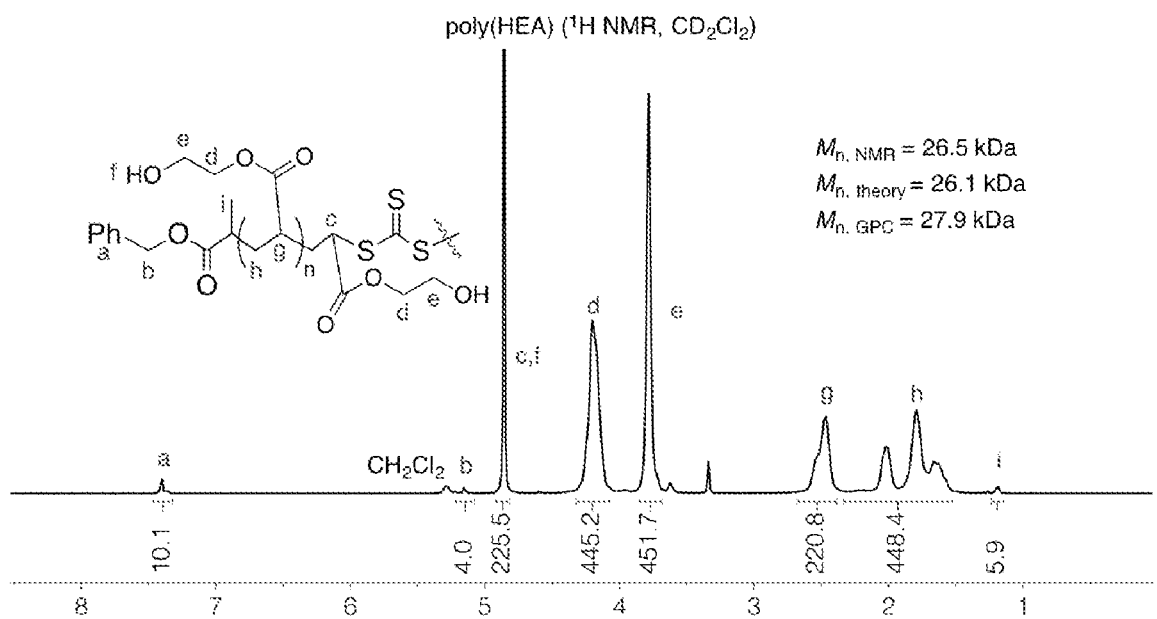
Figure 25A:
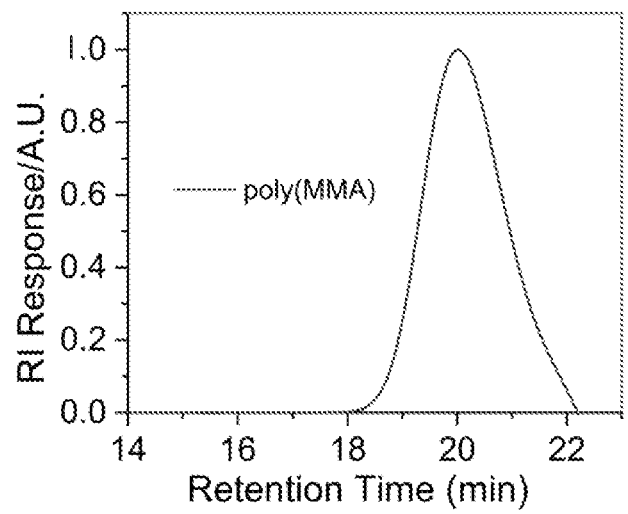
FIGS. 25A to 25D. GPC traces (FIGS. 25A and 25C) and $^1$H NMR spectra (FIGS. 25B and 25D) for polymers obtained via polymerization from EBP (ethyl t-bromophenylacetate). The structure of TTC-3 is shown in Scheme 3.
Figure 25B:
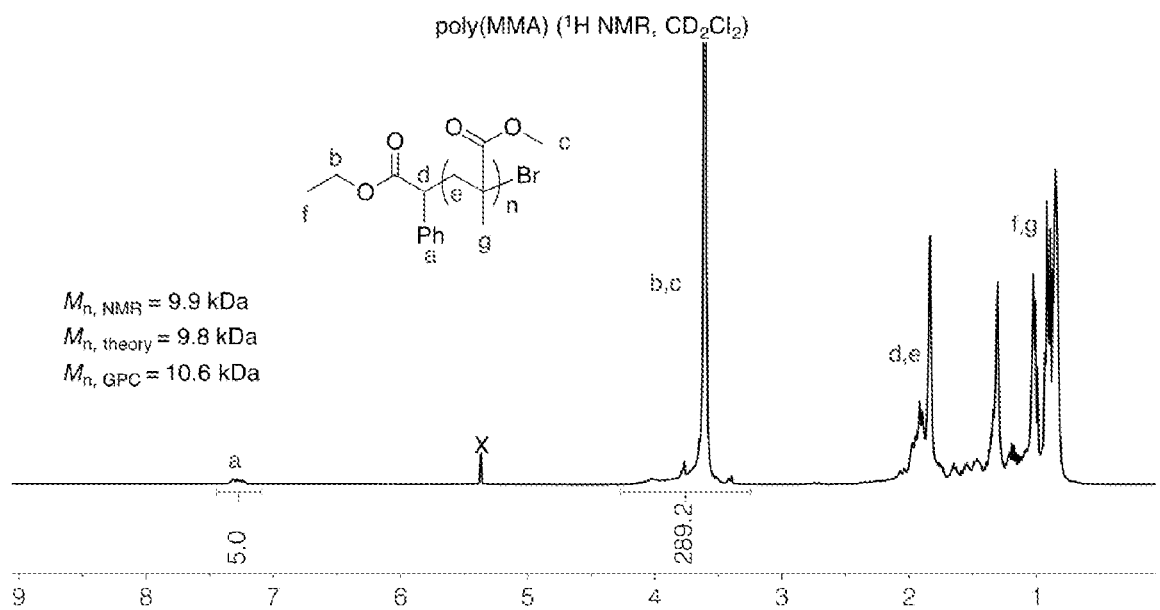
Figure 25C:
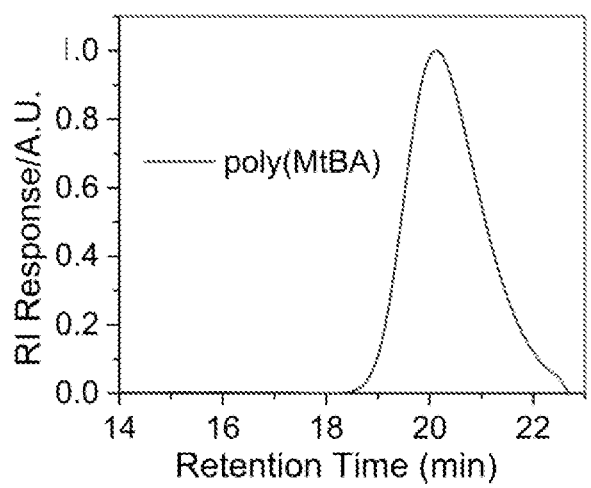
Figure 25D:
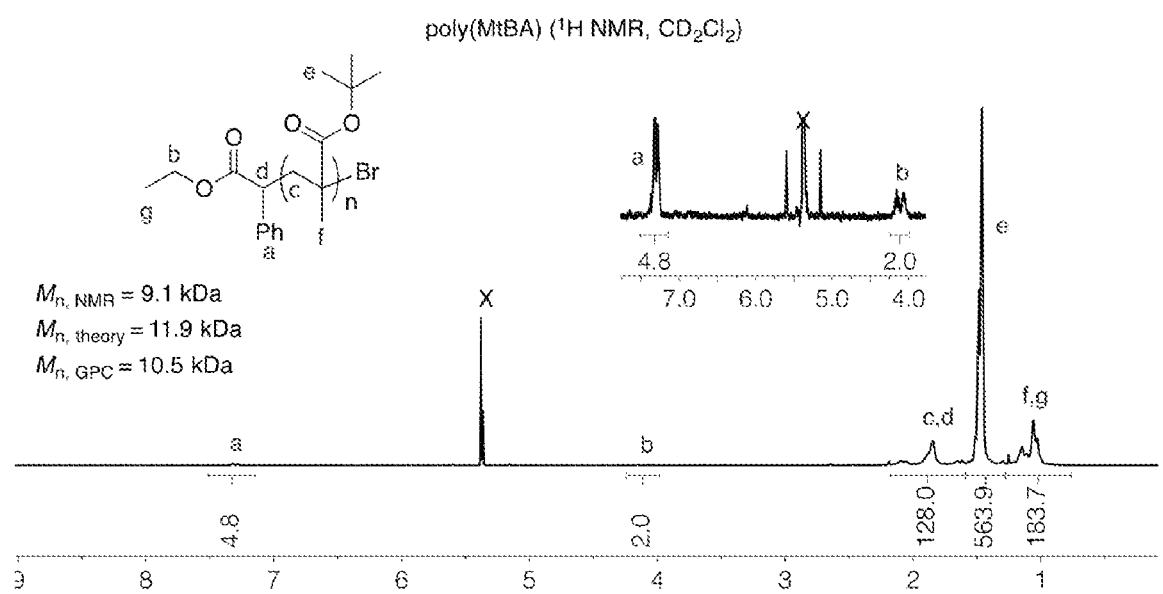

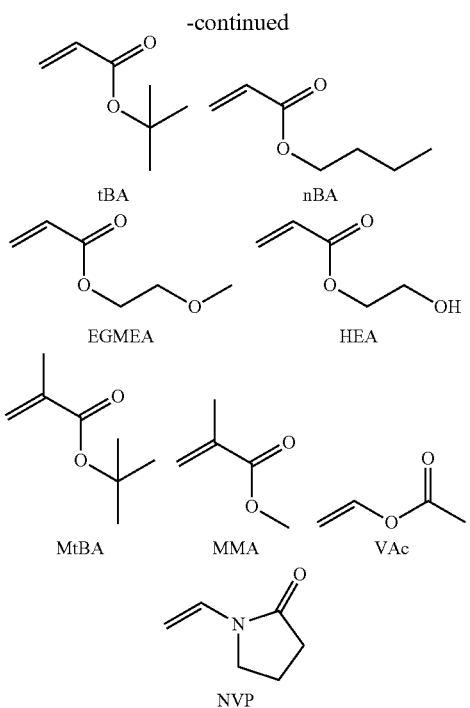

only half of the structures are shown. The GPC trace and $^1$H NMR spectra for poly(HEA) obtained via polymerization from TTC-3 are shown in FIGS. 23A and 23B, respectively. Due to the symmetric chemical structure of the polymers, only half of the structures are shown. The GPC trace and $^1$H NMR spectra for poly(VAc) obtained via polymerization from Xanthate are shown in FIGS. 24A and 24B, respectively. The GPC traces for the polymers obtained via polymerization from EBP are shown in FIGS. 25A and 25C. The resulting $^1$H NMR spectra are shown in FIGS. 22B and 22D, and 22F.

Photo-ATRP

The photo-ATRP of methacrylates using ethyl 2-bromopropionate (EBP) as an initiator was next explored. As shown in Table 3, without a photo catalyst, <5% conversion of methyl methacrylate (MMA) was detected (entry 1). When Gel-PTH was added, photo-CRP was realized; varying the irradiation time produced PMMA of different $M_n$ (from 3.8 kDa to 8.4 kDa) with good control of molar mass distributions ($M_w/M_n$=1.21-1.31, entries 2 to 4). Furthermore, this method was successful for the polymerization of t-butyl methacrylate (MtBA). Both poly(MMA) and poly(MtBA) were analyzed by $^1$H NMR (FIGS. 25A to 25D) and the obtained $M_n$ values agreed with the values estimated by GPC analysis and monomer conversion.

TABLE 3

Polymerization of Methacrylates from EBP with Gel-PTH Catalyst[a]

| Entry | Monomer | Molar ratio of Monomer/Initiator/PTH[b] | Time (h) | Conv. (%) | $M_{n, theory}$ (kDa) | $M_{n, GPC}$ (kDa) | $M_w/M_n$ |
|---|---|---|---|---|---|---|---|
| 1 | MMA | 100/1/0 | 26 | <5 | — | — | — |
| 2 | MMA | 100/1/0.05 | 26 | 29 | 3.1 | 3.8 | 1.26 |
| 3 | MMA | 100/1/0.1 | 26 | 56 | 5.8 | 6.1 | 1.21 |
| 4 | MMA | 120/1/0.1 | 40 | 80 | 9.8 | 10.6 | 1.31 |
| 5[c] | MMA | 100/1/0.1 | 56 | 82 | 8.4 | 8.9 | 1.42 |
| 6 | MtBA | 100/1/0.1 | 26 | 60 | 8.8 | 9.2 | 1.25 |
| 7 | MtBA | 100/1/0.1 | 40 | 82 | 11.1 | 10.5 | 1.36 |

[a]Reaction conditions: monomer (1.5M), the molar ratio of monomer/EBP/PTH was as shown in the table, in DMSO, at room temperature, a 14 W CFL bulb was used for irradiation. The conversion of monomer was determined by $^1$H NMR spectroscopy. $M_{n, theory}$ was calculated according to the monomer conversion. $M_{n, GPC}$ and $M_w/M_n$ were determined by GPC analysis.
[b]The molar ratio of PTH is calculated according to the PTH unit content contained in the Gel-PTH added into the reaction.
[c]LED ($\lambda_{max}$ = 410 nm) light is used.

Gel-PTH Facilitated Controlled Radical Polymerization
General Procedure for Photo-CRP with Gel-PTH.

A glass vial was charged with monomer (1.0 mmol), iniferter/initiator (1/100 to 1/500 molar ratio of monomer), a piece of Gel-PTH (dry Gel-PTH material was swollen with corresponding degassed solvent) and a small stir bar under N$_2$. The vessel was sealed with a rubber septum. 1 mL of the corresponding degassed solvent (deoxygenated with three freeze, pump, thaw cycles under N$_2$ atmosphere) was added into the vial via a syringe under N$_2$. Then, the mixture was carefully stirred at room temperature under CFL irradiation. After the desired reaction time, a small aliquot of the mixture was directly analyzed by NMR and GPC. The GPC traces for the polymers obtained via polymerization from TTC-2 are shown in FIGS. 22A, 22C, and 22E. The resulting $^1$H NMR spectra are shown in FIGS. 22B, 22D, and 22F. Due to the symmetric chemical structure of the polymers, Synthesis of Macro-TTC Via Photo-CRP with Gel-PTH.

Figure 26:
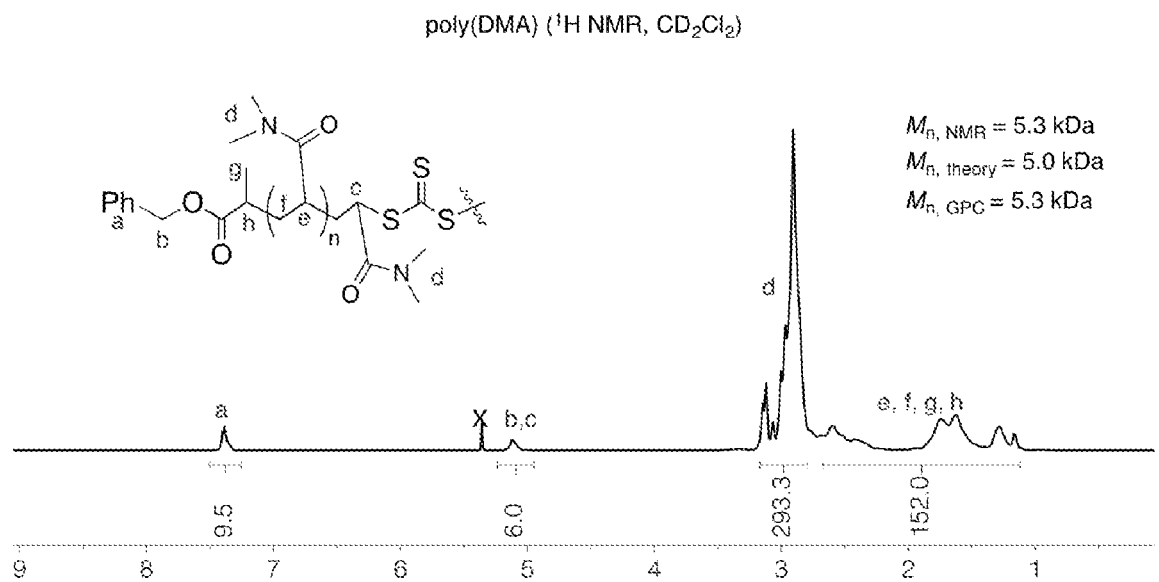
FIG. 26. $^1$H NMR analysis of poly(DMA) obtained via polymerization from TTC-3. Due to the symmetric chemical structure of the polymers, only half of the structures are shown.
Figure 27:
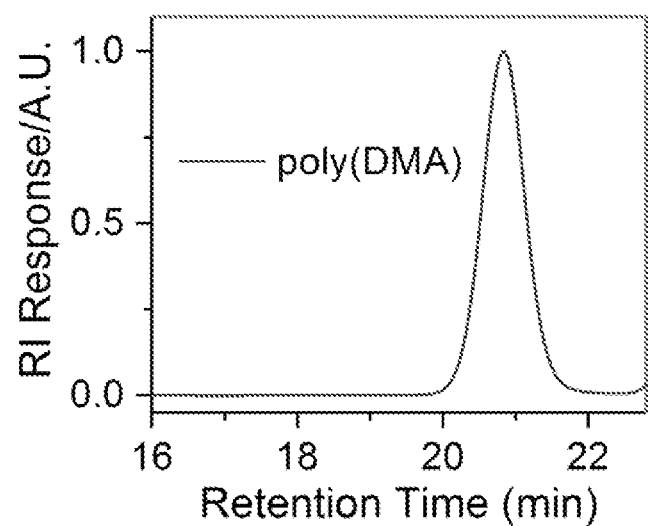
FIG. 27. GPC analysis of poly(DMA) obtained via polymerization from TTC-3.
Figure 28:
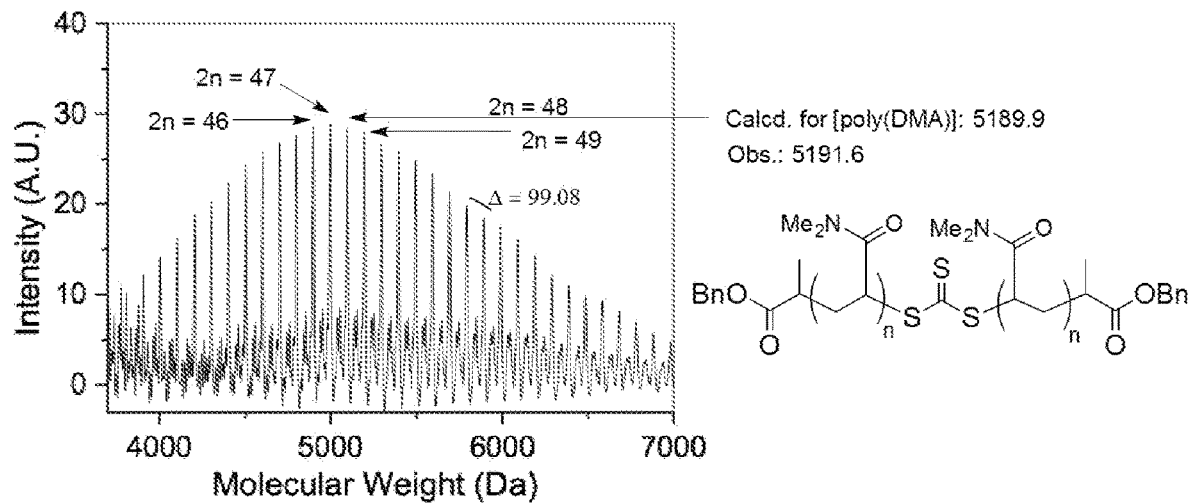
FIG. 28. MALDI-TOF analysis of poly(DMA) obtained via polymerization from TTC-3.
Figure 29:
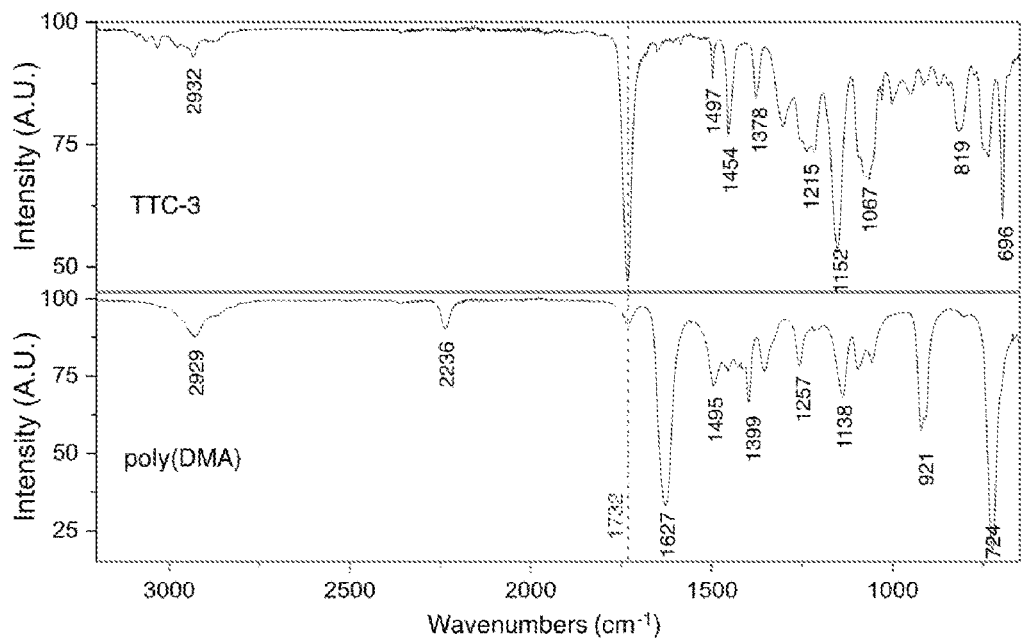
FIG. 29. FTIR analysis of TTC-3 and poly(DMA) obtained via polymerization from TTC-3.
Figure 30:
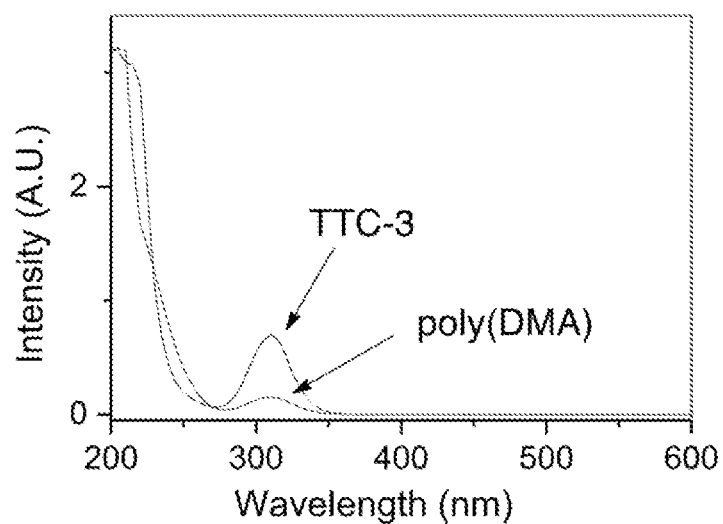
FIG. 30. UV-vis analysis of poly(DMA) obtained via polymerization from TTC-3.

A glass vial was charged with monomer (4.5 mmol), TTC-3 (0.045 mmol), a piece of Gel-PTH (dry Gel-PTH material (5 mg) was swollen with MeCN), and a small stir bar under N$_2$. The vessel was sealed with a rubber septum. 3 mL of degassed MeCN (deoxygenated with three freeze, pump, thaw cycles under N$_2$ atmosphere) were added into the vial via a syringe under N$_2$. Then, the mixture was carefully stirred at room temperature under CFL irradiation. As monitored with $^1$H NMR analysis, when 45% monomer conversion was achieved, the reaction was stopped, and the solution was concentrated under vacuum. A minimum amount of DCM was added to dissolve the mixture. Then, it was precipitated with Et$_2$O. The obtained solid was re-dissolved with a minimum amount of DCM for further precipitation. The precipitation procedure was repeated for three times. The produced poly(DMA) was characterized using $^1$H NMR, GPC, MALDI-TOF, IR and UV-vis analysis. The $^1$H NMR analysis of poly(DMA) obtained via polymerization from TTC-3 is shown in FIG. 26. Due to the symmetric chemical structure of the polymers, only half of the structures are shown. The GPC analysis of poly(DMA) obtained via polymerization from TTC-3 is shown in FIG. 27. The MALDI-TOF analysis of poly(DMA) obtained via polymerization from TTC-3 is shown in FIG. 28. The FTIR analysis of TTC-3 and poly(DMA) obtained via polymerization from TTC-3 is shown in FIG. 29. The UV-vis analysis of poly(DMA) obtained via polymerization from TTC-3 is shown in FIG. 30.

Synthesis of Block Copolymers from Macro-TTC.

Figure 7A:
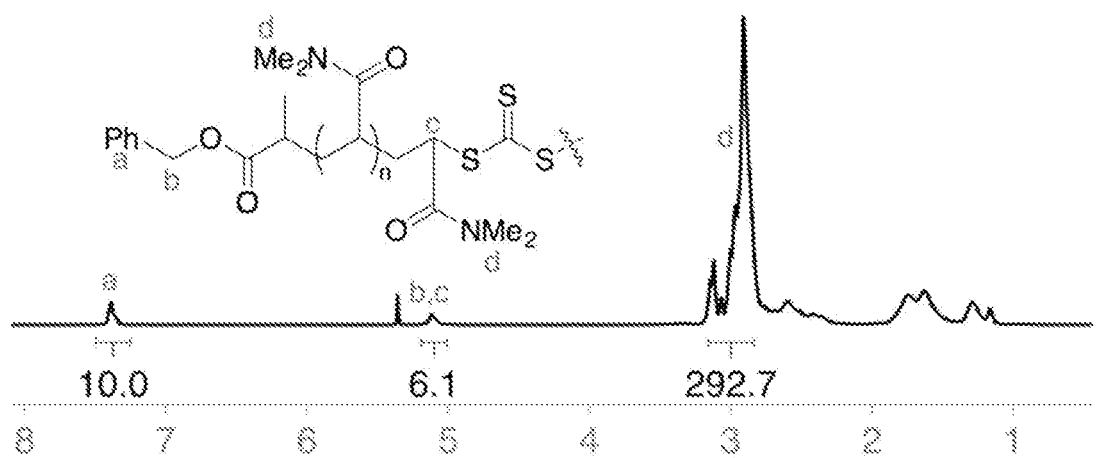
FIGS. 7A to 7B.

To assess whether Gel-PTH catalyzed photo-CRP could be used to produce block copolymers from macro-iniferters, a series of chain extension experiments was conducted. First, poly(DMA) was synthesized using photo-CRP of DMA from TTC-3 with Gel-PTH catalyst. To validate its structure, $^1$H NMR (FIG. 26), GPC (FIG. 27), MALDI-TOF (matrix-assisted laser desorption/ionization time-of-flight) mass spectroscopy (FIG. 28), IR (FIG. 29), and UV-vis (FIG. 30) spectroscopy were conducted. The MALDI-TOF (FIG. 27) spectrum exhibited a single set of peaks. The observed m/z values (e.g., $M_n$=5191 Da) are in good agreement with calculated values and with GPC analysis ($M_n$=5289 Da, $M_w/M_n$=1.09) and the $M_n$ ($M_n$=5252 Da) obtained from $^1$H NMR. In a representative $^1$H NMR spectrum (FIG. 7A), resonances that correspond to the protons from the benzyl chain ends are observed at 7.40 and 5.11 ppm, indicating that this method provides excellent end group fidelity. Meanwhile, the FTIR peak at 1732 cm$^1$ (FIG. 29) and the UV-vis absorption at 310 nm (FIG. 30), which are characteristic of the TTC unit, also confirmed the structure of the proposed macro-TTC.

Figure 7B:
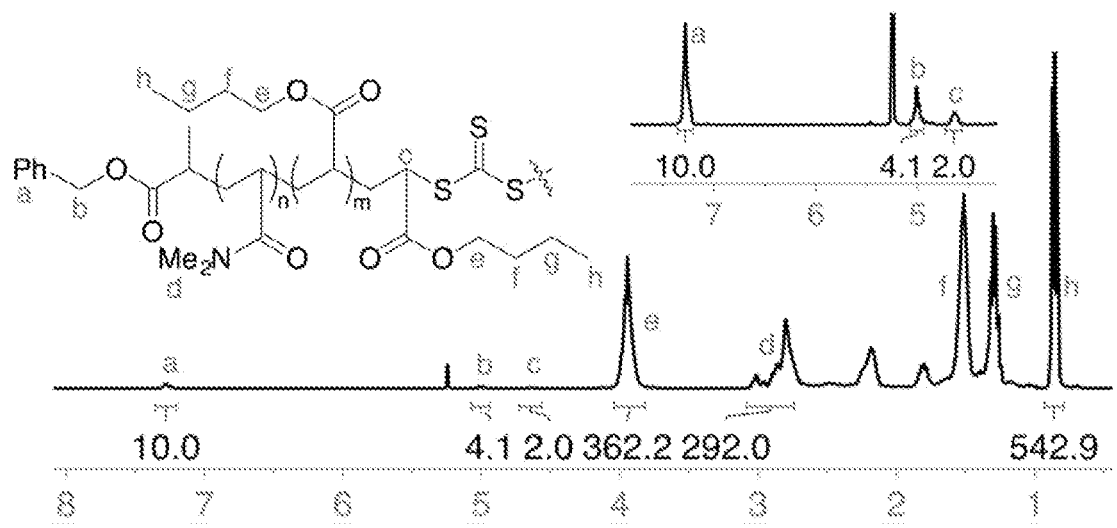
Figure 8:
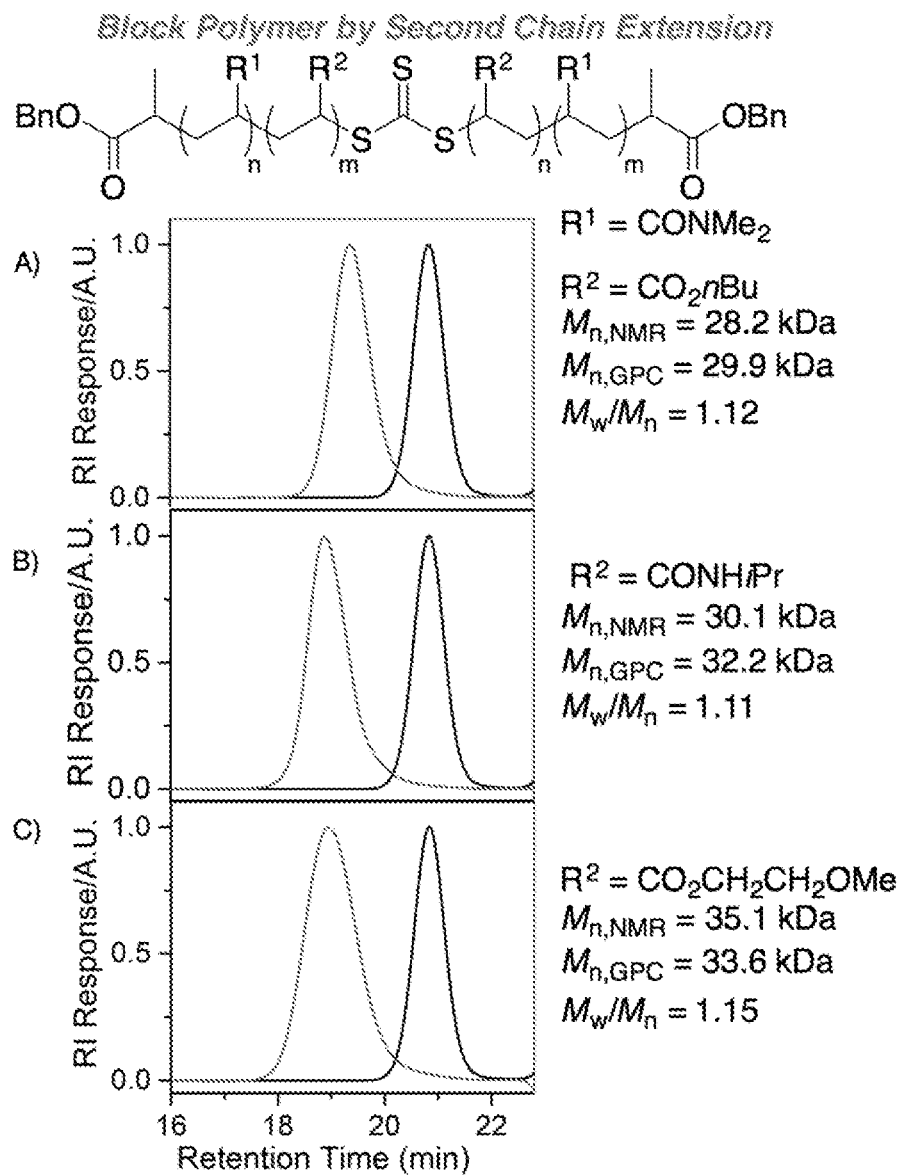
FIG. 8. GPC traces of block copolymers synthesized with Gel-PTH, black trace=starting macro iniferter poly(DMA), gray trace=block copolymer. GPC traces of block copolymers with different second chain extensions are shown (Panel A: $R_2$=CO$_2$nBu; Panel B: $R_2$=CONH/Pr; Panel C $R_2$=CO$_2$CH$_2$CH$_2$OMe).

With this macro-TTC, subsequent chain extensions were conducted with three different monomers including NIPAAM, nBA, and EGMEA. In these experiments, all of the resulting A-B-A triblock copolymers were isolated and analyzed with $^1$H NMR (FIG. 31A through FIG. 33B) and GPC. As exemplified with poly(DMA)-b-poly(nBA)-b-poly (DMA) in FIG. 7B, the block copolymer product clearly shows the incorporation of the $2^{nd}$ monomer; an $M_n$ of 28.2 kDa was calculated from $^1$H NMR analysis based on integration of the benzyl end groups relative to the polymer backbone. The GPC traces for three different block copolymers are shown in FIG. 8. Narrow molecular weight distributions were obtained in all cases, and no low molar mass tailing was observed. Moreover, the estimated $M_n$ values obtained via GPC are in good agreement with those calculated from $^1$H NMR.

Figure 31A:
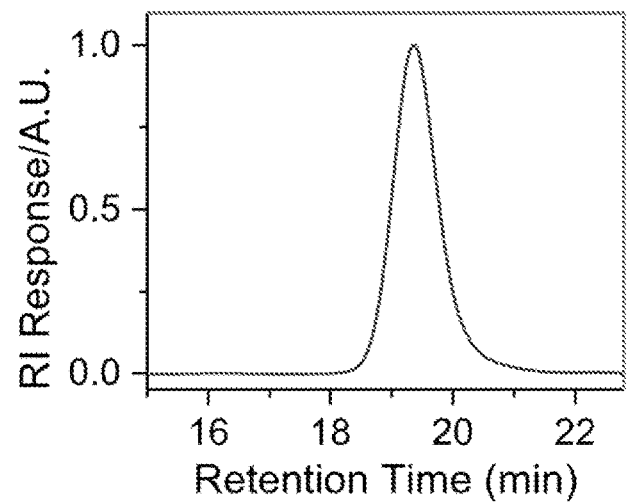
FIGS. 31A to 31B. GPC (FIG. 31A) and $^1$H NMR analysis (FIG. 31B) of poly(DMA)-poly(nBA)-poly(DMA) obtained via polymerization from macro-TTC (poly (DMA)). Due to the symmetric chemical structure of the polymers, only half of the structures are shown.
Figure 31B:
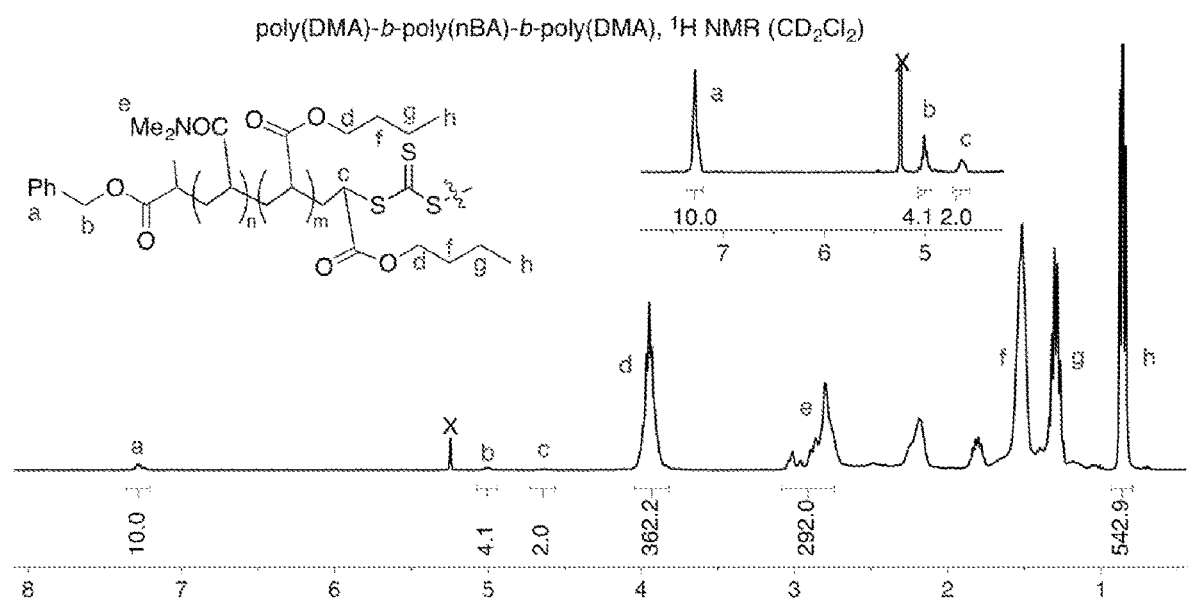
Figure 32A:
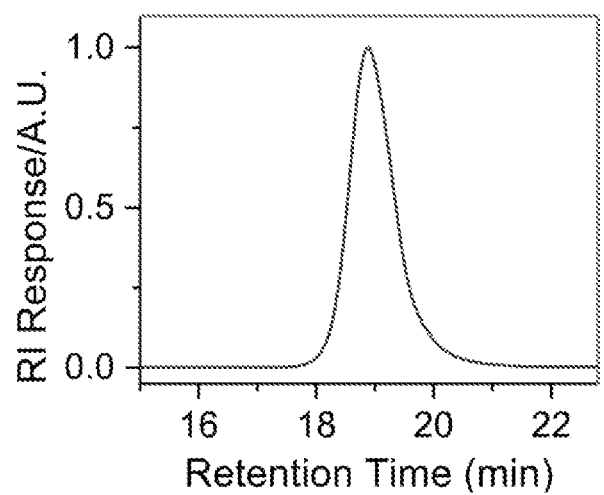
FIGS. 32A to 32B. GPC (FIG. 32A) and $^1$H NMR analysis (FIG. 32B) of poly(DMA)-poly(NIPAAM)-poly (DMA) obtained via polymerization from macro-TTC (poly (DMA)). Due to the symmetric chemical structure of the polymers, only half of the structures are shown.
Figure 32B:
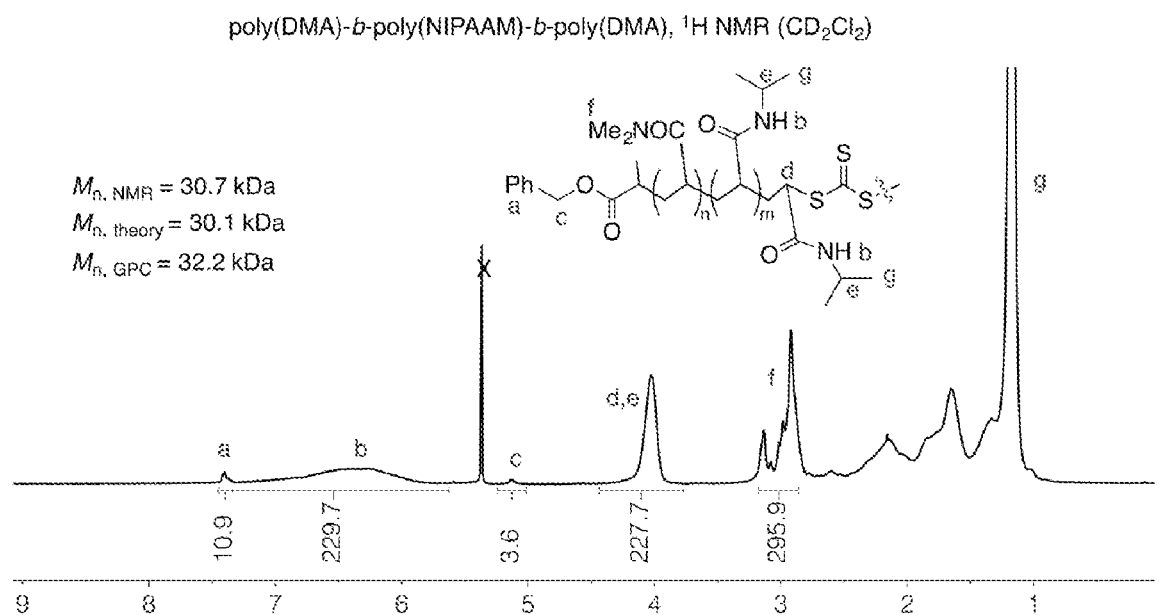
Figure 33A:
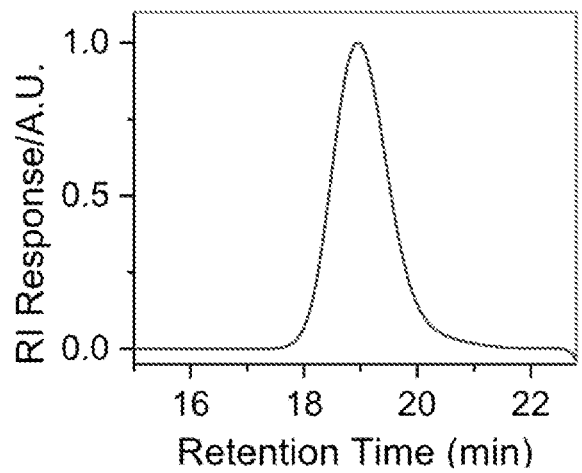
FIGS. 33A to 33B. GPC (FIG. 33A) and $^1$H NMR analysis (FIG. 33B) of poly(DMA)-poly(EGMEA)-poly (DMA) obtained via polymerization from macro-TTC (poly (DMA)) (i.e., poly(EGMEA) is poly ethylene glycol methyl ether acrylate). Due to the symmetric chemical structure of the polymers, only half of the structures are shown.
Figure 33B:
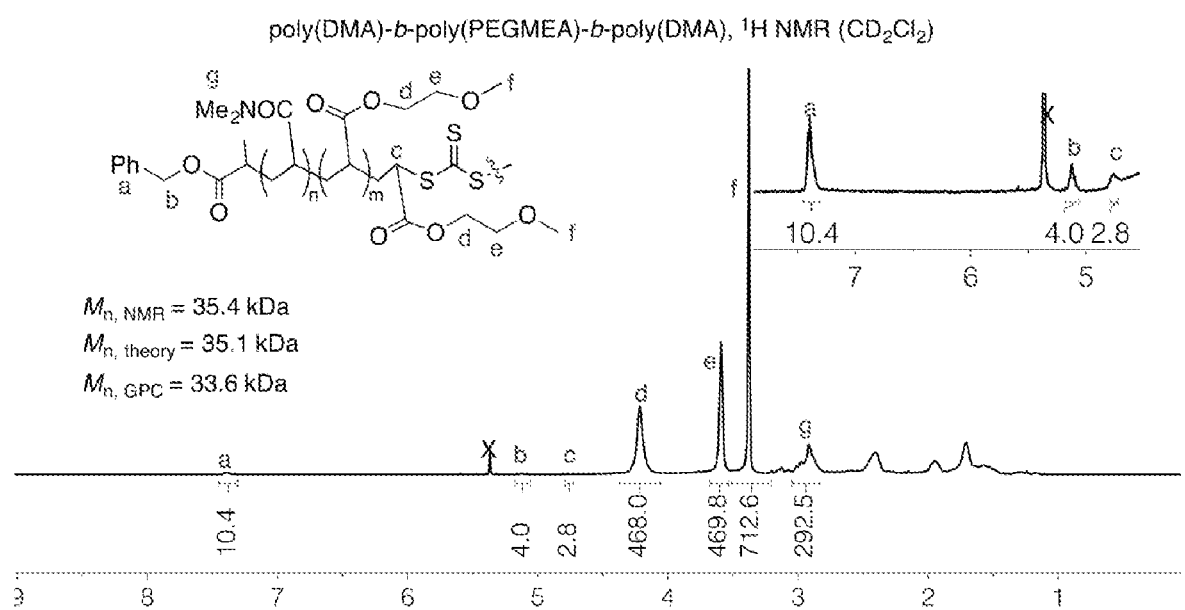

A glass vial was charged with monomer (1.5 mmol), macro-TTC (poly(DMA)) (0.006 mmol), a piece of Gel-PTH (dry Gel-PTH material (1.5 mg) was swollen with MeCN), and a small stir bar under $N_2$. The vessel was sealed with a rubber septum. 1 mL of degassed MeCN (deoxygenated with three freeze, pump, thaw cycles under $N_2$ atmosphere) was added into the vial via a syringe under $N_2$. Then, the mixture was carefully stirred at room temperature under CFL irradiation. The monomer conversion was monitored by $^1$H NMR spectroscopy. GPC analysis was directly performed on the reaction mixture after diluting with DMF. To obtain the $^1$H NMR spectrum of the block copolymers, the crude reaction mixtures were purified by dialysis (molecular weight cutoff=1 kDa) using acetone or methanol as the solvent. The GPC trace and $^1$H NMR spectra for poly (DMA)-poly(nBA)-poly(DMA) obtained via polymerization from macro-TTC (poly(DMA)) are shown in FIGS. 31A and 31B, respectively. Due to the symmetric chemical structure of the polymers, only half of the structures are shown. The GPC trace and $^1$H NMR spectra for poly (DMA)-poly(NIPAAM)-poly(DMA) obtained via polymerization from macro-TTC (poly(DMA)) are shown in FIGS. 32A and 32B, respectively. Due to the symmetric chemical structure of the polymers, only half of the structures are shown. The GPC trace and $^1$H NMR spectra for poly (DMA)-poly(EGMEA)-poly(DMA) obtained via polymerization from macro-TTC (poly(DMA)) are shown in FIGS. 33A and 33B, respectively. Due to the symmetric chemical structure of the polymers, only half of the structures are shown.

Recycling Gel-PTH Catalyst

Figure 9:
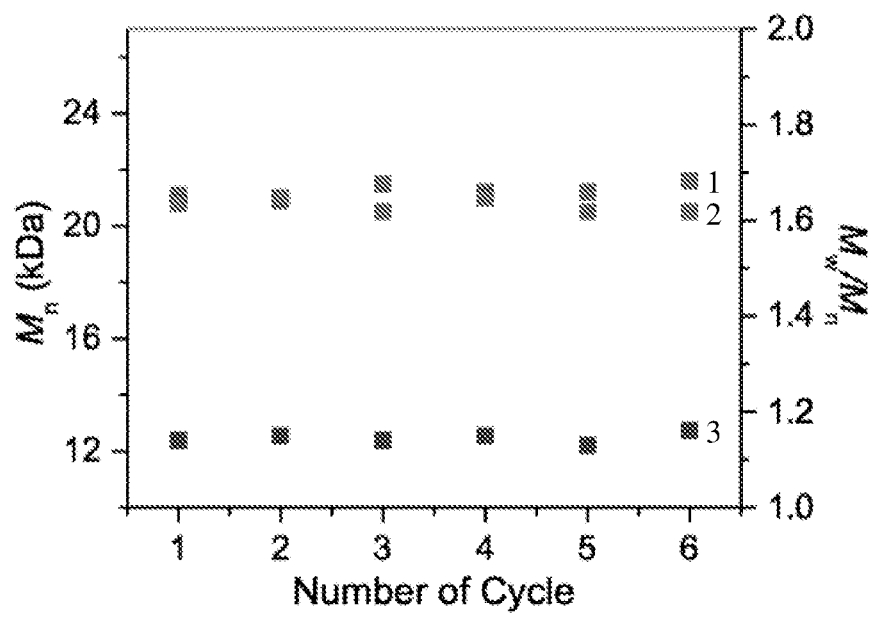
FIG. 9. Recycling the Gel-PTH catalyst in multiple photo-CRP reactions using NIPAAM monomer in MeCN. Number 1 points represent $M_{n,theory}$ values calculated from monomer conversion; Number 2 points represent $M_{n,\ GPC}$ values estimated by GPC analysis: Number 3 points represent $M_w/M_n$ values.
Figure 10:
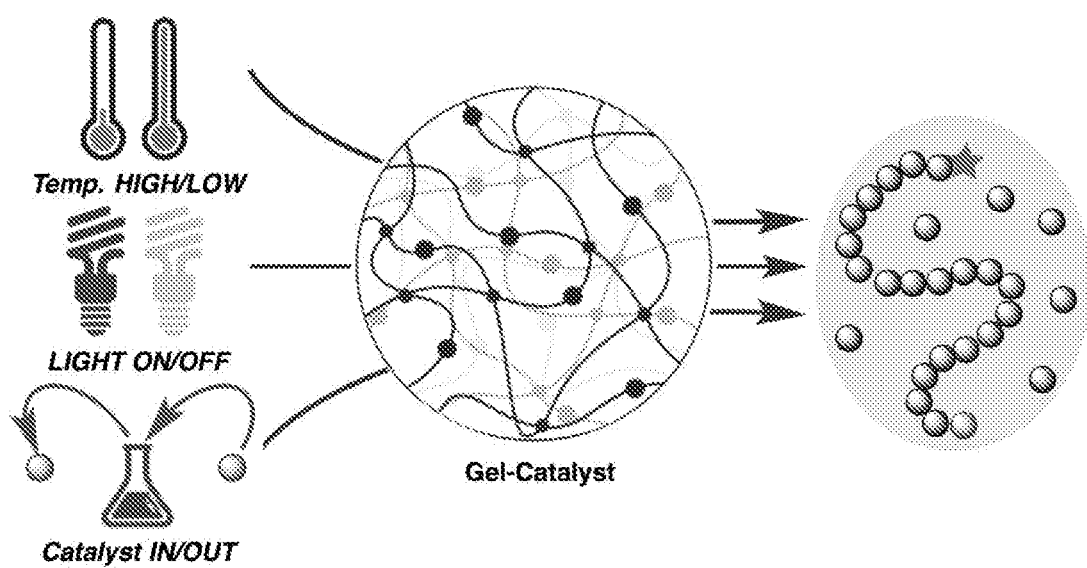
FIG. 10. General schematic illustrating the thermoresponsive gel photoredox catalyst.

Given that Gel-PTH is a heterogeneous catalyst and that, as shown above, it can be repeatedly added or removed from a photo-CRP reaction, it was reasoned that it should be possible to recycle Gel-PTH thus enabling the synthesis of several batches of polymer using the same catalyst. Thus, catalyst-recycling experiments were conducted wherein Gel-PTH was removed from a completed photo-CRP reaction (in MeCN) with a tweezers, rinsing with MeCN, and used directly in another photo-CRP reaction in MeCN. As shown in FIG. 9, when the same piece of Gel-PTH was used for six photo-CRP reactions all run for the same amount of time with extensive washing between each cycle (5×10 mL MeCN), the resulting polymer products had almost the same $M_n$ (20.9-21.6 kDa) and $M_w/M_n$ (1.13-1.16) values. GPC analysis (FIG. 34) showed unimodal peaks with no low molar mass tailing. These experiments demonstrate the ease of recycling and the consistent performance of Gel-PTH as a catalyst for photo-CRP.

Figure 34:
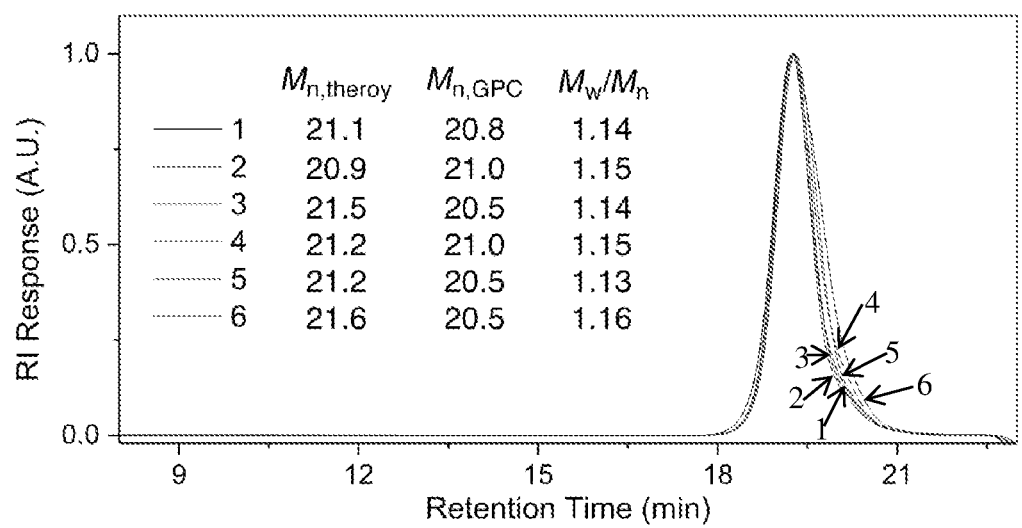
FIG. 34. GPC traces for experiments of recycling the Gel-PTH catalyst.

A glass vial was charged with monomer (1.5 mmol), TTC-2 (0.0075 mmol), a piece of Gel-PTH (dry Gel-PTH material (1.5 mg) was swollen with MeCN), and a small stir bar in a glove box. 1 mL of degassed MeCN was added into the vial. Then, the mixture was carefully stirred at room temperature under CFL irradiation. The monomer conversion was monitored by $^1$H NMR spectroscopy. GPC analysis was directly performed on the reaction mixture after diluting with DMF. After the reaction, the catalyst material was taken out from the vial with a tweezers, and rinsed with MeCN by slowly flowing ~10 mL of MeCN through the gel five times to eliminate species left from the previous reaction. In a subsequent experiment of recycling the catalyst, the gel was added into another vial charged with monomer (1.5 mmol), TTC-2 (0.0075), and a small stir bar in a glove box, and exposed to light irradiation for the same amount of reaction time. The experimental procedures were repeated for 6 times in total. For each time, the reaction mixture was analyzed by $^1$H NMR and GPC. The GPC traces for experiments of recycling the Gel-PTH catalyst are shown in FIG. 34.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein.

It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

What is claimed is:

1. A method for preparing a polymer comprising exposing to a light source a mixture of:
   a photoredox catalyst-bound polymer network, wherein the photoredox catalyst is 10-phenylphenothiazine, or a derivative thereof, and is covalently bound to the polymer network;
   optionally, an iniferter, chain transfer agent, and/or initiator; and
   one or more types of organic monomers.

2. The method of claim 1, wherein the photoredox catalyst is 10-phenylphenothiazine, and is covalently bound to the polymer network.

3. The method of claim 1, wherein the mixture comprises:
   the photoredox catalyst-bound polymer network;
   the iniferter, initiator, and/or chain transfer agent; and
   the one or more types of the organic monomers.

4. The method of claim 2, wherein the mixture further comprises a solvent.

5. The method of claim 2, wherein the wavelength of the light source is in the range of 200 nm to 1000 nm, inclusive.

6. The method of claim 2, wherein the photoredox catalyst-bound polymer network is a polymer prepared by polymerizing at least N-(4-(10H-phenothiazin-10-yl)phenyl)acrylamide.

7. The method of claim 2, whereby the polymer is formed via a radical polymerization process that is reversibly activated when irradiated by the light source and reversibly deactivated in absence of irradiation by the light source.

8. The method of claim 2, wherein the iniferter, initiator, or chain transfer agent is selected from the group consisting of dithiobenzoates, trithiocarbonates, dithiocarbamates, xanthates, and alkyl halides.

9. The method of claim 2, wherein the one or more types of the organic monomers are selected from the group consisting of styrenes, methacrylates, acrylates, acrylamides, vinyl halides, vinyl alcohols, vinyl esters, and vinyl amides.

10. The method of claim 2, wherein the polymer is a linear or branched block copolymer, random copolymer, gradient copolymer, or star copolymer comprised of at least two different types of the organic monomers.

11. The method of claim 2, wherein the polymer exhibits a polydispersity of $M_w/M_n$ between about 1.0 and about 2.0, inclusive.

12. The method of claim 2, wherein the iniferter, initiator, or chain transfer agent is a compound of the formula:

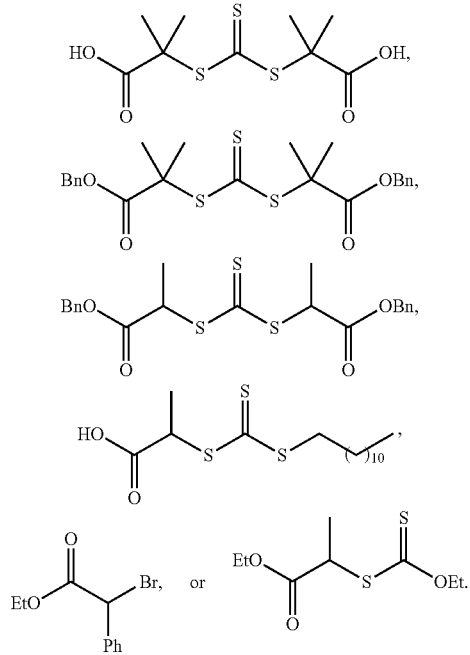

13. The method of claim 2, wherein the photoredox catalyst-bound polymer network is a polymer prepared by polymerizing N-(4-(10H-phenothiazin-10-yl)phenyl)acrylamide, N-isopropylacrylamide, and N,N'-methylenebisacrylamide.

14. The method of claim 2, wherein the one or more types of the organic monomers are selected from the group consisting of:

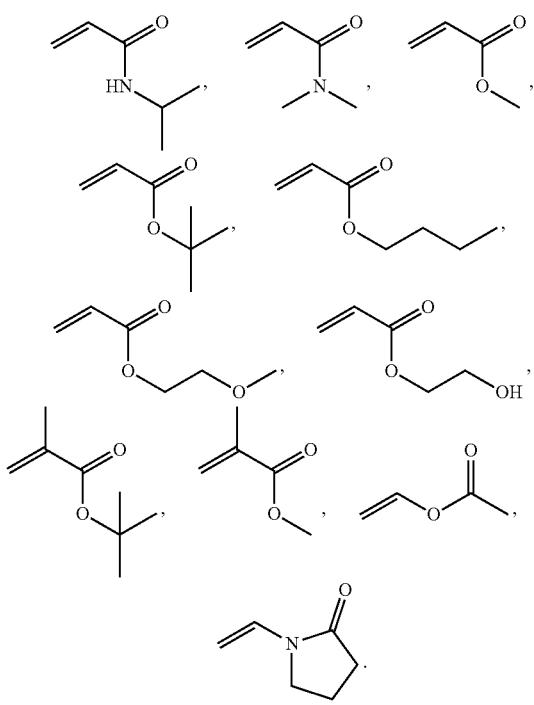

15. The method of claim 4, wherein the photoredox catalyst-bound polymer network is in the form of a gel.

16. The method of claim 4, wherein the solvent is water, acetonitrile, N,N-dimethylformamide, dimethyl sulfoxide, or a combination thereof.

17. The method of claim 8, wherein:

the dithiobenzoate is selected from the group consisting of benzyl benzodithioate, cyanomethyl benzodithioate, 4-cyano-4-(phenylcarbonothioylthio)pentanoic acid, 4-cyano-4-(phenylcarbonothioylthio)pentanoic acid N-succinimidyl ester, 2-cyano-2-propyl benzodithioate, 2-cyano-2-propyl 4-cyanobenzodithioate, ethyl 2-(4-methoxyphenylcarbonothioylthio)acetate, ethyl 2-methyl-2-(phenylthiocarbonylthio)propionate, ethyl 2-(phenylcarbonothioylthio)-2-phenylacetate, ethyl 2-(phenylcarbonothioylthio)propionate, 1-(methoxycarbonyl)ethyl benzodithioate, 2-(4-methoxyphenylcarbonothioylthio)ethanoic acid, 2-nitro-5-(2-propynyloxy)benzyl 4-cyano-4-(phenylcarbonothioylthio)pentanoate, 2-(phenylcarbonothioylthio)propanoic acid, and 2-phenyl-2-propyl benzodithioate;

the trithiocarbonate is selected from the group consisting of 3,5-bis(2-dodecylthiocarbonothioylthio-1-oxopropoxy)benzoic acid, 2-cyanobutan-2-yl4-chloro-3,5-dimethyl-1H-pyrazole-1-carbodithioate, 2-cyanobutanyl-2-yl3,5-dimethyl-1H-pyrazole-1-carbodithioate, 4-cyano-4-[(dodecylsulfanylthiocarbonyl)sulfanyl]pentanoic acid, 4-cyano-4-[(dodecylsulfanylthiocarbonyl)sulfanyl]pentanol, cyanomethyl (3,5-dimethyl-1H-pyrazole)-carbodithioate, cyanomethyl dodecyl trithiocarbonate, cyanomethyl [3-(trimethoxysilyl)propyl] trithiocarbonate, 2-cyano-2-propyl dodecyl trithiocarbonate, S,S-dibenzyl trithiocarbonate, 2-(dodecylthiocarbonothioylthio)propionic acid, 2-(dodecylthiocarbonothioylthio)-2-methylpropionic acid 3-azido-1-propanol ester, 2-(dodecylthiocarbonothioylthio)-2-methylpropionic acid N-hydroxysuccinimide ester, 2-(dodecylthiocarbonothioylthio)-2-methylpropionic acid pentafluorophenyl ester, phthalimidomethyl butyl trithiocarbonate, methyl 2-(dodecylthiocarbonothioylthio)-2-methylpropionate, 2,2'-(thiocarbonylbis(sulfanediyl))bis(2-methylpropanoic acid), dibenzyl 2,2'-(thiocarbonylbis(sulfanediyl))bis(2-methylpropanoate), dibenzyl 2,2'-(thiocarbonylbis(sulfanediyl))dipropionate, and 2-(((dodecylthio)carbonothioyl)thio)propanoic acid;

the dithiocarbamate is selected from the group consisting of benzyl 1H-pyrrole-1-carbodithioate, cyanomethyl diphenylcarbamodithioate, cyanomethyl methyl(phenyl)carbamodithioate, cyanomethyl methyl(4-pyridyl)carbamodithioate, 2-cyanopropan-2-yl N-methyl-N-(pyridin-4-yl)carbamodithioate, methyl 2-[methyl(4-pyridinyl)carbamothioylthio]propionate, and 1-succinimidyl-4-cyano-4-[N-methyl-N-(4-pyridyl)carbamothioylthio]pentanoate;

the xanthate is selected from the group consisting of ethyl 2-(((ethylthio)carbonothioyl)thio)propanoate, methyl (4-methoxyphenoxy)carbonothioylsulfanyl acetate, methyl (methoxycarbonothioyl)sulfanyl acetate, methyl (ethoxycarbonothioyl)sulfanyl acetate, and methyl (isopropoxycarbonothioyl)sulfanyl acetate; and the alkyl halide is selected from the group consisting of ethyl 2-bromo-2-phenylacetate, dodecyl 2-bromoisobutyrate, ethyl 2-bromoisobutyrate, ethyl 2-bromopropionate, 2-hydroxyethyl 2-bromoisobutyrate, octadecyl 2-bromoisobutyrate, 2-(2-bromoisobutyryloxy)ethyl methacrylate, 1-bromoethylbenzene, 2-bromoisobutanoic acid N-hydroxysuccinimide ester, 2-bromoisobutyric anhydride, 2-azidoethyl 2-bromoisobutyrate, bis[2-(2$^1$-bromoisobutyryloxy)ethyl] disulfide, and bis[2-(2-bromoisobutyryloxy)undecyl] disulfide.

18. The method of claim 9, wherein:

the styrene is selected from the group consisting of styrene, 4-vinylanisole, 4-acetoxystyrene, 4-tert-butoxystyrene, 4-fluorostyrene, 3-nitrostyrene, α-methylstyrene, methylstyrene, and 4-tert-butylstyrene;

the methacrylate or acrylate is selected from the group consisting of 2-chloroethyl acrylate, methyl acrylate, ethyl acrylate, tert-butyl acrylate, butyl acrylate, ethylene glycol methyl ether acrylate, 2-hydroxyethyl acrylate, lauryl acrylate, methyl α-bromoacrylate, tert-butyl 2-bromoacrylate, glycidyl methacrylate, pentafluorophenyl methacrylate, methacrylic acid N-hydroxysuccinimide ester, tert-butyl methacrylate, isobutyl methacrylate, ethyl methacrylate, and methyl methacrylate;

the acrylamide is selected from the group consisting of acrylamide, N,N-dimethylacrylamide, N-isopropylacrylamide, N-tert-butylacrylamide, N-hydroxyethyl acrylamide, N-(3-methoxypropyl)acrylamide, N-phenylacrylamide, methacrylamide, N-isopropylmethacrylamide, N-[3-(dimethylamino)propyl]methacrylamide, and 7-[4-(trifluoromethyl)coumarin]methacrylamide;

the vinyl ester is selected from the group consisting of vinyl acetate, vinyl propionate, vinyl pivalate, vinyl neodecanoate, vinyl decanoate, vinyl stearate, vinyl chloroformate, and vinyl benzoate; and the vinyl amide is selected from the group consisting of N-vinylpyrrolidone, N-vinylformamide, and N-methyl-N-vinylacetamide.

19. The method of claim 15, wherein the photoredox catalyst-bound polymer network is a polymer prepared by polymerizing:

N-(4-(10H-phenothiazin-10-yl)phenyl)acrylamide;
the one or more types of the organic monomers selected from the group consisting of N-isopropylacrylamide, N,N-diethylacrylamide, methyl vinyl ether, N-vinyl-caprolactam, di(ethylene glycol) methyl ether methacrylate, ethylene oxide, and propylene oxide; and
N,N'-methylene-bisacrylamide.

20. The method of claim 15, wherein the gel is thermo-responsive.

21. The method of claim 15, wherein the lower critical solution temperature of the gel is between 20° C. and 100° C., inclusive.

22. The method of claim 15, whereby the polymer is formed via a radical polymerization process that is reversibly activated when the gel is present in the mixture and reversibly deactivated when the gel is removed from the mixture.

23. The method of claim 15, whereby the polymer is formed via a radical polymerization process that is reversibly deactivated at a temperature above the lower critical solution temperature of the gel.

24. The method of claim 15, wherein the temperature of the mixture is lower than the lower critical solution temperature of the gel.

25. The method of claim 15, wherein the temperature of the mixture is between 0° C. and 40° C., inclusive.

26. The method of claim 15, further comprising:
discontinuing the exposure of the mixture to the light source;
raising the temperature of the mixture to above the lower critical solution temperature of the gel; and/or
removing the gel from the mixture.

* * * * *

UNITED STATES PATENT AND TRADEMARK OFFICE
CERTIFICATE OF CORRECTION

PATENT NO. : 11,041,026 B2
APPLICATION NO. : 16/080536
DATED : June 22, 2021
INVENTOR(S) : Jeremiah A. Johnson et al.

Page 1 of 1

It is certified that error appears in the above-identified patent and that said Letters Patent is hereby corrected as shown below:

In the Claims

In Claim 17, at Column 44, Lines 34-35, the text:
"bis[2-($2^1$-bromoisobutyryloxy)ethyl]disulfide"
Should be replaced with:
--bis[2-(2′-bromoisobutyryloxy)ethyl]disulfide--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*